US012551207B2

(12) United States Patent
Thambar et al.

(10) Patent No.: US 12,551,207 B2
(45) Date of Patent: Feb. 17, 2026

(54) HEART VALVE PROSTHESIS AND METHOD

(71) Applicant: Percutaneous Cardiovascular Solutions Pty Ltd, North Albury (AU)

(72) Inventors: Suku Thambar, New South Wales (AU); Martin Christopher Cook, Lane Cove (AU); Stefan Schreck, Duvall, WA (US); Stayajit Rohan Jayasinghe, Southport (AU)

(73) Assignee: Percutaneous Cardiovascular Solutions Pty Ltd, Macquarie Park (AU)

( * ) Notice: Subject to any disclaimer, the term of this patent is extended or adjusted under 35 U.S.C. 154(b) by 1216 days.

(21) Appl. No.: 17/247,022

(22) Filed: Nov. 24, 2020

(65) Prior Publication Data

US 2021/0077083 A1 Mar. 18, 2021

Related U.S. Application Data

(63) Continuation of application No. 16/226,185, filed on Dec. 19, 2018, now Pat. No. 10,856,858, which is a
(Continued)

(30) Foreign Application Priority Data

Nov. 21, 2008 (AU) ............................... 2008906045
Feb. 9, 2009 (AU) ............................... 2009900460

(51) Int. Cl.
*A61F 2/02* (2006.01)
*A61B 17/00* (2006.01)
(Continued)

(52) U.S. Cl.
CPC ........ *A61B 17/0057* (2013.01); *A61F 2/2418* (2013.01); *A61F 2/2436* (2013.01);
(Continued)

(58) Field of Classification Search
CPC .... A61F 2/2418; A61F 2/2445; A61F 2/2412; A61F 2/2409; A61F 2/2457;
(Continued)

(56) References Cited

U.S. PATENT DOCUMENTS 3,409,013 A 11/1968 Berry
3,472,230 A 10/1969 Fogarty
(Continued)

FOREIGN PATENT DOCUMENTS

| CA | 2304325 A1 | 10/2000 |
|---|---|---|
| CA | 2304325 C | 5/2008 |

(Continued)

OTHER PUBLICATIONS

Jeffrey S. Borer et al., "Contemporary Approach to Aortic and Mitral Regurgitation," Circulation 2003; 108:2432.
(Continued)

*Primary Examiner* — Seema Mathew
(74) *Attorney, Agent, or Firm* — Thomas C. Richardson

(57) ABSTRACT

A heart valve prosthesis for replacing a native atrioventricular valve of the heart. The prosthesis includes a housing component that is configured to be radially expandable and compressible between a radially compressed state and a radially expanded state to engage structure of the native atrioventricular valve to fix the housing component relative to the native atrioventricular valve. The housing component includes a housing body and an annular sealing element connected to an atrial end of the housing body. The annular sealing element is made of polyester and is reinforced with wire. A valve component is configured to be radially expandable and compressible between a radially compressed state and a radially expanded state within the housing component. The valve component includes a valve body having a valve
(Continued)

passage extending therethrough and three leaflets made from pericardium secured to the valve body.

20 Claims, 25 Drawing Sheets

Related U.S. Application Data continuation of application No. 13/130,180, filed as application No. PCT/AU2009/001513 on Nov. 20, 2009, now Pat. No. 10,166,014.

(51) Int. Cl.
  *A61F 2/24* (2006.01)
  *A61F 2/848* (2013.01)

(52) U.S. Cl.
  CPC .......... *A61B 2017/00575* (2013.01); *A61B 2017/0061* (2013.01); *A61F 2/2457* (2013.01); *A61F 2002/8486* (2013.01); *A61F 2220/0008* (2013.01); *A61F 2220/0016* (2013.01); *A61F 2230/0054* (2013.01); *A61F 2230/0078* (2013.01); *A61F 2230/008* (2013.01); *A61F 2250/006* (2013.01)

(58) Field of Classification Search
  CPC ...... A61F 2/2436; A61F 2/246; A61F 2/2427; A61F 2/2454; A61F 2/2463; A61F 2/24; A61F 2/07; A61F 2/2475; A61F 2/82; A61F 2/90; A61F 2/06; A61F 2/86; A61F 2/02; A61F 2002/9505; A61F 2/2476; A61F 2/852; A61F 2002/821; A61F 2/04
  See application file for complete search history.

(56) References Cited

U.S. PATENT DOCUMENTS

| | | | |
|---|---|---|---|
| 3,548,417 | A | 12/1970 | Kisher |
| 3,587,115 | A | 6/1971 | Shiley |
| 3,657,744 | A | 4/1972 | Ersek |
| 3,671,979 | A | 6/1972 | Moulopoulos |
| 3,714,671 | A | 2/1973 | Edwards et al. |
| 3,739,402 | A | 6/1973 | Cooley et al. |
| 3,744,060 | A * | 7/1973 | Bellhouse ............ A61F 2/2412 137/849 |
| 3,755,823 | A | 9/1973 | Hancock |
| 3,898,701 | A | 8/1975 | La Russa |
| 3,997,923 | A * | 12/1976 | Possis ............... A61F 2/2424 623/2.4 |
| 4,011,947 | A | 3/1977 | Sawyer |
| 4,035,849 | A | 7/1977 | Angell et al. |
| 4,056,854 | A | 11/1977 | Boretos et al. |
| 4,079,468 | A * | 3/1978 | Liotta ............... A61F 2/2409 623/900 |
| 4,106,129 | A | 8/1978 | Carpentier et al. |
| 4,204,283 | A | 5/1980 | Bellhouse et al. |
| 4,218,783 | A | 8/1980 | Reul et al. |
| 4,222,126 | A | 9/1980 | Boretos et al. |
| 4,225,980 | A | 10/1980 | Ramos Martinez |
| 4,265,694 | A | 5/1981 | Boretos et al. |
| 4,274,437 | A | 6/1981 | Watts |
| 4,297,749 | A | 11/1981 | Davis et al. |
| 4,339,831 | A | 7/1982 | Johnson |
| 4,340,977 | A | 7/1982 | Brownlee et al. |
| 4,343,048 | A | 8/1982 | Ross et al. |
| 4,345,340 | A | 8/1982 | Rosen |
| 4,373,216 | A | 2/1983 | Klawitter |
| 4,406,022 | A | 9/1983 | Roy |
| 4,407,271 | A | 10/1983 | Schiff |
| 4,470,157 | A * | 9/1984 | Love ............... A61F 2/2412 623/2.15 |
| 4,477,930 | A * | 10/1984 | Totten ............... A61F 2/2409 623/2.15 |
| 4,490,859 | A | 1/1985 | Black et al. |
| 4,535,483 | A * | 8/1985 | Klawitter ........... A61F 2/2409 623/2.4 |
| 4,553,545 | A | 11/1985 | Maass et al. |
| 4,574,803 | A | 3/1986 | Storz |
| 4,592,340 | A | 6/1986 | Boyles |
| 4,605,407 | A | 8/1986 | Black et al. |
| 4,612,011 | A | 9/1986 | Kautzky |
| 4,643,732 | A | 2/1987 | Pietsch et al. |
| 4,655,771 | A | 4/1987 | Wallsten |
| 4,666,442 | A | 5/1987 | Arru et al. |
| 4,692,164 | A * | 9/1987 | Dzemeshkevich ... A61F 2/2412 623/2.14 |
| 4,733,665 | A | 3/1988 | Palmaz |
| 4,759,758 | A | 7/1988 | Gabbay |
| 4,762,128 | A | 8/1988 | Rosenbluth |
| 4,777,951 | A | 10/1988 | Cribier et al. |
| 4,787,899 | A | 11/1988 | Lazarus |
| 4,787,901 | A | 11/1988 | Baykut |
| 4,796,629 | A | 1/1989 | Grayzel |
| 4,829,990 | A | 5/1989 | Thuroff et al. |
| 4,851,001 | A | 7/1989 | Taheri |
| 4,856,516 | A | 8/1989 | Hillstead |
| 4,865,600 | A | 9/1989 | Carpentier et al. |
| 4,878,495 | A | 11/1989 | Grayzel |
| 4,878,906 | A | 11/1989 | Lindemann et al. |
| 4,883,458 | A | 11/1989 | Shiber |
| 4,922,905 | A | 5/1990 | Strecker |
| 4,960,424 | A | 10/1990 | Grooters |
| 4,966,604 | A | 10/1990 | Reiss |
| 4,979,939 | A | 12/1990 | Shiber |
| 4,986,830 | A | 1/1991 | Owens et al. |
| 4,994,077 | A | 2/1991 | Dobben |
| 5,007,896 | A | 4/1991 | Shiber |
| 5,026,366 | A | 6/1991 | Leckrone |
| 5,032,128 | A | 7/1991 | Alonso |
| 5,037,434 | A | 8/1991 | Lane |
| 5,047,041 | A | 9/1991 | Samuels |
| 5,059,177 | A | 10/1991 | Towne et al. |
| 5,078,739 | A | 1/1992 | Martin |
| 5,080,668 | A | 1/1992 | Bolz et al. |
| 5,085,635 | A | 2/1992 | Cragg |
| 5,089,015 | A | 2/1992 | Ross |
| 5,108,370 | A | 4/1992 | Walinsky |
| 5,152,771 | A | 10/1992 | Sabbaghian et al. |
| 5,163,953 | A | 11/1992 | Vince |
| 5,167,628 | A | 12/1992 | Boyles |
| 5,192,297 | A | 3/1993 | Hull |
| 5,197,980 | A | 3/1993 | Gorshkov et al. |
| 5,207,707 | A | 5/1993 | Gourley |
| 5,232,446 | A | 8/1993 | Arney |
| 5,266,073 | A | 11/1993 | Wall |
| 5,282,847 | A | 2/1994 | Trescony et al. |
| 5,295,958 | A | 3/1994 | Shturman |
| 5,326,371 | A | 7/1994 | Love et al. |
| 5,332,402 | A | 7/1994 | Teitelbaum |
| 5,360,444 | A | 11/1994 | Kusuhara |
| 5,370,685 | A | 12/1994 | Stevens |
| 5,397,347 | A | 3/1995 | Cuilleron et al. |
| 5,397,351 | A | 3/1995 | Pavcnik et al. |
| 5,405,381 | A | 4/1995 | Olin |
| 5,411,055 | A | 5/1995 | Kane |
| 5,411,522 | A | 5/1995 | Trott |
| 5,411,552 | A | 5/1995 | Andersen et al. |
| 5,415,667 | A | 5/1995 | Frater |
| 5,443,446 | A | 8/1995 | Shturman |
| 5,480,424 | A | 1/1996 | Cox |
| 5,500,014 | A | 3/1996 | Quijano et al. |
| 5,545,209 | A | 8/1996 | Roberts et al. |
| 5,545,214 | A | 8/1996 | Stevens |
| 5,549,665 | A | 8/1996 | Vesely et al. |
| 5,554,184 | A | 9/1996 | Machiraju |
| 5,554,185 | A | 9/1996 | Block et al. |
| 5,554,186 | A | 9/1996 | Guo et al. |
| 5,562,729 | A * | 10/1996 | Purdy ............... A61F 2/2412 623/2.19 |
| 5,571,175 | A | 11/1996 | Vanney et al. |

(56) References Cited

U.S. PATENT DOCUMENTS

| | | |
|---|---|---|
| 5,591,185 A | 1/1997 | Kilmer et al. |
| 5,599,305 A | 2/1997 | Hermann et al. |
| 5,607,464 A | 3/1997 | Trescony et al. |
| 5,607,465 A | 3/1997 | Camilli |
| 5,609,626 A | 3/1997 | Quijano et al. |
| 5,628,792 A | 5/1997 | Lentell |
| 5,639,274 A | 6/1997 | Fischell et al. |
| 5,665,115 A | 9/1997 | Cragg |
| 5,697,382 A | 12/1997 | Love et al. |
| 5,716,417 A | 2/1998 | Girard et al. |
| 5,728,068 A | 3/1998 | Leone et al. |
| 5,749,890 A | 5/1998 | Shaknovich |
| 5,756,476 A | 5/1998 | Epstein et al. |
| 5,769,812 A | 6/1998 | Stevens et al. |
| 5,800,508 A | 9/1998 | Goicoechea et al. |
| 5,824,062 A | 10/1998 | Patke et al. |
| 5,840,081 A | 11/1998 | Andersen et al. |
| 5,855,597 A | 1/1999 | Jayaraman |
| 5,855,601 A | 1/1999 | Bessler et al. |
| 5,855,602 A | 1/1999 | Angell |
| 5,861,029 A | 1/1999 | Evdokimov et al. |
| 5,861,030 A | 1/1999 | Rhee et al. |
| 5,906,619 A | 5/1999 | Olson et al. |
| 5,908,451 A | 6/1999 | Yeo |
| 5,908,452 A | 6/1999 | Bokros et al. |
| 5,925,063 A | 7/1999 | Khosravi |
| 5,957,949 A | 9/1999 | Leonhardt et al. |
| 5,968,068 A | 10/1999 | Dehdashtian et al. |
| 6,027,525 A | 2/2000 | Suh et al. |
| 6,042,607 A | 3/2000 | Williamson, IV et al. |
| 6,051,022 A | 4/2000 | Cai et al. |
| 6,086,612 A | 7/2000 | Jansen |
| 6,096,075 A | 8/2000 | Bokros et al. |
| 6,113,631 A | 9/2000 | Jansen |
| 6,120,534 A * | 9/2000 | Ruiz ................ A61F 2/86 623/1.3 |
| 6,132,473 A | 10/2000 | Williams et al. |
| 6,168,614 B1 | 1/2001 | Andersen et al. |
| 6,171,335 B1 | 1/2001 | Wheatley et al. |
| 6,174,327 B1 | 1/2001 | Mertens et al. |
| 6,210,408 B1 | 4/2001 | Chandrasekaran et al. |
| 6,210,432 B1 | 4/2001 | Solem et al. |
| 6,217,585 B1 | 4/2001 | Houser et al. |
| 6,221,091 B1 | 4/2001 | Khosravi |
| 6,231,602 B1 | 5/2001 | Carpentier et al. |
| 6,245,040 B1 | 6/2001 | Inderbitzen et al. |
| 6,245,102 B1 | 6/2001 | Jayaraman |
| 6,251,093 B1 | 6/2001 | Valley et al. |
| 6,287,334 B1 | 9/2001 | Moll et al. |
| 6,287,339 B1 | 9/2001 | Vazquez et al. |
| 6,296,663 B1 | 10/2001 | Patke et al. |
| 6,299,637 B1 | 10/2001 | Shaolian et al. |
| 6,302,906 B1 | 10/2001 | Goecoechea et al. |
| 6,306,141 B1 | 10/2001 | Jervis |
| 6,312,464 B1 | 11/2001 | Navia |
| 6,312,465 B1 | 11/2001 | Griffin et al. |
| 6,332,893 B1 | 12/2001 | Mortier et al. |
| 6,338,740 B1 | 1/2002 | Carpentier |
| 6,350,277 B1 | 2/2002 | Kocur |
| 6,358,277 B1 | 3/2002 | Duran |
| 6,379,372 B1 | 4/2002 | Dehdashtian et al. |
| 6,419,695 B1 | 7/2002 | Gabbay |
| 6,425,916 B1 | 7/2002 | Garrison et al. |
| 6,440,164 B1 | 8/2002 | DiMatteo et al. |
| 6,445,630 B2 | 9/2002 | Ayadi et al. |
| 6,454,799 B1 | 9/2002 | Schreck |
| 6,458,153 B1 | 10/2002 | Bailey et al. |
| 6,461,382 B1 | 10/2002 | Cao |
| 6,468,660 B2 | 10/2002 | Ogle et al. |
| 6,482,228 B1 | 11/2002 | Norred |
| 6,485,489 B2 | 11/2002 | Teirstein et al. |
| 6,488,704 B1 | 12/2002 | Connelly et al. |
| 6,527,800 B1 | 3/2003 | McGuckin, Jr. et al. |
| 6,527,979 B2 | 3/2003 | Constantz |
| 6,537,314 B2 | 3/2003 | Langberg et al. |
| 6,540,782 B1 | 4/2003 | Snyders |
| 6,569,196 B1 | 5/2003 | Vesely |
| 6,569,198 B1 | 5/2003 | Wilson et al. |
| 6,575,959 B1 | 6/2003 | Sarge et al. |
| 6,582,462 B1 | 6/2003 | Andersen et al. |
| 6,602,288 B1 | 8/2003 | Cosgrove et al. |
| 6,605,112 B1 | 8/2003 | Moll et al. |
| 6,610,088 B1 | 8/2003 | Gabbay |
| 6,616,684 B1 | 9/2003 | Vidlund et al. |
| 6,629,534 B1 | 10/2003 | St. Goar et al. |
| 6,652,578 B2 | 11/2003 | Bailey et al. |
| 6,676,698 B2 | 1/2004 | McGuckin, Jr. et al. |
| 6,695,878 B2 | 2/2004 | McGuckin, Jr. et al. |
| 6,709,456 B2 | 3/2004 | Langberg et al. |
| 6,712,836 B1 | 3/2004 | Berg et al. |
| 6,716,207 B2 | 4/2004 | Farnholtz |
| 6,719,781 B1 * | 4/2004 | Kim ................ A61F 2/958 623/1.13 |
| 6,719,790 B2 | 4/2004 | Brendzel et al. |
| 6,723,038 B1 | 4/2004 | Schroeder et al. |
| 6,723,123 B1 | 4/2004 | Kazatchkov et al. |
| 6,729,356 B1 | 5/2004 | Baker et al. |
| 6,730,118 B2 * | 5/2004 | Spenser ............. A61F 2/9524 623/1.24 |
| 6,730,121 B2 | 5/2004 | Ortiz et al. |
| 6,733,525 B2 | 5/2004 | Yang et al. |
| 6,746,422 B1 | 6/2004 | Noriega et al. |
| 6,749,560 B1 | 6/2004 | Konstorum et al. |
| 6,752,813 B2 | 6/2004 | Goldfarb et al. |
| 6,764,510 B2 | 7/2004 | Vidlund et al. |
| 6,767,362 B2 | 7/2004 | Schreck |
| 6,780,200 B2 | 8/2004 | Jansen |
| 6,790,229 B1 | 9/2004 | Berreklouw |
| 6,790,230 B2 | 9/2004 | Beyersdorf et al. |
| 6,790,231 B2 | 9/2004 | Liddicoat et al. |
| 6,797,002 B2 | 9/2004 | Spence et al. |
| 6,821,297 B2 | 11/2004 | Snyders |
| 6,830,584 B1 | 12/2004 | Seguin |
| 6,869,444 B2 | 3/2005 | Gabbay |
| 6,875,224 B2 | 4/2005 | Grimes |
| 6,875,231 B2 | 4/2005 | Anduiza et al. |
| 6,893,460 B2 | 5/2005 | Spenser et al. |
| 6,908,481 B2 | 6/2005 | Cribier |
| 6,974,476 B2 | 12/2005 | McGuckin, Jr. et al. |
| 7,004,958 B2 | 2/2006 | Adams et al. |
| 7,011,669 B2 | 3/2006 | Kimblad |
| 7,018,406 B2 | 3/2006 | Seguin et al. |
| 7,101,395 B2 | 9/2006 | Tremulis et al. |
| 7,160,322 B2 | 1/2007 | Gabbay |
| 7,175,656 B2 | 2/2007 | Khairkhahan |
| 7,186,265 B2 | 3/2007 | Sharkawy et al. |
| 7,192,440 B2 | 3/2007 | Andreas et al. |
| 7,198,646 B2 | 4/2007 | Figulla et al. |
| 7,201,772 B2 | 4/2007 | Schwammenthal et al. |
| 7,217,287 B2 | 5/2007 | Wilson et al. |
| 7,226,467 B2 | 6/2007 | Lucatero et al. |
| 7,252,682 B2 | 8/2007 | Seguin |
| 7,276,078 B2 | 10/2007 | Spenser et al. |
| 7,276,084 B2 | 10/2007 | Yang et al. |
| 7,291,168 B2 | 11/2007 | Macoviak et al. |
| 7,318,278 B2 | 1/2008 | Zhang et al. |
| 7,374,571 B2 | 5/2008 | Pease et al. |
| 7,381,210 B2 | 6/2008 | Zarbatany et al. |
| 7,381,219 B2 | 6/2008 | Salahieh et al. |
| 7,381,220 B2 | 6/2008 | Macoviak et al. |
| 7,393,360 B2 | 7/2008 | Spenser et al. |
| 7,404,824 B1 | 7/2008 | Webler et al. |
| 7,429,269 B2 | 9/2008 | Schwammenthal et al. |
| 7,442,204 B2 | 10/2008 | Schwammenthal et al. |
| 7,445,630 B2 | 11/2008 | Lashinski et al. |
| 7,445,631 B2 | 11/2008 | Salahieh et al. |
| 7,462,191 B2 | 12/2008 | Spenser et al. |
| 7,510,575 B2 | 3/2009 | Spenser et al. |
| 7,524,330 B2 | 4/2009 | Berreklouw |
| 7,530,253 B2 | 5/2009 | Spenser et al. |
| 7,553,324 B2 | 6/2009 | Andreas et al. |
| 7,556,145 B2 | 7/2009 | Elsner |
| 7,556,645 B2 | 7/2009 | Lashinski et al. |
| 7,559,936 B2 | 7/2009 | Levine |

(56) References Cited

U.S. PATENT DOCUMENTS

| | | |
|---|---|---|
| 7,579,381 B2 | 8/2009 | Dove |
| 7,585,321 B2 | 9/2009 | Cribier |
| 7,618,446 B2 | 11/2009 | Andersen et al. |
| 7,621,948 B2 | 11/2009 | Herrmann et al. |
| 7,678,145 B2 | 3/2010 | Vidlund et al. |
| 7,682,390 B2 | 3/2010 | Seguin |
| 7,704,222 B2 | 4/2010 | Wilk et al. |
| 7,736,327 B2 | 6/2010 | Wilk et al. |
| 7,748,389 B2 | 7/2010 | Salahieh et al. |
| 7,753,949 B2 | 7/2010 | Lamphere et al. |
| 7,758,596 B2 | 7/2010 | Oz et al. |
| 7,806,919 B2 | 10/2010 | Bloom et al. |
| 7,824,443 B2 | 11/2010 | Salahieh et al. |
| 7,837,727 B2 | 11/2010 | Goetz et al. |
| 7,892,281 B2 | 2/2011 | Seguin et al. |
| 7,914,569 B2 | 3/2011 | Nguyen et al. |
| 7,914,575 B2 | 3/2011 | Guyenot et al. |
| 7,942,928 B2 | 5/2011 | Webler et al. |
| 7,959,672 B2 | 6/2011 | Salahieh et al. |
| 7,972,378 B2 | 7/2011 | Tabor et al. |
| 7,981,151 B2 | 7/2011 | Rowe |
| 7,993,392 B2 | 8/2011 | Righini et al. |
| 7,993,394 B2 | 8/2011 | Hariton et al. |
| 8,007,992 B2 | 8/2011 | Tian et al. |
| 8,016,877 B2 | 9/2011 | Seguin et al. |
| 8,029,556 B2 | 10/2011 | Rowe |
| 8,052,750 B2 | 11/2011 | Tuval et al. |
| 8,052,751 B2 | 11/2011 | Aklog et al. |
| 8,070,800 B2 | 12/2011 | Lock et al. |
| 8,070,802 B2 | 12/2011 | Lamphere et al. |
| 8,075,615 B2 | 12/2011 | Eberhardt et al. |
| 8,080,054 B2 | 12/2011 | Rowe |
| 8,092,520 B2 | 1/2012 | Quadri |
| 8,092,521 B2 | 1/2012 | Figulla et al. |
| 8,109,996 B2 | 2/2012 | Stacchino et al. |
| 8,118,866 B2 | 2/2012 | Herrmann et al. |
| 8,136,218 B2 | 3/2012 | Millwee et al. |
| 8,137,398 B2 | 3/2012 | Tuval et al. |
| 8,157,852 B2 | 4/2012 | Bloom et al. |
| 8,167,932 B2 | 5/2012 | Bourang |
| 8,167,934 B2 | 5/2012 | Styrc et al. |
| 8,172,856 B2 | 5/2012 | Eigler et al. |
| 8,182,530 B2 | 5/2012 | Huber |
| 8,206,437 B2 | 6/2012 | Bonhoeffer et al. |
| 8,216,174 B2 | 7/2012 | Wilk et al. |
| 8,216,301 B2 | 7/2012 | Bonhoeffer et al. |
| 8,219,229 B2 | 7/2012 | Cao et al. |
| 8,220,121 B2 | 7/2012 | Hendriksen et al. |
| 8,236,045 B2 | 8/2012 | Benichou et al. |
| 8,246,675 B2 | 8/2012 | Zegdi |
| 8,246,678 B2 | 8/2012 | Salahieh et al. |
| 8,252,051 B2 | 8/2012 | Chau et al. |
| 8,252,052 B2 | 8/2012 | Salahieh et al. |
| 8,287,584 B2 | 10/2012 | Salahieh et al. |
| 8,313,525 B2 | 11/2012 | Tuval et al. |
| 8,317,858 B2 | 11/2012 | Straubinger et al. |
| 8,323,335 B2 | 12/2012 | Rowe et al. |
| 8,337,541 B2 | 12/2012 | Quadri et al. |
| 8,348,963 B2 | 1/2013 | Wilson |
| 8,353,953 B2 | 1/2013 | Giannetti et al. |
| 8,398,704 B2 | 3/2013 | Straubinger et al. |
| 8,403,983 B2 | 3/2013 | Quadri et al. |
| 8,414,643 B2 * | 4/2013 | Tuval ................ A61F 2/2409 623/2.38 |
| 8,414,644 B2 | 4/2013 | Quadri et al. |
| 8,414,645 B2 | 4/2013 | Dwork et al. |
| 8,416,643 B2 | 4/2013 | Magee |
| 8,444,689 B2 | 5/2013 | Zhang |
| 8,449,599 B2 | 5/2013 | Chau et al. |
| 8,454,685 B2 | 6/2013 | Hariton et al. |
| 8,460,368 B2 | 6/2013 | Taylor et al. |
| 8,460,370 B2 | 6/2013 | Zakay |
| 8,470,023 B2 | 6/2013 | Eidenschink et al. |
| 8,470,028 B2 | 6/2013 | Thornton et al. |
| 8,475,521 B2 | 7/2013 | Suri et al. |
| 8,475,523 B2 | 7/2013 | Duffy |
| 8,479,380 B2 | 7/2013 | Malewicz et al. |
| 8,491,650 B2 | 7/2013 | Wiemeyer et al. |
| 8,500,733 B2 | 8/2013 | Watson |
| 8,500,798 B2 | 8/2013 | Rowe et al. |
| 8,511,244 B2 | 8/2013 | Holecek et al. |
| 8,512,401 B2 | 8/2013 | Murray, III et al. |
| 8,518,096 B2 | 8/2013 | Nelson |
| 8,518,106 B2 | 8/2013 | Duffy et al. |
| 8,562,663 B2 | 10/2013 | Mearns et al. |
| 8,579,963 B2 | 11/2013 | Tabor |
| 8,579,964 B2 * | 11/2013 | Lane .................... A61F 2/2409 623/2.11 |
| 8,591,570 B2 | 11/2013 | Revuelta et al. |
| 8,617,236 B2 | 12/2013 | Paul et al. |
| 8,640,521 B2 | 2/2014 | Righini et al. |
| 8,647,381 B2 | 2/2014 | Essinger et al. |
| 8,652,145 B2 | 2/2014 | Maimon et al. |
| 8,652,201 B2 | 2/2014 | Oberti et al. |
| 8,652,202 B2 | 2/2014 | Alon et al. |
| 8,652,203 B2 | 2/2014 | Quadri et al. |
| 8,668,733 B2 | 3/2014 | Haug et al. |
| 8,679,174 B2 | 3/2014 | Ottma et al. |
| 8,679,404 B2 | 3/2014 | Liburd et al. |
| 8,685,086 B2 | 4/2014 | Navia et al. |
| 8,721,708 B2 | 5/2014 | Seguin et al. |
| 8,721,714 B2 | 5/2014 | Kelley |
| 8,728,154 B2 | 5/2014 | Alkhatib |
| 8,728,155 B2 | 5/2014 | Montorfano et al. |
| 8,740,974 B2 | 6/2014 | Lambrecht et al. |
| 8,740,976 B2 | 6/2014 | Tran et al. |
| 8,747,458 B2 | 6/2014 | Tuval et al. |
| 8,747,459 B2 | 6/2014 | Nguyen et al. |
| 8,758,432 B2 | 6/2014 | Solem |
| 8,764,818 B2 | 7/2014 | Gregg |
| 8,771,344 B2 | 7/2014 | Tran et al. |
| 8,778,020 B2 | 7/2014 | Gregg et al. |
| 8,784,337 B2 | 7/2014 | Voeller et al. |
| 8,784,478 B2 | 7/2014 | Tuval et al. |
| 8,784,481 B2 | 7/2014 | Alkhatib et al. |
| 8,784,482 B2 | 7/2014 | Rahdert et al. |
| 8,790,387 B2 | 7/2014 | Nguyen et al. |
| 8,795,357 B2 | 8/2014 | Yohanan et al. |
| 8,808,356 B2 | 8/2014 | Braido et al. |
| 8,828,078 B2 | 9/2014 | Salahieh et al. |
| 8,828,079 B2 | 9/2014 | Thielen et al. |
| 8,834,564 B2 | 9/2014 | Tuval et al. |
| 8,858,620 B2 | 10/2014 | Salahieh et al. |
| 8,870,948 B1 | 10/2014 | Erzberger et al. |
| 8,870,950 B2 | 10/2014 | Hacohen |
| 8,876,893 B2 | 11/2014 | Dwork et al. |
| 8,911,455 B2 | 12/2014 | Quadri et al. |
| 8,926,693 B2 | 1/2015 | Duffy et al. |
| 8,926,694 B2 | 1/2015 | Costello |
| 8,932,348 B2 | 1/2015 | Solem et al. |
| 8,939,960 B2 | 1/2015 | Rosenman et al. |
| 8,945,209 B2 | 2/2015 | Bonyuet et al. |
| 8,961,593 B2 | 2/2015 | Bonhoeffer et al. |
| 8,961,595 B2 | 2/2015 | Alkhatib |
| 8,974,524 B2 | 3/2015 | Yeung et al. |
| 8,979,922 B2 | 3/2015 | Jayasinghe et al. |
| 8,986,375 B2 | 3/2015 | Garde et al. |
| 8,992,604 B2 * | 3/2015 | Gross .................... A61F 2/2412 623/2.11 |
| 8,998,980 B2 | 4/2015 | Shipley et al. |
| 9,005,273 B2 | 4/2015 | Salahieh et al. |
| 9,011,521 B2 | 4/2015 | Haug et al. |
| 9,011,523 B2 | 4/2015 | Seguin |
| 9,011,524 B2 | 4/2015 | Eberhardt |
| 9,028,545 B2 | 5/2015 | Taylor |
| 9,034,032 B2 | 5/2015 | McLean et al. |
| 9,034,033 B2 * | 5/2015 | McLean ............... A61F 2/2436 623/2.12 |
| 9,055,937 B2 | 6/2015 | Rowe et al. |
| 9,066,801 B2 * | 6/2015 | Kovalsky ............. A61F 2/2418 |
| 9,078,749 B2 * | 7/2015 | Lutter .................. A61F 2/2418 |
| 9,078,751 B2 * | 7/2015 | Naor .................... A61F 2/2412 |
| 9,125,738 B2 | 9/2015 | Figulla et al. |
| 9,173,737 B2 | 11/2015 | Hill et al. |

(56) References Cited

U.S. PATENT DOCUMENTS

| | | |
|---|---|---|
| 9,180,004 B2 | 11/2015 | Alkhatib |
| 9,186,249 B2 | 11/2015 | Rolando et al. |
| 9,241,792 B2 | 1/2016 | Benichou et al. |
| 9,277,990 B2 | 3/2016 | Klima et al. |
| 9,277,993 B2 | 3/2016 | Gamarra et al. |
| 9,289,291 B2 | 3/2016 | Gorman, III et al. |
| 9,295,551 B2 | 3/2016 | Straubinger et al. |
| 9,308,087 B2* | 4/2016 | Lane ............... A61F 2/2403 |
| 9,427,316 B2* | 8/2016 | Schweich, Jr. ....... A61F 2/2466 |
| 9,445,897 B2 | 9/2016 | Bishop et al. |
| 9,456,877 B2 | 10/2016 | Weitzner et al. |
| 9,486,306 B2* | 11/2016 | Tegels ............... A61F 2/2418 |
| 9,566,152 B2* | 2/2017 | Schweich, Jr. ....... A61F 2/2466 |
| 9,572,665 B2* | 2/2017 | Lane ............... A61N 1/056 |
| 9,579,193 B2* | 2/2017 | Rafiee ............... A61F 2/2418 |
| 9,592,121 B1* | 3/2017 | Khairkhahan ....... A61B 17/064 |
| 9,597,181 B2* | 3/2017 | Christianson ....... A61F 2/2448 |
| 9,610,159 B2* | 4/2017 | Christianson ....... A61F 2/2415 |
| 9,675,454 B2* | 6/2017 | Vidlund ............... A61F 2/2427 |
| 9,681,968 B2 | 6/2017 | Goetz et al. |
| 9,687,342 B2* | 6/2017 | Figulla ............... A61F 2/2418 |
| 9,687,345 B2 | 6/2017 | Rabito et al. |
| 9,700,329 B2 | 7/2017 | Metzger et al. |
| 9,700,411 B2 | 7/2017 | Klima et al. |
| 9,724,083 B2 | 8/2017 | Quadri et al. |
| 9,730,790 B2 | 8/2017 | Quadri et al. |
| 9,730,791 B2* | 8/2017 | Ratz ............... A61F 2/2418 |
| 9,750,606 B2* | 9/2017 | Ganesan ............... A61F 2/2418 |
| 9,795,479 B2 | 10/2017 | Lim et al. |
| 9,827,092 B2* | 11/2017 | Vidlund ............... A61F 2/2439 |
| 9,833,313 B2 | 12/2017 | Board et al. |
| 9,861,473 B2 | 1/2018 | Lafontaine |
| 9,861,476 B2 | 1/2018 | Salahieh et al. |
| 9,861,477 B2 | 1/2018 | Backus et al. |
| 9,867,698 B2 | 1/2018 | Kovalsky et al. |
| 9,877,830 B2 | 1/2018 | Lim et al. |
| 9,889,029 B2 | 2/2018 | Li et al. |
| 9,895,221 B2* | 2/2018 | Vidlund ............... A61F 2/2439 |
| 9,895,225 B2* | 2/2018 | Rolando ............... A61F 2/2409 |
| 9,925,045 B2 | 3/2018 | Creaven et al. |
| 9,974,651 B2* | 5/2018 | Hariton ............... A61F 2/2418 |
| 9,986,993 B2* | 6/2018 | Vidlund ............... A61F 2/2457 |
| 10,004,599 B2* | 6/2018 | Rabito ............... A61F 2/2439 |
| 10,092,400 B2* | 10/2018 | Jimenez ............... A61F 2/2418 |
| 10,117,744 B2* | 11/2018 | Ratz ............... A61F 2/2418 |
| 10,179,044 B2* | 1/2019 | Ratz ............... A61F 2/2445 |
| 10,219,897 B2 | 3/2019 | Essinger et al. |
| 10,226,335 B2* | 3/2019 | Cartledge ............... A61F 2/2418 |
| 10,265,172 B2* | 4/2019 | Krivoruchko ......... A61F 2/2457 |
| 10,292,816 B2* | 5/2019 | Raanani ............... A61F 2/2436 |
| 10,350,065 B2 | 7/2019 | Quadri |
| 10,350,066 B2 | 7/2019 | Cooper et al. |
| 10,376,363 B2 | 8/2019 | Quadri et al. |
| 10,555,809 B2 | 2/2020 | Hastings et al. |
| 10,575,951 B2 | 3/2020 | Johnson et al. |
| 10,583,000 B2 | 3/2020 | Ratz et al. |
| 10,639,146 B2 | 5/2020 | Quadri et al. |
| 10,695,177 B2 | 6/2020 | Hariton et al. |
| 10,758,344 B2 | 9/2020 | Hariton et al. |
| 11,406,499 B2 | 8/2022 | Zhang et al. |
| 11,426,155 B2* | 8/2022 | Hacohen ............... A61F 2/2409 |
| 11,452,598 B2 | 9/2022 | Essinger et al. |
| 11,571,298 B2* | 2/2023 | Hariton ............... A61F 2/24 |
| 11,672,658 B2 | 6/2023 | Hariton et al. |
| 11,701,225 B2 | 7/2023 | Hammer et al. |
| 11,903,829 B1 | 2/2024 | Ma et al. |
| 2001/0018611 A1 | 8/2001 | Solem et al. |
| 2001/0021872 A1* | 9/2001 | Bailey ............... A61F 2/07 623/1.26 |
| 2002/0032481 A1 | 3/2002 | Gabbay |
| 2002/0045929 A1 | 4/2002 | Diaz |
| 2002/0052644 A1 | 5/2002 | Shaolian et al. |
| 2002/0055774 A1* | 5/2002 | Liddicoat ............... A61F 2/2409 623/2.38 |
| 2002/0107565 A1 | 8/2002 | Greenhalgh |
| 2002/0123802 A1 | 9/2002 | Snyders |
| 2002/0128708 A1 | 9/2002 | Northrup et al. |
| 2002/0151970 A1* | 10/2002 | Garrison ............... A61F 2/2433 623/2.14 |
| 2002/0173842 A1 | 11/2002 | Buchanan |
| 2002/0198595 A1 | 12/2002 | Brendzel et al. |
| 2003/0014104 A1 | 1/2003 | Cribier |
| 2003/0023300 A1 | 1/2003 | Bailey et al. |
| 2003/0036791 A1* | 2/2003 | Philipp ............... A61F 2/2418 623/1.11 |
| 2003/0036795 A1 | 2/2003 | Andersen et al. |
| 2003/0050694 A1 | 3/2003 | Yang et al. |
| 2003/0078654 A1 | 4/2003 | Taylor et al. |
| 2003/0100939 A1 | 5/2003 | Yodfat et al. |
| 2003/0105517 A1 | 6/2003 | White et al. |
| 2003/0114913 A1 | 6/2003 | Spenser et al. |
| 2003/0120333 A1 | 6/2003 | Ouriel et al. |
| 2003/0130729 A1 | 7/2003 | Paniagua et al. |
| 2003/0149477 A1 | 8/2003 | Gabbay |
| 2003/0149478 A1 | 8/2003 | Figulla et al. |
| 2003/0158597 A1 | 8/2003 | Quiachon et al. |
| 2003/0176914 A1 | 9/2003 | Rabkin et al. |
| 2003/0199971 A1 | 10/2003 | Tower et al. |
| 2003/0212454 A1 | 11/2003 | Scott et al. |
| 2003/0220683 A1 | 11/2003 | Minasian et al. |
| 2003/0236568 A1* | 12/2003 | Hojeibane ............... A61F 2/2415 623/2.18 |
| 2004/0019378 A1 | 1/2004 | Hlavka et al. |
| 2004/0024414 A1 | 2/2004 | Downing |
| 2004/0039436 A1 | 2/2004 | Spenser et al. |
| 2004/0039442 A1 | 2/2004 | St. Goar et al. |
| 2004/0092858 A1 | 5/2004 | Wilson et al. |
| 2004/0093060 A1 | 5/2004 | Seguin et al. |
| 2004/0093075 A1 | 5/2004 | Kuehne |
| 2004/0106976 A1 | 6/2004 | Bailey et al. |
| 2004/0117009 A1 | 6/2004 | Cali et al. |
| 2004/0117032 A1 | 6/2004 | Roth |
| 2004/0133263 A1 | 7/2004 | Dusbabek et al. |
| 2004/0133273 A1 | 7/2004 | Cox |
| 2004/0152947 A1 | 8/2004 | Schroeder et al. |
| 2004/0167539 A1 | 8/2004 | Kuehn et al. |
| 2004/0186563 A1 | 9/2004 | Lobbi |
| 2004/0186565 A1 | 9/2004 | Schreck |
| 2004/0193259 A1 | 9/2004 | Gabbay |
| 2004/0210307 A1 | 10/2004 | Khairkhahan |
| 2004/0215325 A1 | 10/2004 | Penn et al. |
| 2004/0225353 A1 | 11/2004 | McGuckin et al. |
| 2004/0225354 A1 | 11/2004 | Allen et al. |
| 2004/0225355 A1 | 11/2004 | Stevens |
| 2004/0236411 A1 | 11/2004 | Sarac et al. |
| 2004/0260389 A1 | 12/2004 | Case et al. |
| 2005/0033398 A1 | 2/2005 | Seguin |
| 2005/0038509 A1 | 2/2005 | Ashe |
| 2005/0043790 A1 | 2/2005 | Seguin |
| 2005/0070999 A1 | 3/2005 | Spence |
| 2005/0075719 A1 | 4/2005 | Bergheim |
| 2005/0075727 A1* | 4/2005 | Wheatley ............... A61F 2/2457 623/902 |
| 2005/0090887 A1 | 4/2005 | Pryor |
| 2005/0096738 A1 | 5/2005 | Cali et al. |
| 2005/0107872 A1 | 5/2005 | Mensah et al. |
| 2005/0137682 A1 | 6/2005 | Justino |
| 2005/0137686 A1 | 6/2005 | Salahieh et al. |
| 2005/0137687 A1 | 6/2005 | Salahieh et al. |
| 2005/0137688 A1 | 6/2005 | Salahieh et al. |
| 2005/0137691 A1 | 6/2005 | Salahieh et al. |
| 2005/0137698 A1 | 6/2005 | Salahieh et al. |
| 2005/0159811 A1 | 7/2005 | Lane |
| 2005/0182486 A1 | 8/2005 | Gabbay |
| 2005/0203614 A1 | 9/2005 | Forster et al. |
| 2005/0203617 A1 | 9/2005 | Forster et al. |
| 2005/0216079 A1 | 9/2005 | MaCoviak |
| 2005/0234546 A1 | 10/2005 | Nugent et al. |
| 2005/0288766 A1 | 12/2005 | Plain et al. |
| 2006/0020327 A1 | 1/2006 | Lashinski et al. |
| 2006/0020332 A1 | 1/2006 | Lashinski et al. |
| 2006/0020333 A1 | 1/2006 | Lashinski et al. |
| 2006/0025854 A1 | 2/2006 | Lashinski et al. |
| 2006/0025855 A1 | 2/2006 | Lashinski et al. |

(56) References Cited

U.S. PATENT DOCUMENTS

| | | |
|---|---|---|
| 2006/0025857 A1 | 2/2006 | Bergheim et al. |
| 2006/0058872 A1 | 3/2006 | Salahieh et al. |
| 2006/0095115 A1 | 5/2006 | Bladillah et al. |
| 2006/0122686 A1* | 6/2006 | Gilad .................. A61F 2/2418 623/1.13 |
| 2006/0142837 A1 | 6/2006 | Haverkost et al. |
| 2006/0149350 A1 | 7/2006 | Patel et al. |
| 2006/0161249 A1 | 7/2006 | Realyvasquez et al. |
| 2006/0173537 A1 | 8/2006 | Yang et al. |
| 2006/0195134 A1 | 8/2006 | Crittenden |
| 2006/0195183 A1* | 8/2006 | Navia .................. A61F 2/2418 623/2.11 |
| 2006/0206202 A1 | 9/2006 | Bonhoeffer et al. |
| 2006/0212110 A1 | 9/2006 | Osborne et al. |
| 2006/0229719 A1 | 10/2006 | Marquez et al. |
| 2006/0241745 A1 | 10/2006 | Solem |
| 2006/0247680 A1* | 11/2006 | Amplatz .......... A61B 17/12172 606/213 |
| 2006/0259135 A1 | 11/2006 | Navia et al. |
| 2006/0259136 A1* | 11/2006 | Nguyen ................. A61F 2/2412 623/2.18 |
| 2006/0259137 A1 | 11/2006 | Artof et al. |
| 2006/0276874 A1 | 12/2006 | Wilson et al. |
| 2006/0287717 A1 | 12/2006 | Rowe et al. |
| 2006/0293745 A1 | 12/2006 | Carpentier et al. |
| 2007/0005131 A1 | 1/2007 | Taylor |
| 2007/0010877 A1 | 1/2007 | Salahieh et al. |
| 2007/0016286 A1 | 1/2007 | Herrmann et al. |
| 2007/0016288 A1 | 1/2007 | Gurskis et al. |
| 2007/0027534 A1 | 2/2007 | Bergheim et al. |
| 2007/0043435 A1 | 2/2007 | Seguin et al. |
| 2007/0050021 A1 | 3/2007 | Johnson |
| 2007/0061010 A1* | 3/2007 | Hauser .................. A61F 2/2445 623/1.36 |
| 2007/0066863 A1 | 3/2007 | Rafiee et al. |
| 2007/0088431 A1 | 4/2007 | Bourang et al. |
| 2007/0093890 A1 | 4/2007 | Eliasen et al. |
| 2007/0100432 A1 | 5/2007 | Case et al. |
| 2007/0100439 A1 | 5/2007 | Cangialosi et al. |
| 2007/0112422 A1 | 5/2007 | Dehdashtian |
| 2007/0129794 A1 | 6/2007 | Realyvasquez |
| 2007/0142906 A1 | 6/2007 | Figulla et al. |
| 2007/0156224 A1 | 7/2007 | Cioanta et al. |
| 2007/0162107 A1 | 7/2007 | Haug et al. |
| 2007/0203503 A1 | 8/2007 | Salahieh et al. |
| 2007/0203575 A1 | 8/2007 | Forster et al. |
| 2007/0213813 A1 | 9/2007 | Von Segesser et al. |
| 2007/0255394 A1 | 11/2007 | Ryan |
| 2007/0270943 A1 | 11/2007 | Solem et al. |
| 2007/0282429 A1 | 12/2007 | Hauser et al. |
| 2008/0021546 A1 | 1/2008 | Patz et al. |
| 2008/0065011 A1 | 3/2008 | Marchand et al. |
| 2008/0071361 A1 | 3/2008 | Tuval et al. |
| 2008/0071362 A1 | 3/2008 | Tuval et al. |
| 2008/0071363 A1 | 3/2008 | Tuval et al. |
| 2008/0071366 A1 | 3/2008 | Tuval et al. |
| 2008/0071368 A1 | 3/2008 | Tuval et al. |
| 2008/0071369 A1 | 3/2008 | Tuval et al. |
| 2008/0082164 A1 | 4/2008 | Friedman |
| 2008/0082165 A1 | 4/2008 | Wilson et al. |
| 2008/0082166 A1 | 4/2008 | Styrc et al. |
| 2008/0097581 A1 | 4/2008 | Shanley |
| 2008/0114442 A1 | 5/2008 | Mitchell et al. |
| 2008/0125853 A1 | 5/2008 | Bailey et al. |
| 2008/0125861 A1* | 5/2008 | Webler ................. A61B 17/064 623/2.36 |
| 2008/0147179 A1 | 6/2008 | Cai et al. |
| 2008/0147183 A1 | 6/2008 | Styrc |
| 2008/0154355 A1 | 6/2008 | Benichou et al. |
| 2008/0161910 A1 | 7/2008 | Revuelta et al. |
| 2008/0177381 A1 | 7/2008 | Navia et al. |
| 2008/0183273 A1 | 7/2008 | Mesana et al. |
| 2008/0208328 A1 | 8/2008 | Antocci et al. |
| 2008/0208332 A1 | 8/2008 | Lamphere et al. |
| 2008/0221672 A1 | 9/2008 | Lamphere et al. |
| 2008/0228254 A1 | 9/2008 | Ryan |
| 2008/0243245 A1 | 10/2008 | Thambar et al. |
| 2008/0255660 A1 | 10/2008 | Guyenot et al. |
| 2008/0255661 A1 | 10/2008 | Straubinger et al. |
| 2008/0281411 A1 | 11/2008 | Berreklouw |
| 2009/0005863 A1 | 1/2009 | Goetz et al. |
| 2009/0054968 A1 | 2/2009 | Bonhoeffer et al. |
| 2009/0054974 A1 | 2/2009 | McGuckin, Jr. et al. |
| 2009/0076598 A1 | 3/2009 | Salahieh et al. |
| 2009/0112309 A1 | 4/2009 | Jaramillo et al. |
| 2009/0131880 A1 | 5/2009 | Speziali et al. |
| 2009/0138079 A1 | 5/2009 | Tuval et al. |
| 2009/0157175 A1 | 6/2009 | Benichou |
| 2009/0164005 A1 | 6/2009 | Dove et al. |
| 2009/0171432 A1 | 7/2009 | Von Segesser et al. |
| 2009/0171447 A1 | 7/2009 | Von Segesser et al. |
| 2009/0171456 A1 | 7/2009 | Kveen et al. |
| 2009/0182413 A1 | 7/2009 | Burkart et al. |
| 2009/0188964 A1 | 7/2009 | Orlov |
| 2009/0216310 A1 | 8/2009 | Straubinger et al. |
| 2009/0216313 A1 | 8/2009 | Straubinger et al. |
| 2009/0216322 A1 | 8/2009 | Le et al. |
| 2009/0222076 A1 | 9/2009 | Figulla et al. |
| 2009/0234443 A1 | 9/2009 | Ottma et al. |
| 2009/0240320 A1 | 9/2009 | Tuval et al. |
| 2009/0248149 A1 | 10/2009 | Gabbay |
| 2009/0270972 A1 | 10/2009 | Lane |
| 2009/0276027 A1 | 11/2009 | Glynn |
| 2009/0276040 A1* | 11/2009 | Rowe .................. A61L 27/3625 623/2.18 |
| 2009/0281618 A1* | 11/2009 | Hill ..................... A61F 2/2418 623/1.26 |
| 2009/0281619 A1 | 11/2009 | Le et al. |
| 2009/0287296 A1 | 11/2009 | Manasse |
| 2009/0287299 A1 | 11/2009 | Tabor et al. |
| 2009/0292350 A1 | 11/2009 | Eberhardt et al. |
| 2009/0306768 A1 | 12/2009 | Quadri |
| 2009/0319037 A1 | 12/2009 | Rowe et al. |
| 2010/0016958 A1 | 1/2010 | St. Goar et al. |
| 2010/0024818 A1 | 2/2010 | Stenzler et al. |
| 2010/0036479 A1* | 2/2010 | Hill ..................... A61F 2/2418 623/1.26 |
| 2010/0048987 A1* | 2/2010 | Khairkhahan ... A61B 17/12022 600/37 |
| 2010/0049313 A1 | 2/2010 | Alon et al. |
| 2010/0069852 A1 | 3/2010 | Kelley |
| 2010/0114305 A1 | 5/2010 | Kang et al. |
| 2010/0131054 A1 | 5/2010 | Tuval et al. |
| 2010/0137979 A1 | 6/2010 | Tuval et al. |
| 2010/0145438 A1 | 6/2010 | Barone |
| 2010/0168839 A1* | 7/2010 | Braido .................. A61F 2/2418 623/2.18 |
| 2010/0174362 A1 | 7/2010 | Straubinger et al. |
| 2010/0191326 A1 | 7/2010 | Alkhatib |
| 2010/0204781 A1 | 8/2010 | Alkhatib |
| 2010/0217382 A1 | 8/2010 | Chau et al. |
| 2010/0249894 A1 | 9/2010 | Oba et al. |
| 2010/0249911 A1 | 9/2010 | Alkhatib |
| 2010/0256723 A1 | 10/2010 | Murray |
| 2010/0262231 A1 | 10/2010 | Tuval et al. |
| 2010/0305685 A1 | 12/2010 | Millwee et al. |
| 2010/0312333 A1 | 12/2010 | Navia et al. |
| 2011/0015616 A1 | 1/2011 | Straubinger et al. |
| 2011/0015619 A1 | 1/2011 | Jimenez et al. |
| 2011/0029072 A1 | 2/2011 | Gabbay |
| 2011/0098802 A1* | 4/2011 | Braido .................. A61F 2/243 623/2.11 |
| 2011/0137397 A1* | 6/2011 | Chau .................... A61F 2/246 623/2.37 |
| 2011/0178597 A9 | 7/2011 | Navia et al. |
| 2011/0208290 A1 | 8/2011 | Straubinger et al. |
| 2011/0208297 A1 | 8/2011 | Tuval et al. |
| 2011/0208298 A1 | 8/2011 | Tuval et al. |
| 2011/0224785 A1* | 9/2011 | Hacohen ............... A61F 2/2427 623/2.18 |
| 2011/0238159 A1 | 9/2011 | Guyenot et al. |
| 2011/0264196 A1 | 10/2011 | Savage et al. |

(56) References Cited

U.S. PATENT DOCUMENTS

| | | |
|---|---|---|
| 2011/0264198 A1 | 10/2011 | Murray, III et al. |
| 2011/0288634 A1 | 11/2011 | Tuval et al. |
| 2011/0313515 A1 | 12/2011 | Quadri et al. |
| 2011/0319989 A1 | 12/2011 | Lane et al. |
| 2012/0022639 A1* | 1/2012 | Hacohen .............. A61F 2/2436 623/2.11 |
| 2012/0022640 A1* | 1/2012 | Gross .................. A61F 2/2427 623/2.11 |
| 2012/0035722 A1 | 2/2012 | Tuval |
| 2012/0041550 A1 | 2/2012 | Salahieh et al. |
| 2012/0046741 A1 | 2/2012 | Tuval et al. |
| 2012/0046742 A1 | 2/2012 | Tuval et al. |
| 2012/0078360 A1 | 3/2012 | Rafiee |
| 2012/0101570 A1 | 4/2012 | Tuval et al. |
| 2012/0101571 A1* | 4/2012 | Thambar ............ A61B 17/0057 623/2.17 |
| 2012/0101572 A1 | 4/2012 | Kovalsky et al. |
| 2012/0123529 A1 | 5/2012 | Levi et al. |
| 2012/0185039 A1 | 7/2012 | Tuval et al. |
| 2012/0197386 A1 | 8/2012 | Von Segesser et al. |
| 2012/0209374 A1 | 8/2012 | Bonhoeffer et al. |
| 2012/0215303 A1 | 8/2012 | Quadri et al. |
| 2012/0271398 A1 | 10/2012 | Essinger et al. |
| 2012/0283823 A1 | 11/2012 | Bonhoeffer et al. |
| 2012/0290062 A1 | 11/2012 | McNamara et al. |
| 2012/0296418 A1 | 11/2012 | Bonyuet et al. |
| 2012/0310328 A1 | 12/2012 | Olson et al. |
| 2012/0310336 A1 | 12/2012 | Figulla et al. |
| 2013/0006294 A1 | 1/2013 | Kashkarov et al. |
| 2013/0035759 A1 | 2/2013 | Gross et al. |
| 2013/0073035 A1 | 3/2013 | Tuval et al. |
| 2013/0079869 A1 | 3/2013 | Straubinger et al. |
| 2013/0172978 A1* | 7/2013 | Vidlund ............. A61B 17/0401 623/1.12 |
| 2013/0172992 A1 | 7/2013 | Gross et al. |
| 2013/0190861 A1 | 7/2013 | Chau et al. |
| 2013/0190862 A1 | 7/2013 | Pintor et al. |
| 2013/0197622 A1 | 8/2013 | Mitra et al. |
| 2013/0211508 A1 | 8/2013 | Lane et al. |
| 2013/0253635 A1 | 9/2013 | Straubinger et al. |
| 2013/0253642 A1 | 9/2013 | Brecker |
| 2013/0310928 A1 | 11/2013 | Morriss et al. |
| 2013/0331929 A1 | 12/2013 | Mitra et al. |
| 2013/0338766 A1 | 12/2013 | Hastings et al. |
| 2013/0345786 A1 | 12/2013 | Behan |
| 2014/0018912 A1 | 1/2014 | Delaloye et al. |
| 2014/0025163 A1 | 1/2014 | Padala et al. |
| 2014/0039611 A1 | 2/2014 | Lane et al. |
| 2014/0052237 A1 | 2/2014 | Lane et al. |
| 2014/0100651 A1 | 4/2014 | Kheradvar et al. |
| 2014/0163668 A1 | 6/2014 | Rafiee |
| 2014/0172077 A1 | 6/2014 | Bruchman et al. |
| 2014/0172083 A1 | 6/2014 | Bruchman et al. |
| 2014/0194981 A1 | 7/2014 | Menk et al. |
| 2014/0207231 A1* | 7/2014 | Hacohen ............. A61F 2/2436 623/2.11 |
| 2014/0214157 A1 | 7/2014 | Bortlein et al. |
| 2014/0222136 A1 | 8/2014 | Geist et al. |
| 2014/0222139 A1 | 8/2014 | Nguyen et al. |
| 2014/0222142 A1 | 8/2014 | Kovalsky et al. |
| 2014/0222144 A1 | 8/2014 | Eberhardt et al. |
| 2014/0243966 A1 | 8/2014 | Garde et al. |
| 2014/0249622 A1* | 9/2014 | Carmi ................. A61F 2/2418 623/2.11 |
| 2014/0257467 A1 | 9/2014 | Lane et al. |
| 2014/0277390 A1 | 9/2014 | Ratz et al. |
| 2014/0277403 A1 | 9/2014 | Peter |
| 2014/0277412 A1 | 9/2014 | Bortlein et al. |
| 2014/0277422 A1 | 9/2014 | Ratz et al. |
| 2014/0277426 A1 | 9/2014 | Dakin et al. |
| 2014/0277427 A1 | 9/2014 | Ratz et al. |
| 2014/0296973 A1 | 10/2014 | Bergheim et al. |
| 2014/0296975 A1* | 10/2014 | Tegels ................. A61F 2/07 623/2.18 |
| 2014/0303719 A1 | 10/2014 | Cox et al. |
| 2014/0309728 A1 | 10/2014 | Dehdashtian et al. |
| 2014/0324160 A1 | 10/2014 | Benichou et al. |
| 2014/0324164 A1 | 10/2014 | Gross et al. |
| 2014/0330368 A1 | 11/2014 | Gloss et al. |
| 2014/0330371 A1 | 11/2014 | Gloss et al. |
| 2014/0330372 A1 | 11/2014 | Weston et al. |
| 2014/0336754 A1 | 11/2014 | Gurskis et al. |
| 2014/0343669 A1 | 11/2014 | Lane et al. |
| 2014/0343670 A1 | 11/2014 | Bakis et al. |
| 2014/0350666 A1 | 11/2014 | Righini |
| 2014/0350668 A1 | 11/2014 | Delaloye et al. |
| 2014/0358223 A1 | 12/2014 | Rafiee et al. |
| 2014/0364939 A1 | 12/2014 | Deshmukh et al. |
| 2014/0364943 A1 | 12/2014 | Conklin |
| 2014/0364944 A1* | 12/2014 | Lutter .................. A61F 2/2487 623/2.17 |
| 2014/0371842 A1 | 12/2014 | Marquez et al. |
| 2014/0371844 A1 | 12/2014 | Dale et al. |
| 2014/0371847 A1 | 12/2014 | Madrid et al. |
| 2014/0371848 A1 | 12/2014 | Murray, III et al. |
| 2015/0005863 A1 | 1/2015 | Para |
| 2015/0018944 A1 | 1/2015 | O'Connell et al. |
| 2015/0039083 A1* | 2/2015 | Rafiee ................. A61B 17/0401 623/2.37 |
| 2015/0066140 A1* | 3/2015 | Quadri ................. A61F 2/2436 623/2.11 |
| 2015/0142100 A1 | 5/2015 | Morriss et al. |
| 2015/0142103 A1 | 5/2015 | Vidlund |
| 2015/0148731 A1 | 5/2015 | McNamara et al. |
| 2015/0173897 A1 | 6/2015 | Raanani et al. |
| 2015/0196390 A1 | 7/2015 | Ma et al. |
| 2015/0209141 A1 | 7/2015 | Braido et al. |
| 2015/0216661 A1* | 8/2015 | Hacohen ............. A61B 17/0401 623/2.37 |
| 2015/0272737 A1* | 10/2015 | Dale .................... A61F 2/2418 623/2.37 |
| 2015/0297346 A1 | 10/2015 | Duffy et al. |
| 2015/0335429 A1* | 11/2015 | Morriss ................ A61F 2/2436 623/2.4 |
| 2015/0351903 A1* | 12/2015 | Morriss ................ A61F 2/2418 623/2.11 |
| 2015/0359629 A1 | 12/2015 | Ganesan et al. |
| 2016/0000591 A1 | 1/2016 | Lei et al. |
| 2016/0030169 A1 | 2/2016 | Shahriari |
| 2016/0030170 A1 | 2/2016 | Alkhatib et al. |
| 2016/0030171 A1 | 2/2016 | Quijano et al. |
| 2016/0038280 A1 | 2/2016 | Morriss et al. |
| 2016/0038281 A1 | 2/2016 | Delaloye et al. |
| 2016/0074160 A1 | 3/2016 | Christianson et al. |
| 2016/0106537 A1 | 4/2016 | Christianson et al. |
| 2016/0113765 A1 | 4/2016 | Ganesan et al. |
| 2016/0113768 A1 | 4/2016 | Ganesan et al. |
| 2016/0143732 A1 | 5/2016 | Glimsdale |
| 2016/0143733 A1* | 5/2016 | Quadri ................. A61F 2/2439 623/2.18 |
| 2016/0158010 A1 | 6/2016 | Lim et al. |
| 2016/0166383 A1 | 6/2016 | Lim et al. |
| 2016/0184097 A1 | 6/2016 | Lim et al. |
| 2016/0199206 A1 | 7/2016 | Lim et al. |
| 2016/0213473 A1 | 7/2016 | Hacohen et al. |
| 2016/0235529 A1 | 8/2016 | Ma et al. |
| 2016/0278923 A1 | 9/2016 | Krans et al. |
| 2016/0279386 A1 | 9/2016 | Dale et al. |
| 2016/0310267 A1 | 10/2016 | Zeng et al. |
| 2017/0042678 A1 | 2/2017 | Ganesan et al. |
| 2017/0079785 A1* | 3/2017 | Li ........................ A61F 2/2409 |
| 2017/0128209 A1 | 5/2017 | Morriss et al. |
| 2017/0216023 A1 | 8/2017 | Lane et al. |
| 2017/0216575 A1 | 8/2017 | Asleson et al. |
| 2017/0257902 A1 | 9/2017 | Xing et al. |
| 2017/0258614 A1 | 9/2017 | Griffin |
| 2017/0312077 A1* | 11/2017 | Vidlund ................ A61F 2/2439 |
| 2017/0325945 A1 | 11/2017 | Dale et al. |
| 2017/0325954 A1 | 11/2017 | Perszyk |
| 2017/0333186 A1 | 11/2017 | Spargias |
| 2017/0348096 A1 | 12/2017 | Anderson |
| 2017/0367821 A1 | 12/2017 | Landon et al. |

(56) References Cited

U.S. PATENT DOCUMENTS

| | | |
|---|---|---|
| 2017/0367823 A1 | 12/2017 | Hariton et al. |
| 2018/0014931 A1 | 1/2018 | Morriss et al. |
| 2018/0021129 A1 | 1/2018 | Peterson et al. |
| 2018/0055629 A1 | 3/2018 | Oba et al. |
| 2018/0055636 A1 | 3/2018 | Valencia et al. |
| 2018/0085218 A1 | 3/2018 | Eidenschink |
| 2018/0110534 A1 | 4/2018 | Gavala et al. |
| 2018/0110622 A1 | 4/2018 | Gregg et al. |
| 2018/0116790 A1 | 5/2018 | Ratz et al. |
| 2018/0126119 A1 | 5/2018 | McNiven et al. |
| 2018/0289485 A1* | 10/2018 | Rajagopal ............ A61F 2/2418 |
| 2018/0296341 A1 | 10/2018 | Noe et al. |
| 2018/0344457 A1 | 12/2018 | Gross et al. |
| 2018/0344490 A1 | 12/2018 | Fox et al. |
| 2019/0008639 A1 | 1/2019 | Landon et al. |
| 2019/0008640 A1 | 1/2019 | Cooper et al. |
| 2019/0060072 A1 | 2/2019 | Zeng |
| 2019/0262129 A1 | 8/2019 | Cooper et al. |
| 2019/0388218 A1* | 12/2019 | Vidlund ............... A61F 2/2409 |
| 2019/0388220 A1* | 12/2019 | Vidlund ............... A61F 2/2412 |
| 2020/0000579 A1 | 1/2020 | Manash et al. |
| 2020/0108225 A1 | 4/2020 | Jamal et al. |
| 2020/0138572 A1 | 5/2020 | Zhao et al. |
| 2020/0323668 A1 | 10/2020 | Diedering et al. |
| 2020/0345494 A1 | 11/2020 | Srinimukesh et al. |
| 2020/0352718 A1 | 11/2020 | Rowe et al. |
| 2021/0015615 A1 | 1/2021 | Groothuis et al. |
| 2021/0145576 A1 | 5/2021 | Becerra et al. |
| 2021/0228354 A1 | 7/2021 | Rafiee et al. |
| 2021/0259835 A1 | 8/2021 | Tyler et al. |
| 2021/0307900 A1 | 10/2021 | Hacohen |
| 2021/0378817 A1 | 12/2021 | Nia et al. |
| 2021/0386544 A1 | 12/2021 | Cooper et al. |
| 2022/0142777 A1 | 5/2022 | Scheinblum et al. |
| 2022/0287836 A1 | 9/2022 | Landon et al. |
| 2022/0346993 A1 | 11/2022 | Srinimukesh et al. |
| 2023/0000624 A1 | 1/2023 | Okabe et al. |
| 2023/0200980 A1 | 6/2023 | Peterson et al. |
| 2023/0218391 A1 | 7/2023 | Dass et al. |
| 2023/0380963 A1 | 11/2023 | Kaufman et al. |
| 2023/0390052 A1 | 12/2023 | Okafor et al. |
| 2023/0404753 A1 | 12/2023 | Luong et al. |
| 2024/0008978 A1 | 1/2024 | Nawalakhe et al. |
| 2024/0091000 A1 | 3/2024 | King et al. |

FOREIGN PATENT DOCUMENTS

| | | | |
|---|---|---|---|
| CN | 101180010 A | 5/2008 |
| DE | 2246526 A1 | 3/1973 |
| DE | 2246526 C3 | 7/1981 |
| DE | 19532846 A1 | 3/1997 |
| DE | 19546692 A1 | 6/1997 |
| DE | 19857887 A1 | 7/2000 |
| DE | 19907646 A1 | 8/2000 |
| DE | 10010074 A1 | 10/2001 |
| DE | 10049812 A1 | 4/2002 |
| DE | 10049813 C1 | 4/2002 |
| DE | 10049814 A1 | 4/2002 |
| DE | 10049815 A1 | 4/2002 |
| DE | 19546692 C2 | 11/2002 |
| DE | 19857887 B4 | 5/2005 |
| DE | 102006052564 B3 | 12/2007 |
| EP | 0103546 A1 | 3/1984 |
| EP | 0144167 A2 | 6/1985 |
| EP | 0170262 A2 | 2/1986 |
| EP | 0103546 B1 | 5/1988 |
| EP | 0592410 A1 | 4/1994 |
| EP | 0597967 A1 | 5/1994 |
| EP | 0592410 B1 | 10/1995 |
| EP | 0850607 A1 | 7/1998 |
| EP | 0597967 B1 | 12/1999 |
| EP | 1057460 A1 | 12/2000 |
| EP | 1088529 A2 | 4/2001 |
| EP | 1171059 A1 | 1/2002 |
| EP | 1239901 A1 | 9/2002 |
| EP | 1255510 A1 | 11/2002 |
| EP | 1259194 A1 | 11/2002 |
| EP | 1356792 A1 | 10/2003 |
| EP | 1356793 A2 | 10/2003 |
| EP | 1369098 A1 | 12/2003 |
| EP | 1469797 A1 | 10/2004 |
| EP | 1472996 A1 | 11/2004 |
| EP | 1259194 B1 | 2/2005 |
| EP | 1088529 B1 | 6/2005 |
| EP | 1570809 A1 | 9/2005 |
| EP | 1171059 B1 | 11/2005 |
| EP | 1469797 B1 | 11/2005 |
| EP | 1653888 A2 | 5/2006 |
| EP | 1239901 B1 | 10/2007 |
| EP | 1849440 A1 | 10/2007 |
| EP | 1935377 A1 | 6/2008 |
| EP | 1570809 B1 | 1/2009 |
| EP | 1472996 B1 | 9/2009 |
| EP | 1653888 B1 | 9/2009 |
| EP | 2124826 A1 | 12/2009 |
| EP | 1935377 B1 | 3/2010 |
| EP | 2168536 A1 | 3/2010 |
| EP | 2413842 A1 | 2/2012 |
| EP | 2446915 A1 | 5/2012 |
| EP | 1369098 B1 | 4/2014 |
| EP | 2745805 A1 | 6/2014 |
| EP | 2124826 B1 | 7/2014 |
| EP | 2749254 A1 | 7/2014 |
| EP | 2750630 A1 | 7/2014 |
| EP | 2777616 A1 | 9/2014 |
| EP | 2777617 A1 | 9/2014 |
| EP | 2745805 B1 | 6/2015 |
| EP | 2749254 B1 | 6/2015 |
| EP | 2918249 A2 | 9/2015 |
| EP | 2948103 A2 | 12/2015 |
| EP | 2967858 A2 | 1/2016 |
| EP | 2168536 B1 | 4/2016 |
| EP | 3037064 A1 | 6/2016 |
| EP | 3046511 A2 | 7/2016 |
| EP | 3057541 A1 | 8/2016 |
| EP | 3075354 A2 | 10/2016 |
| EP | 3139864 A1 | 3/2017 |
| EP | 3142603 A1 | 3/2017 |
| EP | 3184083 A1 | 6/2017 |
| EP | 2413842 B1 | 8/2017 |
| EP | 2446915 B1 | 1/2018 |
| EP | 3057541 B1 | 1/2018 |
| EP | 3037064 B1 | 3/2018 |
| EP | 3046511 B1 | 3/2018 |
| EP | 3142603 B1 | 3/2018 |
| EP | 3294220 A1 | 3/2018 |
| EP | 3075354 B1 | 11/2018 |
| EP | 3417813 A1 | 12/2018 |
| EP | 3184083 B1 | 2/2019 |
| EP | 3570779 A1 | 11/2019 |
| EP | 2918249 B1 | 4/2020 |
| EP | 3417813 B1 | 5/2020 |
| EP | 2777616 B1 | 8/2020 |
| EP | 3139864 B1 | 11/2020 |
| EP | 2750630 B1 | 6/2021 |
| EP | 2777617 B1 | 9/2022 |
| EP | 2948103 B1 | 12/2022 |
| FR | 2788217 A1 | 7/2000 |
| GB | 1264471 A | 2/1972 |
| GB | 1315844 A | 5/1973 |
| GB | 2056023 A | 3/1981 |
| GB | 2056023 B | 8/1983 |
| GB | 2398245 A | 8/2004 |
| GB | 2398245 B | 3/2007 |
| SU | 1271508 A1 | 11/1986 |
| WO | 9116041 A1 | 10/1991 |
| WO | 9117720 A1 | 11/1991 |
| WO | 9217118 A1 | 10/1992 |
| WO | 9301768 A1 | 2/1993 |
| WO | 9724080 A1 | 7/1997 |
| WO | 9829057 A1 | 7/1998 |
| WO | 9933414 A1 | 7/1999 |
| WO | 9940964 A1 | 8/1999 |
| WO | 9947075 A1 | 9/1999 |

(56) References Cited

FOREIGN PATENT DOCUMENTS

| | | |
|---|---|---|
| WO | WO-2000018333 A1 | 4/2000 |
| WO | 0041652 A1 | 7/2000 |
| WO | 0047139 A1 | 8/2000 |
| WO | 0061034 A1 | 10/2000 |
| WO | 0112105 A1 | 2/2001 |
| WO | WO-2001028459 A1 | 4/2001 |
| WO | WO-2001035878 A2 | 5/2001 |
| WO | WO-2001049213 A2 | 7/2001 |
| WO | WO-2001054624 A1 | 8/2001 |
| WO | WO-2001054625 A1 | 8/2001 |
| WO | WO-2001064137 A1 | 9/2001 |
| WO | WO-2001076510 A2 | 10/2001 |
| WO | 0230335 A2 | 4/2002 |
| WO | 0236048 A1 | 5/2002 |
| WO | WO-2002041789 A2 | 5/2002 |
| WO | 02085251 | 10/2002 |
| WO | 03003949 A1 | 1/2003 |
| WO | 03011195 A2 | 2/2003 |
| WO | 03028558 A2 | 4/2003 |
| WO | 03047468 A1 | 6/2003 |
| WO | 03049648 A2 | 6/2003 |
| WO | 03088873 A1 | 10/2003 |
| WO | 03092554 A1 | 11/2003 |
| WO | 2004014258 A1 | 2/2004 |
| WO | 2004019811 A2 | 3/2004 |
| WO | 2004023980 A2 | 3/2004 |
| WO | 2004030569 A2 | 4/2004 |
| WO | 2004082527 A2 | 9/2004 |
| WO | 2004093728 A2 | 11/2004 |
| WO | WO-2004103223 A1 * | 12/2004 ........... A61F 2/2466 |
| WO | 2005009285 A2 | 2/2005 |
| WO | 2005011534 A1 | 2/2005 |
| WO | 2005020842 A2 | 3/2005 |
| WO | 2005034812 A1 | 4/2005 |
| WO | 2005062980 A2 | 7/2005 |
| WO | 2005087140 A1 | 9/2005 |
| WO | 2005102015 A2 | 11/2005 |
| WO | 2006014233 A2 | 2/2006 |
| WO | 2006034008 A2 | 3/2006 |
| WO | 2006054107 A2 | 5/2006 |
| WO | 2006085225 A1 | 8/2006 |
| WO | 2006108090 A2 | 10/2006 |
| WO | 2006111391 A1 | 10/2006 |
| WO | 2006127756 A2 | 11/2006 |
| WO | 2006138173 A2 | 12/2006 |
| WO | 2007025028 A1 | 3/2007 |
| WO | 2007100410 A2 | 9/2007 |
| WO | 2007130537 A1 | 11/2007 |
| WO | 2007149933 A2 | 12/2007 |
| WO | 2008008405 A2 | 1/2008 |
| WO | 2008035337 A2 | 3/2008 |
| WO | 2008100599 A1 | 8/2008 |
| WO | 2008100600 A1 | 8/2008 |
| WO | 2008125153 A1 | 10/2008 |
| WO | 2008147964 A1 | 12/2008 |
| WO | 2008150529 A1 | 12/2008 |
| WO | 2009024859 A2 | 2/2009 |
| WO | 2009026563 A2 | 2/2009 |
| WO | 2009042196 A2 | 4/2009 |
| WO | 2009045331 A1 | 4/2009 |
| WO | 2009052180 A1 | 4/2009 |
| WO | 2009052188 A1 | 4/2009 |
| WO | 2009091509 A1 | 7/2009 |
| WO | 2009094500 A1 | 7/2009 |
| WO | WO-2009116041 A2 | 9/2009 |
| WO | WO-2009132187 A1 * | 10/2009 ........... A61F 2/2412 |
| WO | 2010005524 A2 | 1/2010 |
| WO | 2010008549 A1 | 1/2010 |
| WO | 2010057262 A1 | 5/2010 |
| WO | 2010121076 A2 | 10/2010 |
| WO | 2011002105 A1 | 1/2011 |
| WO | 2011002996 A2 | 1/2011 |
| WO | 2011081997 A1 | 7/2011 |
| WO | 2012008459 A1 | 1/2012 |
| WO | WO-2012011108 A2 * | 1/2012 ........... A61F 2/2412 |
| WO | 2012032187 A1 | 3/2012 |
| WO | 2012095455 A2 | 7/2012 |
| WO | 2013005878 A1 | 1/2013 |
| WO | 2013028387 A2 | 2/2013 |
| WO | 2013106585 A1 | 7/2013 |
| WO | 2014009213 A1 | 1/2014 |
| WO | 2014018432 A2 | 1/2014 |
| WO | 2014079291 A1 | 5/2014 |
| WO | 2014145338 A1 | 9/2014 |
| WO | 2014149865 A1 | 9/2014 |
| WO | 2014163706 A1 | 10/2014 |
| WO | 2014194178 A1 | 12/2014 |
| WO | 2015004624 A1 | 1/2015 |
| WO | 2015004625 A1 | 1/2015 |
| WO | 2015057407 A1 | 4/2015 |
| WO | 2015077274 A1 | 5/2015 |
| WO | 2016002189 A1 | 1/2016 |
| WO | 2016004137 A1 | 1/2016 |
| WO | 2016016899 A1 | 2/2016 |
| WO | 2017006510 A1 | 1/2017 |
| WO | 2017035487 A1 | 3/2017 |
| WO | 2018000333 A1 | 1/2018 |
| WO | 2018213209 A1 | 11/2018 |
| WO | 2022002054 A1 | 1/2022 |
| WO | 2023006048 A1 | 2/2023 |
| WO | 2023076103 A1 | 5/2023 |
| WO | 2023081236 A1 | 5/2023 |
| WO | 2023091769 A1 | 5/2023 |
| WO | 2023096804 A1 | 6/2023 |
| WO | 2023154250 A1 | 8/2023 |
| WO | 2023196150 A1 | 10/2023 |
| WO | 2023244454 A1 | 12/2023 |
| WO | 2023244767 A1 | 12/2023 |
| WO | 2023250114 A1 | 12/2023 |
| WO | 2024001789 A1 | 1/2024 |
| WO | 2024003620 A1 | 1/2024 |
| WO | 2024007575 A1 | 1/2024 |
| WO | 2024009540 A1 | 1/2024 |
| WO | 2024010739 A1 | 1/2024 |
| WO | 2024030520 A1 | 2/2024 |

OTHER PUBLICATIONS

Khambadkone & Bonhoeffer, "Percutaneous implantation of atrio-ventricular valves; concept and early animal experience," Eurointervention Supplements (2006) 1 (Supplement A A24-A25) 2006.

Andersen, et al., "Transluminal implantation of artificial heart valves. Description of a new expandable aortic valve and initial results with implantation by catheter technique in closed chest pigs." European Heart Journal (1992), 13, 704-708.

Andersen, Henning Rud, "History of Percutaneous Aortic Valve Prosthesis," Herz 34 2009 Nr. 5, Urban & Vogel, pp. 343-346, Skejby University Hospital Department of Cardiology, Aarhus, Denmark.

Dotter, M.D., Charles T., "Transluminal Treatment of Arteriosclerotic Obstruction," University of Oregon's Minthorn Memorial Laboratory for Cardiovascular Research through Radiology, Circulation, vol. XXX, Nov. 1964, pp. 654-670.

Inoue, M.D., Kanji, et al., "Clinical Application of Transvenous Mitral Commissurotomy by a New Balloon Catheter," The Journal of Thoracic and Cardiovascular Surgery 87:394-402, 1984.

Pavcnik, M.D., Ph.D., Dusan, et al. "Development and Initial Experimental Evaluation of a Prosthetic Aortic Valve for Transcatheter Placement," Cardiovascular Radiology 1992; 183:151-154.

Rashkind, M.D., William J., "Historical Aspects of Interventional Cardiology: Past, Present, Future," Texas Heart Institute Journal, Interventional Cardiology, pp. 363-367.

Rosch, M.D., Josef, "The Birth, Early Years and Future of Interventional Radiology," J Vasc Interv Radiol 2003; 14:841-853.

Ross, F.R.C.S., D.N., "Aortic Valve Surgery," Guy's Hospital, London, pp. 192-197, approximately 1968.

Sabbah, Ph.D., Hani N., et al., "Mechanical Factors in the Degeneration of Porcine Bioprosthetic Valves: An Overview," Journal of Cardiac Surgery, vol. 4, No. 4, pp. 302-309, Dec. 1989; ISSN 0886-0440.

(56) References Cited

OTHER PUBLICATIONS

Wheatley, M.D., David J., "Valve Prostheses," Rob & Smith's Operative Surgery, Fourth Edition, pp. 415-424, Butterworths 1986.
Bavaria, Joseph E. M.D et al.: "Transcatheter Mitral Valve Implantation: The Future Gold Standard for MR?," Applicant requests the Examiner to consider this reference to be prior art as of December of 2010.
Backer, Ole De, MD, et al., "Percutaneous Transcatheter Mitral Valve Replacement—An Overview of Devices in Preclinical and Early Clinical Evaluation," Contemporary Reviews in Interventional Cardiology, Circ Cardiovasc Interv. 2014;7:400-409, Applicant believes this may have been available as early as June of 2014.
Bavaria, Joseph E. M.D.: "CardiAQ Valve Technologies: Transcatheter Mitral Valve Implantation," Sep. 21, 2009.
Berreklouw, Eric, PhD, et al., "Sutureless Mitral Valve Replacement With Bioprostheses and Nitinol Attachment Rings: Feasibility In Acute Pig Experiments," The Journal of Thoracic and Cardiovascular Surgery, vol. 142, No. 2, Aug. 2011 in 7 pages, Applicant believes this may have been available online as early as Feb. 7, 2011.
Boudjemline, Younes, et al., "Steps Toward the Percutaneous Replacement of Atrioventricular Valves," JACC, vol. 46, No. 2, Jul. 19, 2005:360-5.
CardiAQ Valve Technologies, "Innovations in Heart Valve Therapy," In3 San Francisco, Jun. 18, 2008, PowerPoint presentation in 19 slides.
Chiam, Paul T.L., et al., "Percutaneous Transcatheter Aortic Valve Implantation: Assessing Results, Judging Outcomes, and Planning Trials," JACC: Cardiovascular Interventions, The American College of Cardiology Foundation, vol. 1, No. 4, Aug. 2008:341-50.
Condado, Jose Antonio, et al., "Percutaneous Treatment of Heart Valves," Rev Esp Cardio. 2006;59(12):1225-31, Applicant believes this may have been available as early as December of 2006.
Feldman, Ted, MD. "Prospects for Percutaneous Valve Therapies," Circulation 2007;116:2866-2877. Applicant believes that this may be available as early as Dec. 11, 2007.
Fitzgerald, Peter J. M.D., "Tomorrow's Technology: Percutaneous Mitral Valve Replacement, Chordal Shortening, and Beyond," Transcatheter Valve Therapies (TVT) Conference. Seattle, WA. Applicant believes this may have been available as early as Jun. 7, 2010.
"Fornell, Dave, "'Transcatheter Mitral Valve replacement Devices in Development," Diagnostic and Interventional Cardiology, Dec. 30, 2014, p. 3, <http://www.dicardiology.com/article/transcatheter-mitral-valve-replacement-devices-development>.
Grube, E. et al., "Percutaneous aortic valve replacement for severe aortic stenosis in high-risk patients using the second- and current third-generation self-expanding CoreValve prosthesis: device success and 30-day clinical outcome." J Am Coll Cardiol. Jul. 3, 2007;50(1):69-76. Epub Jun. 6, 2007.
Karimi, Houshang, et al., "Percutaneous Valve Therapies," SIS 2007 Yearbook, Chapter 11, pp. 1-11.
"Kronemyer, Bob, "'CardiAQ Valve Technologies: Percutaneous Mitral Valve Replacement," Start Up—Windhover Review of Emerging Medical Ventures, vol. 14, Issue No. 6, Jun. 2009, pp. 48-49.
Leon, Martin B., et al., "Transcatheter Aortic Valve Replacement in Patients with Critical Aortic Stenosis: Rationale, Device Descriptions, Early Clinical Experiences, and Perspectives," Semin. Thorac. Cardiovasc. Surg. 18:165-174, 2006 in 10 pages, Applicant believes this may have been available as early as the Summer of 2006.
Lutter, Georg, et al., "Off-Pump Transapical Mitral Valve Replacement," European Journal of Cardio-thoracic Surgery 36 (2009) 124-128, Applicant believes this may have been available as early as Apr. 25, 2009.
Ma, Liang, et al., "Double-Crowned Valved Stents For Off-Pump Mitral Valve Replacement," European Journal of Cardio-thoracic Surgery 28 (2005) 194-199, Applicant believes this may have been available as early as August of 2005.
Mack, Michael, M.D., "Antegrade Transcatheter Mitral valve Implantation: A Short-term Experience in Swine Model," Applicant believes this may have been presented on May of 2011 at TVT.
Mack, Michael, M.D., "Antegrade Transcatheter Mitral valve Implantation: On-Going Experience in Swine Model," Applicant believes this may have been presented on November of 2011 at TCT.
Ostrovsky, Gene, "Transcatheter Mitral Valve Implantation Technology from CardiAQ," medGadget, Jan. 15, 2010, available at: http://www.medgadget.com/2010/01/transcatheter_mitral_valve_implantation_technology_from_cardiaq.html.
Preston-Maher, Georgia L., et al., "A Technical Review of Minimally Invasive Mitral Valve Replacements," Cardiovascular Engineering and Technology, vol. 6, No. 2, Jun. 2015, pp. 174-184. Applicant believes this may have been available as early as Nov. 25, 2014.
Quadri, Arshad M.D., "Transcatheter Mitral Valve Implantation (TMVI) (An Acute In Vivo Study)," Applicant believes this may have been presented on Sep. 22, 2010 at TCT.
Ratz, J. Brent, "LSI EMT Spotlight," May 15, 2009.
Ratz, J. Brent et al., "Any experiences making an expandable stent frame?" Arch-Pub.com, Architecture Forums: Modeling, Multiple forum postings from Feb. 3, 2009 to Feb. 4, 2009, http://www.arch-pub.com.
Ratz, J. Brent, "In3 Company Overview," Jun. 24, 2009.
Ruiz, Carlos E., "Overview of Novel Transcatheter Valve Technologies," Applicant believes this may have been presented on May 27, 2010 at EuroPCR.
Spillner, J. et al., "New Sutureless 'Atrial- Mitral-Valve Prosthesis' For Minimally Invasive Mitral Valve Therapy," Textile Research Journal, 2010, in 7 pages, Applicant believes this may have been available as early as Aug. 9, 2010.
Sondergaard, Lars, et al., "Transcatheter Mitral Valve Implantation: CardiAQ™," Applicant believes this may have been presented at TCT 2013.
Sondergaard, Lars, et al., "Transcatheter Mitral Valve Implantation: CardiAQ™," Applicant believes this may have been presented at EuroPCR 2013.
Sondergaard, Lars, "CardiAQ TMVR FIH—Generation 2," Applicants believe this may have been presented in 2014 at the TVT symposium.
Treede et al.: "Transapical transcatheter aortic valve implantation using the JenaValve™ system: acute and 30-day results of the multicentre CE-mark study." http://ejcts.oxfordjournals.org/content/41/6/e131.long. Apr. 16, 2012.
Taramasso et al.: "New devices for TAVI: technologies and initial clinical experiences" http://www.nature.com/nrcardio/journal/v11/n3/full/nrcardio.2013.221.html?message-global=remove#access. Jan. 21, 2014.
Webb, John G., et al., "Transcatheter Aortic Valve Implantation: The Evolution Of Prostheses, Delivery Systems And Approaches," Archives of Cardiovascular Disease (2012) 105, 153-159. Applicant believes this may have been available as early as Mar. 16, 2012.
Wayback Machine, Cleveland Clinic Lerner Research Institute, Transcatheter Mitral Stent/Valve Prosthetic, https://web.archive.org/web/20130831094624/http://mds.clevelandclinic.org/Portfolio.aspx?n=331, indicated as archived on Aug. 31, 2013.
"Company Overview," at TVT on Jun. 25, 2009.
BioSpace, "CardiAQ Valve Technologies (CVT) Reports First-In-Human Percutaneous Transfemoral, Transseptal Implantation With Its Second Generation Transcatheter Bioprosthetic Mitral Heart Valve," Jun. 23, 2015, p. 1, http://www.biospace.com/News/cardiaq-valve-technologies-cvt-reports-first- in/382370.
BioSpace, "CardiAQ Valve Technologies (CVT) Reports Cardiovascular Medicine Milestone: First-In-Humannonsurgical Percutaneous Implantation of a Bioprosthetic Mitral Heart Valve," Jun. 14, 2012, p. 1, http://www.biospace.com/News/cardiaq-valve-technologies-cvt-reports/263900.
Neovasc corporate presentation, Oct. 2009, available at http://www.neovasc.com/investors/documents/Neovasc-Corporate-Presentation-Oct. 2009.pdf.
Andersen H.R., et al., "Transluminal Implantation of Artificial Heart Valves. Description of a New Expandable Aortic Valve and Initial Results with Implantation by Catheter Technique in Closed Chest

(56) References Cited

OTHER PUBLICATIONS

Pigs," European Heart Journal, The European Society of Cardiology, Oxford University Press, United Kingdom, May 1, 1992, vol. 13, No. 5, pp. 704-708.

Herrmann, Howard C., M.D., "Advances in Transseptal Transcatheter Mitral Valve Replacement," Cardiovascular Research Foundation, tct, Sep. 21-25, 2018, 10 Pages, San Diego, California.

Neale, Todd, "Flushing TAVI Valves With Carbon Dioxide May Protect Against Brain Injury", Conference News, May 16, 2023, 6 Pages, EuroPCR 2023, Paris, France.

Transcatheter Aortic Valve Delivery Catheter System Compression Loading System, Medtronic CoreValve™System, Medtronic Inc, 2014, 61 pages, Santa Ana, California.

* cited by examiner

HEART VALVE PROSTHESIS AND METHOD

CROSS REFERENCE TO RELATED APPLICATIONS

This application is a continuation of U.S. patent application Ser. No. 16/226,185, filed Dec. 19, 2018, now U.S. Pat. No. 10,856,858, which is a continuation of U.S. patent application Ser. No. 13/130,180, filed Jan. 16, 2012, now U.S. Pat. No. 10,166,014, which is a U.S. national stage filing of PCT Patent Application Serial No. PCT/AU2009/001513, filed Nov. 20, 2009, which claims the benefit of and priority to Australian Provisional Patent Application No. 2008906045, filed Nov. 21, 2008, and Australian Provisional Patent Application No. 2009900460, filed Feb. 9, 2009, all of which are incorporated herein by reference.

TECHNICAL FIELD

The present invention relates to a heart valve prosthesis and associated method of treating a failed or failing heart valve. The invention is particularly related to a two-component heart valve prosthesis that is implantable by a two-step approach.

BACKGROUND OF THE INVENTION

Heart valve regurgitation is a condition whereby the heart valve does not seal completely as a result of disease or injury, and may have fatal consequences. Valve stenosis is a condition where the valve is narrowed and cannot open normally. Whilst valve stenosis can be treated by valvuloplasty (by balloon dilatation), this often results in the valve leaking and may require valve replacement. Aortic valvuloplasty is generally not a very effective or durable treatment for aortic stenosis.

Malfunctioning heart valves have typically been replaced with mechanical or biologic heart valve prostheses using highly invasive open-heart surgical techniques. Surgical mitral valve replacement is quite invasive and cannot be performed on many sick patients with severe mitral regurgitation. This procedure often results in resection of the anterior leaflet of the mitral valve which could lead to further left ventricular dysfunction. Whilst there has been some success in developing replacement stent based aortic valve prostheses for delivery via percutaneous catheter-based methods, these techniques have not been particularly successful when applied to mitral valve prostheses.

Mitral valve replacement is firstly made difficult as a result of the anatomy of the mitral valve, and particularly that of the mitral valve annulus in which the mitral valve leaflets are located. The mitral valve annulus is typically very distorted, and of unpredictable and non-uniform geometries, as compared to the relatively uniform aortic valve annulus. This unpredictable anatomy makes it difficult to design a pre-constructed mitral valve prosthesis that would fit the mitral valve annulus in a satisfactory manner for safe, stable and meticulous deployment.

Further, unlike the aortic valve annulus which is entirely surrounded by muscular tissue, the mitral valve annulus is bounded by muscular tissue on the outer wall only, with the inner side of the mitral valve annulus being bounded by a thin vessel wall which separates the mitral valve annulus and the aortic outflow tract. As a result, the mitral valve annulus cannot be subjected to any significant radial forces, as would be typical with an expanding stent type of valve prosthesis, as such radial forces would tend to collapse the aortic outflow tract, resulting in circulatory collapse with likely fatal consequences. As such, stent type valve prostheses are presently generally not suitable for use as a replacement mitral valve.

Mitral valve replacement techniques have also generally advocated removal of the native valve prior to location of the replacement mitral valve prosthesis. This is a technically extremely challenging task associated with the potentially fatal complication of profound mitral regurgitation that may not be adequately addressed by the subsequent valve replacement. The lack of an effective mitral valve may lead to overwhelming hemodynamic instability that may not be tolerated by the already compromised left ventricle and overwhelming pulmonary oedema may rapidly result.

Known stent based aortic valves are also not generally repositionable and therefore precise placement is difficult. This could result in important structures such as the coronary arteries being compromised as a result. Moreover, post-stenotic dilatation of the aorta may result in imprecise apposition of current stent based aortic valves, resulting in significant paravalvular leaks. For the same reason, current stent based aortic valves are typically not recommended for the treatment of pure aortic regurgitation. Current stent based aortic valves are also typically subject to fatigue and resultant fracture.

Further, various previously proposed replacement heart valve prostheses are relatively bulky and are thus not suited for percutaneous delivery using small diameter catheters, with more invasive larger catheters being required.

OBJECT OF THE INVENTION

It is the object of the present invention to substantially overcome or at least ameliorate at least one of the above disadvantages.

SUMMARY OF THE INVENTION

In a first aspect, the present invention provides a heart valve prosthesis comprising a housing component and a valve component;
wherein said housing component comprises a housing body having a housing passage extending therethrough;
said housing body being configured to be located in, or adjacent to and communicating with, a native valve orifice of a heart;
said housing component being configurable between a housing collapsed state for delivery to the native valve orifice via catheter and a housing expanded state to engage structure of the heart to fix said housing body in relation to the native valve orifice;
further wherein said valve component comprises:
a valve body having a valve passage extending therethrough;
said valve body being configured to be located at least partially within said housing passage with said valve passage extending along said housing passage; and
one or more flexible valve elements secured to said valve body and extending across said valve passage for blocking blood flow in a first direction through said valve passage whilst allowing blood flow in an opposing second direction through said valve passage;
said valve component being configurable between a valve collapsed state for delivery to said housing passage via catheter, when said housing body is in said housing expanded state following delivery to the native valve orifice, and an expanded state to engage said housing component and/or structure of said heart to fix said valve body at least partially within said housing passage.

The valve body is typically configured to be located and fixed wholly within the housing passage.

In various embodiments, the housing body comprises a housing body frame formed of one or more elongate elastic housing body frame elements. The housing body may further comprise a flexible housing wall fixed to the housing body frame and extending about the housing passage.

In some embodiments, the housing body is substantially cylindrical, whilst in other embodiments the housing body is tapered.

In various preferred embodiments, the housing passage is double-tapered, defining a housing passage neck portion located between opposing ends of the housing passage. In such embodiments the valve body is typically also double-tapered, defining a valve body neck portion adapted to co-operate with the housing passage neck portion to secure the valve body within the housing passage.

The valve body may comprise a valve body frame formed of one or more elongate elastic valve body frame elements.

The valve component may comprise a stent valve, the valve body being configured to be fixed at least partially within the housing passage by expansion of the valve body.

The housing component may further comprise one or more flexible temporary valve elements secured to the housing body and extending across the housing passage for inhibiting blood flow in a first direction through the housing passage whilst allowing blood flow in an opposing second direction through the housing passage prior to delivery of the valve component.

In various embodiments, the prosthesis is an atrioventricular valve prosthesis for replacing an atrioventricular valve (that is, a mitral valve or tricuspid valve). In particular, the prosthesis may be a mitral valve prosthesis for replacing a mitral valve.

In certain embodiments, the housing component further comprises a skirt extending about a periphery of the housing body for inhibiting blood flow in the first direction between the housing body and a wall of the native valve orifice.

The housing body may be configured to be located with an end of the housing adjacent to and communicating with the native valve orifice and the skirt is located adjacent to the end of the housing body.

For atrioventricular valve applications, the housing component preferably includes an anchoring mechanism secured to the housing body and configured to engage native tissue of the heart. Typically, the anchoring mechanism is configured to engage native tissue of the heart outside of the native valve orifice.

The anchoring mechanism may be configured to engage a wall of a ventricle of the heart communicating with the native valve orifice. Alternatively or additionally, the anchoring mechanism is configured to engage a wall of an atrium of the heart communicating with the native valve orifice.

In certain embodiments, the anchoring mechanism includes a plurality of primary prongs secured to and spaced about the housing body. The primary prongs are typically configured to engage native tissue of the heart outside of the native valve orifice.

The primary prongs may each be secured to the housing body by one or more legs extending from an end of the housing body.

The legs typically extend into a ventricle of the heart communicating with the valve orifice, the primary prongs being configured to engage a wall of the ventricle and/or sub-valvular tissue, such as papillary tissue or the chordae tendineae, of the heart.

The anchoring mechanism may further comprise a plurality of secondary prongs secured to and spaced about the housing body. The secondary prongs may be located such that, in use, the secondary prongs are located on an opposing side of the native valve orifice to the primary prongs.

In one embodiment, the valve component includes a collapsible anchor device for anchoring the valve body to a septum of the heart and a flexible anchor line extending between the valve body and the anchor device, the anchor device being collapsible for delivery via catheter with the valve body.

In one or more embodiments, the prosthesis is a semilunar valve prosthesis for replacing a semilunar valve (that is, an aortic valve or pulmonary valve). In particular, the prosthesis may be an aortic valve prosthesis for replacing an aortic valve.

For semilunar valve applications, the housing component is typically configured to engage a wall of the native valve orifice to fix the housing body in relation to the native valve orifice.

The housing component may comprise a generally tubular housing body formed of an elastically compressible material. The housing body may be integrally formed of a polymeric material.

In a second aspect, the present invention provides a method of replacing a failing or failed heart valve of a patient, said method comprising the steps of:
  a) delivering a housing component of a heart valve prosthesis into, or adjacent to and in communication with, the native valve orifice of the heart valve to be replaced;
  b) securing said housing component to structure of the heart so as to fix said housing component in relation to the native valve orifice;
  c) delivering a valve component of said heart valve prosthesis at least partially into a housing passage defined by said housing component; and
  d) securing said valve component at least partially into said housing passage.

Typically, the valve component is delivered and secured wholly within the housing passage.

Typically, the housing component is delivered via catheter in a collapsed state and expanded into an expanded state within, or adjacent to and in communication with, the native valve orifice, thereby engaging structure of the heart to fix said housing component in relation to the native valve orifice. The valve component is delivered via catheter in a collapsed state and expanded into an expanded state within the housing passage, thereby engaging the housing body and/or structure of the heart to fix the valve body within the housing passage.

The housing component may be secured to structure of the heart outside of the native valve orifice.

The heart valve may be an atrioventricular valve, typically a mitral valve.

For a mitral valve application, the method may further comprise the step of creating a septal puncture in the inter-atrial septum of the heart, the housing component and the valve component each being delivered percutaneously via catheter through the venous system of the patient and through the septal puncture.

Alternatively, the method may further comprise the step of creating an apex puncture in the apex of the left ventricle of the heart, the housing component and the valve component each being delivered via catheter through the apex puncture.

The heart valve may be a semilunar valve, typically an aortic valve.

For an aortic valve application, the housing component and the valve component may each be delivered percutaneously via catheter through the arterial system of the patient.

BRIEF DESCRIPTION OF THE DRAWINGS

Preferred embodiments of the present invention will now be described, by way of examples only, with reference to the accompanying drawings wherein.

DETAILED DESCRIPTION OF THE PREFERRED EMBODIMENTS

Figure 1:
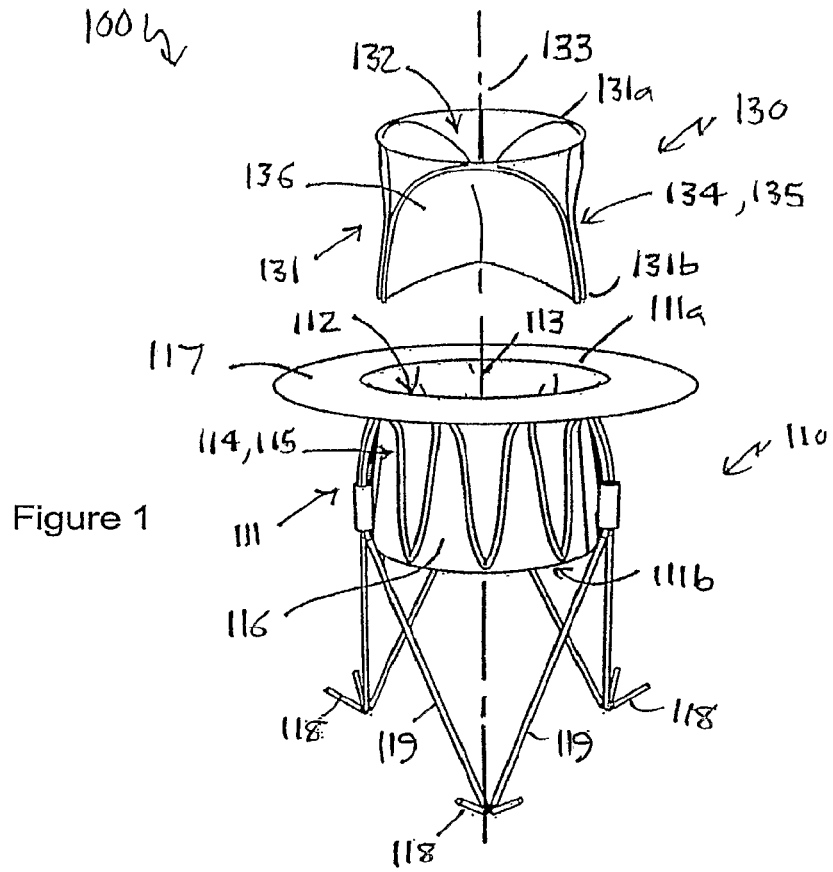
FIG. 1 is a perspective view of a heart valve prosthesis according to a first embodiment in a disassembled state.

Referring to FIGS. 1 to 4 of the accompanying drawings, a first embodiment of a heart valve prosthesis 100 is a two-component assembly, comprising a housing component 110 and a valve component 130. The heart valve prosthesis 100 is described here in terms of a mitral valve prosthesis for replacing a failed or failing mitral valve, however the heart valve prosthesis is also applicable to other heart valves including, in particular, the tricuspid valve.

The housing component 110 includes a housing body 111 that has a housing body first end 111a, a housing body second end 111b, and a housing passage 112 extending between the housing body first and second ends 111a, 111b along a longitudinal housing axis 113. As will be discussed further below, the housing body 111 is configured to be located adjacent to and communicating with the native mitral valve orifice of the heart with the housing body second end 111b located within the left ventricle and the housing body first end 111a located adjacent to and communicating with the mitral valve orifice, still located on the left ventricular side of the mitral valve orifice, but adjacent the left atrium. In other embodiments discussed below, the housing body is configured to be located in the native mitral valve orifice with the housing body first end located in the left atrium with the housing body extending through the mitral valve orifice. In still other embodiments, the housing body may be configured to be located on the left atrial side, adjacent to the native mitral valve orifice. Accordingly, the first end will hereinafter be referred to as the atrial end and the second end referred to as the ventricular end, although alternate terminology would be appropriate for applications in replacement of heart valves other than the mitral valve.

The housing body 111 is here formed of a generally annular housing body frame 114 formed of a single elongate elastic housing body frame element 115 configured in a sinusoidal or concertina type configuration extending annularly about the housing passage 112. Rather than being formed as a single element, the housing body frame 114 could be formed of several elements joined together by welding, clips or other suitable means. The housing body frame element 115 is typically in the form of a wire formed of a super elastic shape memory material. A particularly suitable material is nitinol, a nickel-titanium alloy that is known for use in catheter delivered prosthesis applications. Other suitable elastic metallic materials include stainless steel, other titanium alloys and cobalt chromium molybdenum. Other suitable relatively rigid yet elastic metal alloys or non-metallic materials may be utilized as desired. The wire forming the housing body frame 115 will typically have a diameter of the order of 0.3 mm to 0.4 mm, however wire of alternate diameters is also envisaged. Rather than being formed of wire, the housing body frame 114 could be cut from a cylindrical tube of material, typically a super elastic shape memory alloy such as nitinol. The tube could be cut by laser to provide a largely open unitary frame structure which could be subsequently heat shaped to tailor the cross-section of the housing body along its length.

The housing body 111 also has a flexible housing wall 116 that is fixed to the housing body frame 114 and extends about the housing passage 112. The housing wall 116 may be formed of a suitable flexible biological material, such as pericardial material. Alternatively, the housing wall 116 may be formed of any suitable flexible non-biological material, such as, for example, silicone, polyester or dacron. The housing wall 116 will typically be fixed to the housing body frame 114 by suturing. The housing wall 116 serves to enclose the housing passage 112, inhibiting leakage through the housing body frame 114.

The housing component 110 further preferably includes a flexible skirt 117 extending about a periphery of the housing body 111 for inhibiting blood flow in a first direction from the left ventricle into the left atrium.

For configurations where the housing body 111 is intended to be located adjacent to the native mitral valve orifice on the ventricular side, rather than within the orifice, the flexible skirt 117 is located at the housing body atrial (i.e., first) end 111a such that, in use, it will engage and seal with tissue surrounding the valve orifice on the ventricular side, as will be discussed below.

In configurations where the housing body 111 is intended to be located on the atrial side of the native mitral valve orifice, the flexible skirt will generally be located at the housing body ventricular (i.e., second) end 111b such that, in use, it will engage and seal with tissue surrounding the valve orifice on the atrial side. For configurations where the housing body is intended to extend through the native mitral valve orifice, the flexible skirt may be located on either side of the native valve orifice in use.

The flexible skirt 117 will typically be formed of the same material as the housing wall 116. The flexible skirt 117 and housing wall 116 will also typically be sutured to one another. It is also envisaged that the flexible skirt may be reinforced with wire or any of various other forms of reinforcement so as to provide the skirt with some degree of stiffness.

The housing component 110 also includes an anchoring mechanism secured to the housing body 111. Here the anchoring mechanism includes a plurality of primary prongs 118 secured to and spaced about the housing body 111. The primary prongs 118 are here each secured to the housing body 111 by one or more legs 119 extending from the housing body ventricular (i.e. second) end. The primary prongs 118 are thus hereinafter described as ventricular prongs 118. The ventricular prongs 118 are here arranged in two sets of three individual prongs 118 formed by bending the ends of each of the legs 119 so as to project radially outwardly and longitudinally back toward the housing body 111. The ventricular prongs 118 are thus configured to engage native tissue structure of the heart outside of the native valve orifice, rather than relying on fixation to the delicate, thin tissue constituting the mitral valve orifice wall. In the particular arrangement depicted, the legs 119 longitudinally offset the ventricular prongs 118 from the housing body 111 such that, in use, the ventricular prongs engage the wall of the left ventricle and/or subvalvular tissue, such as papillary muscle tissue or the chordae tendineae, as will be discussed below. The ventricular prongs 118 and legs 119 are formed of a super elastic shape memory material in wire form, typically the same as the housing body frame element 115.

It is envisaged, however, that the prongs might be configured to engage the mitral valve orifice wall. Whilst the mitral valve orifice wall is generally not capable of sustaining any significant radial forces as might be applied by a stent, it generally will be capable of sustaining point anchor loads as may be applied by the prongs. The ventricular prongs 118 may be in the form of hooks or barbs. In place of the prongs, the anchoring mechanism may be in any of various alternate forms including clips, clamps, staples or adhesives. For embodiments configured to replace other heart valves, particularly the aortic valve or pulmonary valve, it is envisaged that the housing body might be in a radially expandable stent form that directly engages the native orifice wall to fix the housing component in relation to the valve orifice.

Figure 2:
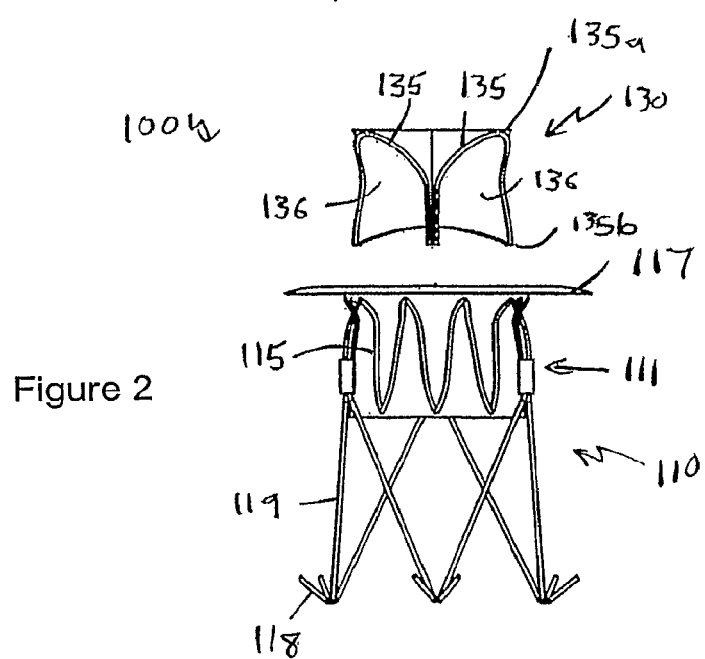
FIG. 2 is a front elevation view of the heart valve prosthesis of FIG. 1 in the disassembled state.

The entire housing component 110 is elastically collapsible from a stable expanded state, as depicted in FIGS. 1 and 2, into an unstable collapsed state extending along the housing longitudinal axis 113 to allow delivery of the housing component 110, typically percutaneously, by catheter.

The entire surface of the housing component 110 would typically be coated with a suitable coating to inhibit, or at least reduce the effect of, thrombus formation. Particularly suitable coatings for application to the housing body frame 114 include polyester coatings, textured metallic coatings, heparin based coatings, diamond-like carbon coatings, parylene coatings and fluoropolymer coatings such as polytetrafluoroethylene. Textured metallic coatings may be applied in the form of sintered nitinol or titanium and serve to add texture to the surface, helping to ensure any thrombus formed does not break free into the bloodstream. Such textured surfaces also promote tissue ingrowth to the foreign housing body frame 114. The same coating may be applied to the ventricular prongs 118 and legs 119. Coatings that would be particularly suitable for application to the housing wall 116 and flexible skirt 117 to inhibit thrombus formation include heparin based coatings, parylene coatings and fluoropolymer based coatings such as polytetrafluoroethylene.

The valve component 130 includes a valve body 131 that has a valve body atrial (i.e., first) end 131a, a valve body ventricular (i.e., second) end 131b and a valve passage 132 extending between the valve body atrial and ventricular ends 131a, 131b along a longitudinal valve axis 133. In the arrangement depicted, the valve body 131 is formed of a valve body frame 134 formed of three elongate elastic valve body frame elements 135. Each of the valve body frame elements 135 is in the general form of an arch formed of a wire of super elastic shape memory material, typically the same as that of the housing body frame element 115. Each valve body frame element 135 has its opposing ends 135*b* located at the valve body ventricular end 131*b* and its vertex 135*a* located at the valve body atrial end 131*a*. The ends 135*b* of each valve body frame element are secured to each other, typically by welding or crimping, however other suitable metals are also envisaged. It is also envisaged that the valve body frame could be formed of a single valve body frame element, such that only the opposing ends of the single valve body frame element would be sewed to each other.

A flexible valve element 136 is secured to each of the valve body frame elements 135, typically by suturing. The valve elements 136 may be formed of a suitable flexible biological material, such as pericardial material including bovine pericardium or kangaroo pericardium. The valve elements 136 may alternatively be formed of a suitable flexible non-biological material. The valve elements 136 are secured to the valve body frame elements 135 and configured such that they extend across the valve passage 132 in a manner that they block blood flow in a first direction through the valve passage 132 from the valve body ventricular end 131*b* toward the valve body atrial end 131*a*, whilst allowing blood flow in an opposing second direction. The valve elements 136 each extend laterally beyond their respective valve body frame element 135 toward the valve body atrial end 131*a*, with adjacent valve elements 136 overlapping or being sutured to form a continuous valve leaflet structure about the circumference of the valve body 131 at the valve body atrial end 131*a*.

The entire valve component 130 is elastically collapsible from a stable elastically expanded state, as depicted in FIGS. 1 and 2, into an unstable collapsed state extending along the valve longitudinal axis 133 to allow delivery of the valve component 130, typically percutaneously, by catheter.

Forming the heart valve prosthesis 100 as two separate percutaneously deliverable components allows for use of a smaller catheter than would otherwise be possible if the housing and valve were formed as a single component. Forming the heart valve prosthesis as two separate components also enables provision of a relatively simple (and thereby inexpensive) valve component which can be discarded if biological material forming the valve elements has reached its shelf life, whilst retaining the housing component, which might employ non-biological material for the flexible housing wall 116 and flexible skirt 117, thereby providing it with a longer shelf life. The two component prosthesis also enables utilization of commonly known stent based aortic valves as the valve component for a mitral valve prosthesis. Handling and preservation of the simpler valve component 130 and securing of the valve elements to the valve body by the bedside may also be simplified. Further, the two component prosthesis potentially allows for the placement of the prosthesis in different locations of the heart, including different sized heart valve orifices, by altering the size or configuration of the housing component only, using a common valve component.

Figure 3:
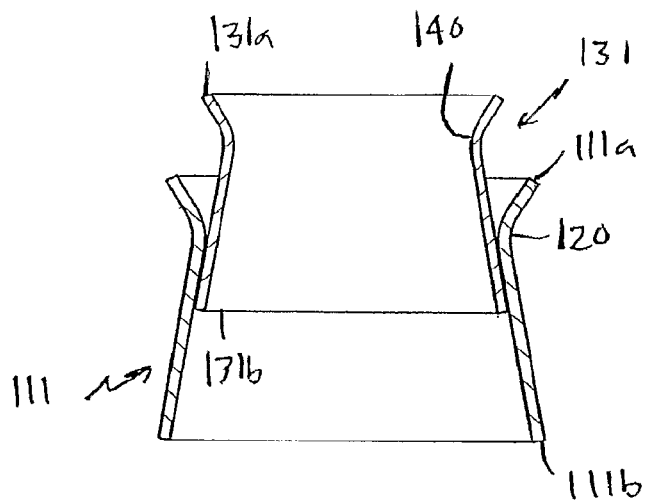
FIG. 3 is a schematic representation of the housing body and valve body of the heart valve prosthesis of FIG. 1 in a partly assembled state.
Figure 4:
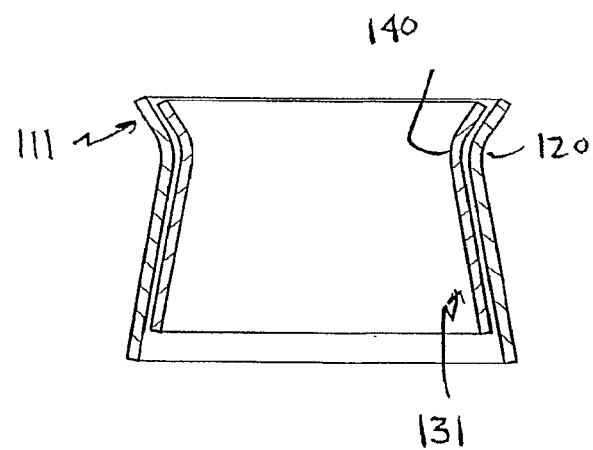
FIG. 4 is a schematic representation of the housing body and valve body of FIG. 3 in an assembled state.

With particular reference to FIGS. 3 and 4, both the housing body 111 and the valve body 131 are double-tapered providing an asymmetric hourglass-type shape. The double-tapered shape of the housing body 111 provides a double-tapered housing passage 112. The housing passage 112 has a reduced neck portion 120 located between the housing body atrial end 111*a* and housing body ventricular end 111*b*. The valve body 131 also has a neck portion 140 located between the valve body atrial end 131*a* and valve body ventricular end 131*b*. The housing passage 112 and valve body 131 are sized such that the double-taper acts to secure the valve body 131 within the housing passage 112, with the valve passage neck portion 140 co-operating with the housing body neck portion 120. Alternatively, the housing passage 112 and valve body 131 could be substantially cylindrical or singularly tapered, and be provided with alternate means for securing the valve body 131 within the housing body 111, such as connectors, prongs or other suitable fastening means.

Replacement of a failed or failing mitral valve by implantation of the mitral valve prosthesis 100 of the first embodiment described above using a percutaneous venous approach will now be described with reference to FIGS. 5 through 11. The venous system of the patient to be treated is firstly accessed by a puncture, typically in the groin area, accessing the femoral vein. Access to the venous system might alternatively be made via other large peripheral veins such as the sub-clavian or jugular veins. The femoral vein is, however, preferred given the compressibility of the femoral vein once a catheter is removed from the patient to achieve hemostasis.

Figure 5:
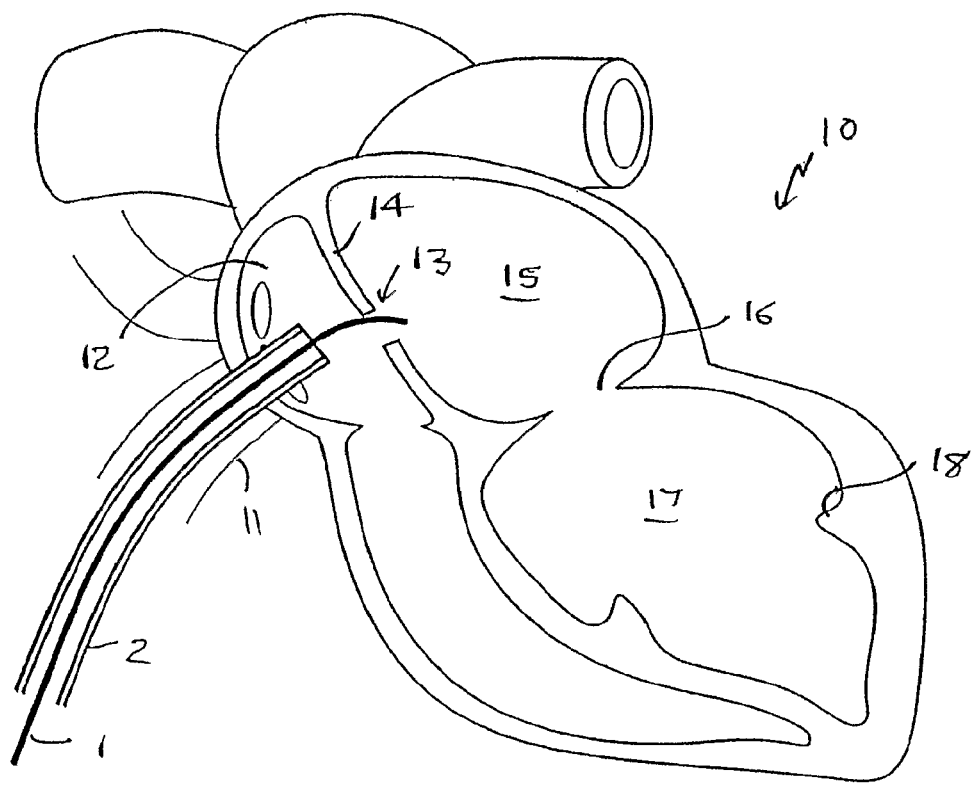
FIG. 5 is a schematic cross-sectional front elevation view of a heart depicting a catheter and guide wire advanced into the right atrium with a puncture formed in the inter-atrial septum.

Referring to FIG. 5, a guide wire 1, typically having a diameter of approximately 0.85 mm to 1.7 mm, is inserted through the puncture and along the femoral vein and via the inferior vena cava 11 to the right atrium 12 of the patient's heart 10. If additional steadying of the guide wire 1 is desired, a snare may be introduced to the heart 10 through an arterial approach from the left or right femoral artery, aorta and aortic valve. The snare will then engage a J-tip on the end of the guide wire 1 and draw the end of the guide wire 1 through the arterial system to the exterior of the patient so that opposing ends of the guide wire 1 may be steadied.

A catheter 2, typically having a diameter of about 20 to 24 French (6.7 mm to 8.0 mm) is then advanced over the guide wire 1 and into the right atrium 12. A puncture 13 is then made in the inter-atrial septum 14 using conventional equipment advanced by the catheter 2 in a known manner. The guide wire 1 and catheter 2 are then further advanced through the septal puncture 13 and into the left atrium 15.

Figure 6:
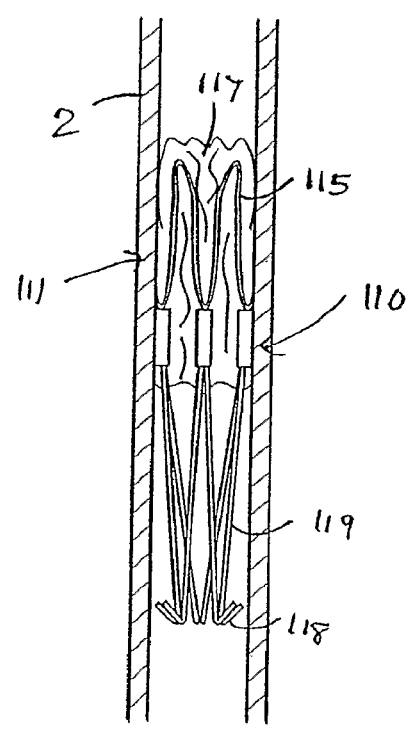
FIG. 6 is a cross-sectional fragmentary view of a catheter with the housing component of the heart valve prosthesis of FIG. 1 loaded therein.
Figure 7:
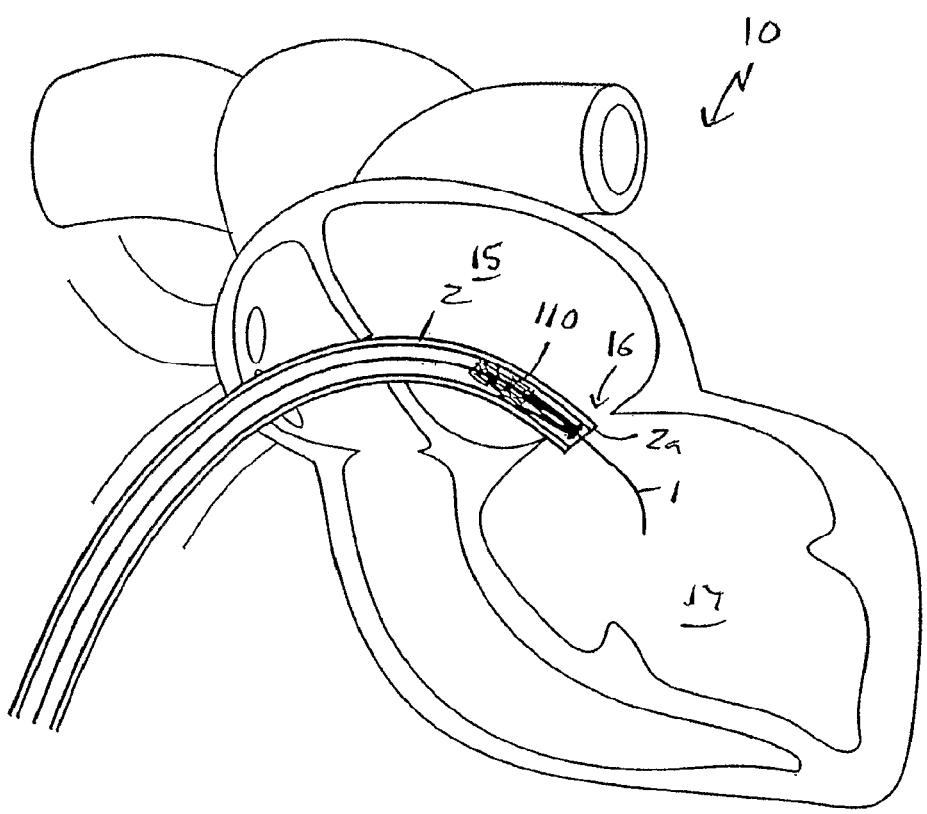
FIG. 7 is a schematic cross-sectional front elevation view of the heart of FIG. 5 with the housing component advanced to the end of the catheter.
Figure 8:
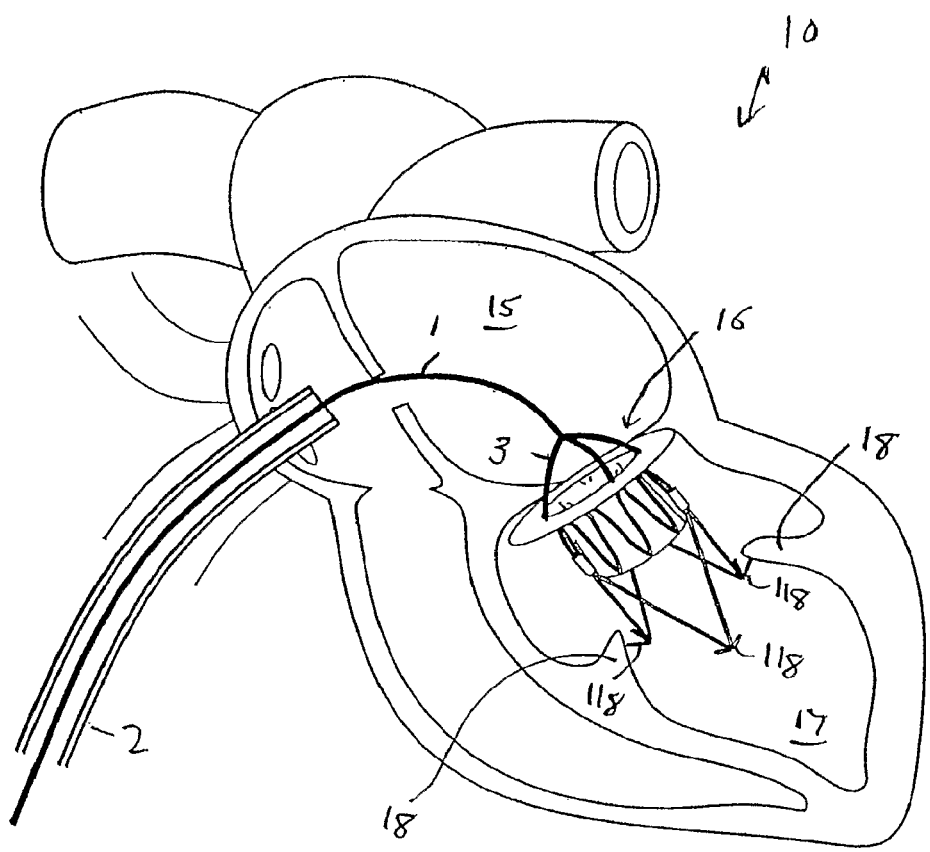
FIG. 8 is a schematic cross-sectional front elevation view of the heart of FIG. 5 with the housing in the expanded state adjacent the mitral valve orifice.

Referring to FIG. 6, the housing component 110 of the mitral valve prosthesis 100 is collapsed and fed into the catheter 2 with the housing body atrial end 111*a* trailing the housing body ventricular end 111*b*. The housing component 110 is then delivered percutaneously by first being advanced along the guide wire 1 to the leading end 2*a* of the catheter as depicted in FIG. 7. The leading end 2*a* of the catheter 2 extends through the native mitral valve orifice 16 and into the left ventricle 17, carefully positioning the housing component 110 (that remains collapsed inside the catheter 2) in the left ventricle 17 adjacent the mitral valve orifice 16. The failed or failing native mitral valve leaflets will typically be left in place. The catheter 2 is then withdrawn whilst leaving the guide wire 1 and housing component 110 in place, such that the housing component 110 is allowed to expand into the left ventricle 17, as depicted in FIG. 8. The ventricular prongs 118 engage the papillary muscles 18 within the left ventricle 17 and/or the wall of the left ventricle 17, thereby securing the housing body 111 in relation to the mitral valve orifice 16. The ventricular prongs 118 may alternatively or additionally engage other subvalvular tissue of the heart, particularly the chordae tendineae. The ventricular prongs 118 and legs 119 may also assist in preventing complete collapse of the left ventricle, where opposing walls make contact in what is termed "obliteration", as the ventricular prongs 118 will act to prop the left ventricle 17 open to some extent in a stent-like manner. This may be beneficial to patients suffering diastolic heart failure. To achieve this effect, the legs 119 should be of sufficient structural stiffness to provide the desired supporting effect.

Figure 9:
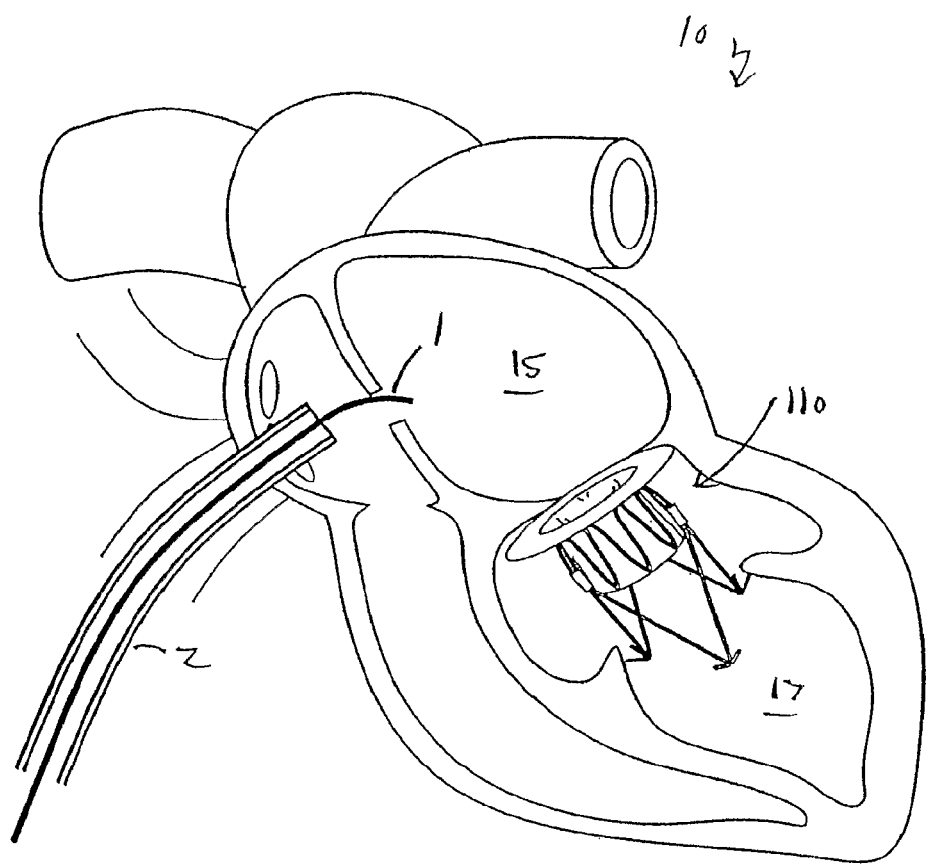
FIG. 9 is a schematic cross-sectional front elevation view of the heart of FIG. 5 with the guide wire withdrawn from the housing component.

At this stage, the housing component 110 remains attached to the guide wire 1 by way of a tether 3 that allows for some re-positioning of the housing body 111 in relation to the mitral valve orifice 16 and, if greater adjustment is required, allows the catheter 2 to be advanced back over the housing component 110, re-collapsing the housing component 110 into the catheter 2, for further re-positioning as required. Once the housing component 110 is in the correct position, the tether 3 is detached from the housing component 110 and the guide wire 1 withdrawn back into the catheter 2, as depicted in FIG. 9.

Figure 10:
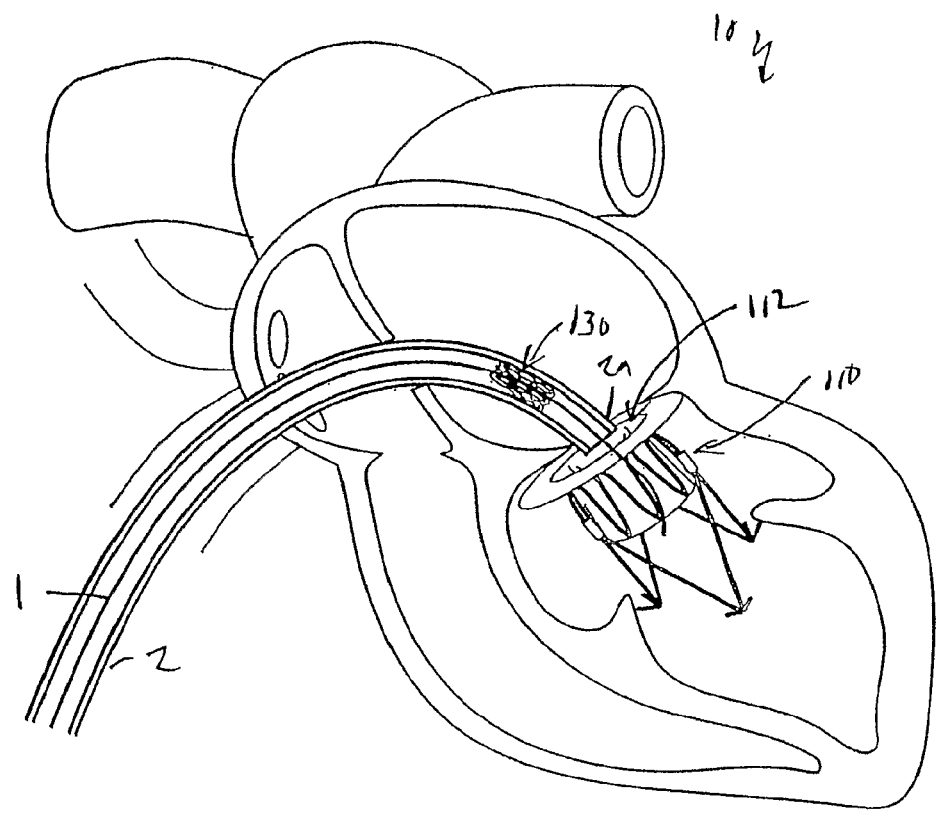
FIG. 10 is a schematic cross-sectional front elevation view of the heart of FIG. 5 with the valve component of the heart valve prosthesis of FIG. 1 advanced toward the end of the catheter.

Referring to FIG. 10, the valve component 130 of the heart valve prosthesis 100 is next collapsed and loaded into the catheter 2, with the valve body atrial end 131a trailing the valve body ventricular end 131b.

Figure 11:
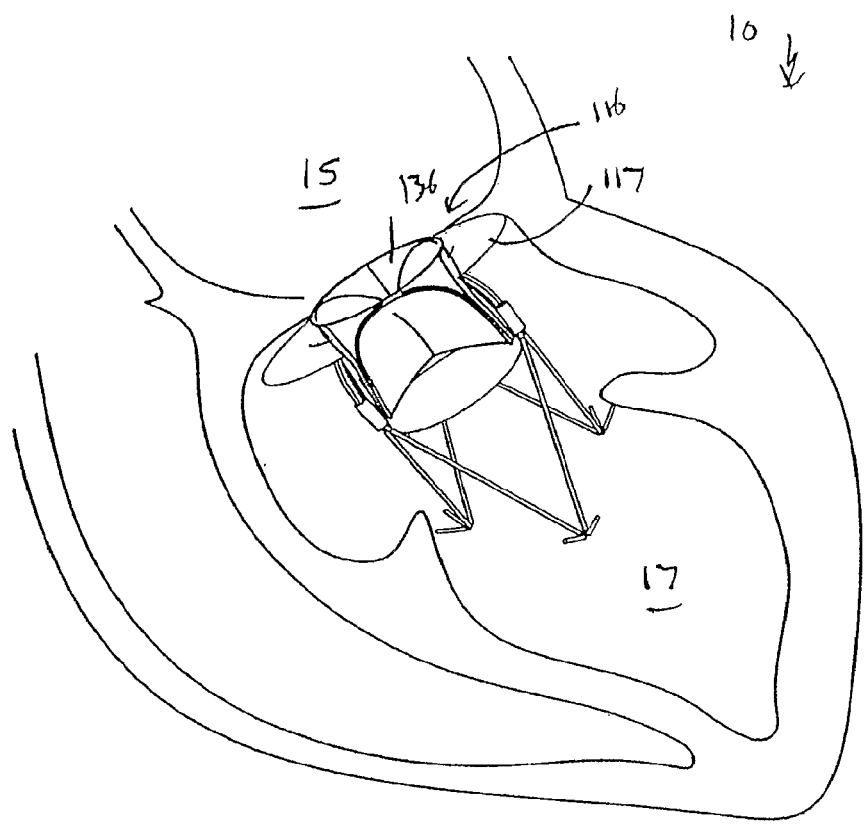
FIG. 11 is a cross-sectional front elevation view of the heart of FIG. 5 with the heart valve prosthesis of FIG. 1 fully implanted.

The valve component 130 is advanced along the guide wire 1 toward the second end 2a of the catheter which itself is advanced to the atrial end of the housing passage 112 within the housing component 110, ready for deployment of the valve component 130. Once the collapsed valve component 130 is located in the appropriate position within the housing passage 112, the catheter 2 is withdrawn, allowing the valve component 130 to elastically expand into engagement with the housing body frame 114 of the housing body 111, securing the valve component 130 to the housing body 111 with the valve passage 132 extending along the housing passage 112. The catheter 2 and guide wire 1 are then withdrawn from the patient, leaving the assembled heart valve prosthesis 100 in position as depicted in FIG. 11 effectively replacing the native mitral valve. The (ineffective) native mitral valve would typically be left in place, with the native valve leaflets retained on the outside of the housing component 110 where they may assist in preventing paravalvular leakage during ventricular systole. Blood flow from the left atrium into the left ventricle during atrial systole is provided for through the valve elements 136, whilst the same valve elements 136 prevent back flow from the left ventricle 17 into the left atrium 15 during ventricular systole. Back flow from the left ventricle 17 into the left atrium 15 from outside of the housing component 110 is also inhibited by virtue of the flexible skirt 117 which effectively seals against the periphery of the mitral valve orifice 16 against any back flow when the left ventricle 17 contracts and pressurizes during ventricular systole.

The entire procedure may be performed under the guidance of fluoroscopy transthoracic and transesophageal echocardiography in a known manner.

In a modification of the procedure described above, a larger first catheter (typically about 24 French) is first advanced over the guide wire 1 to a position extending through the native mitral valve orifice 16, displacing the native mitral valve leaflets. A smaller catheter 2 (typically 20-21 French) is then advanced through the first catheter, delivering the housing component 110. Once the second catheter 2 is in position ready for release of the housing component 120, the first catheter is withdrawn slightly, allowing the housing component 110 to be expanded into position. The valve component 130 is then delivered either through the same second catheter 2 or another catheter, again advancing through the first catheter.

Replacement of a failed or failing mitral valve by implantation of the mitral valve prosthesis 100 of the first embodiment using an alternate trans-apical approach will now be described with reference to FIGS. 12 through 17. This method provides more direct access to the left ventricle 17 of the patient's heart 10 via the apex 19 of the left ventricle 17. Access to the apex 19 of the left ventricle 17 may be provided either surgically or percutaneously. In a surgical procedure, a limited surgical incision may be first made in the precordial region of the thorax, providing direct and visual access to the exterior of the apex 19 of the left ventricle 17. Alternatively, for a percutaneous procedure, a needle puncture of the precordial region of the thorax may be made and the region is then dilated by way of a balloon catheter so as to provide access to the exterior of the apex 19 of the left ventricle 17.

Figure 12:
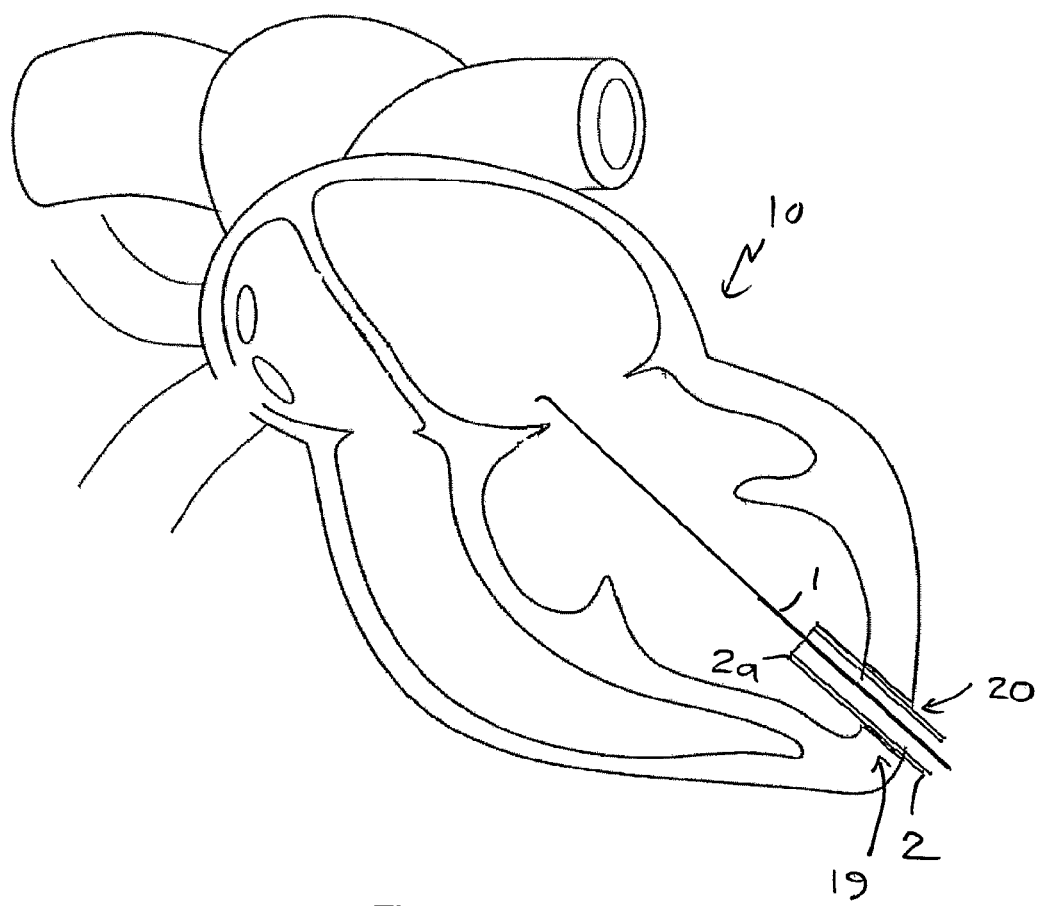
FIG. 12 is a schematic cross-sectional front elevation view of a heart depicting a catheter and guide wire advanced into the left ventricle through a puncture formed in the apex of the left ventricle.

Referring to FIG. 12, the left ventricle 17 is then accessed by creating a puncture 20 in the apex 19 of the left ventricle 17. For the surgical procedure, the puncture 20 may be created by way of direct surgical incision. For the percutaneous procedure, the puncture 20 may be created by way of conventional cutting equipment advanced by catheter. A guide wire 1, typically having a diameter of approximately 0.85 mm to 1.7 mm, is inserted directly through the puncture 20 in the surgical procedure or following balloon dilation of the area in the percutaneous procedure.

A catheter 2, typically having a diameter of about 20 to 24 F (6.7 mm to 8.0 mm) is then advanced over the guide wire 1 and into the left ventricle 17 through the puncture 20, as depicted in FIG. 12.

Figure 13:
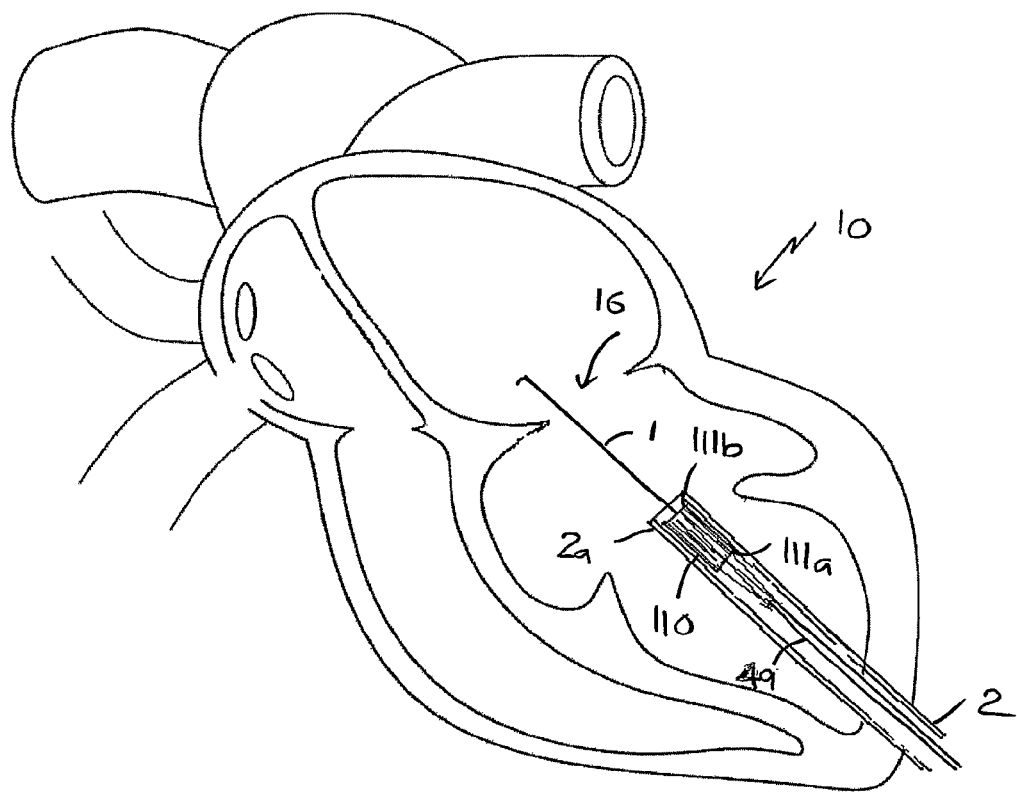
FIG. 13 is a schematic cross-sectional front elevation view of the heart of FIG. 12 with the housing component advanced to the end of the catheter.

Referring to FIG. 13, the housing component 110 of the mitral valve prosthesis 100 is collapsed and fed into the catheter 2 with the housing body ventricular end 111b trailing the housing body atrial end 111a. The housing component is delivered to the left ventricle 17 by being advanced along the guide wire 1 to the leading end 2a of the catheter 2. The leading end 2a of the catheter 2 is carefully positioned within the left ventricle 17 adjacent the mitral valve orifice 16, ready for deployment of the housing component 110. The failed or failing native mitral valve leaflets would typically be left in place and may be displaced from a position extending across the mitral valve orifice 16 by balloon dilation prior to delivery of the housing component 110 if desired.

Figure 14:
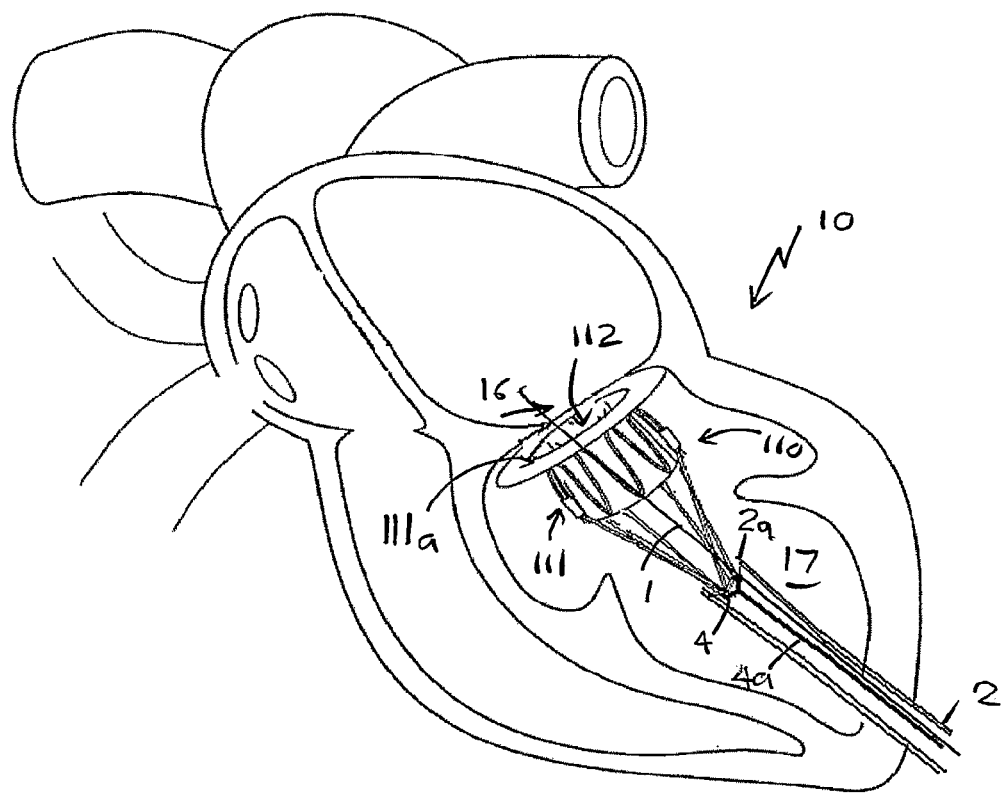
FIG. 14 is a schematic cross-sectional front elevation view of the heart to FIG. 12 with the housing component in a partially expanded state adjacent the mitral valve orifice.
Figure 15:
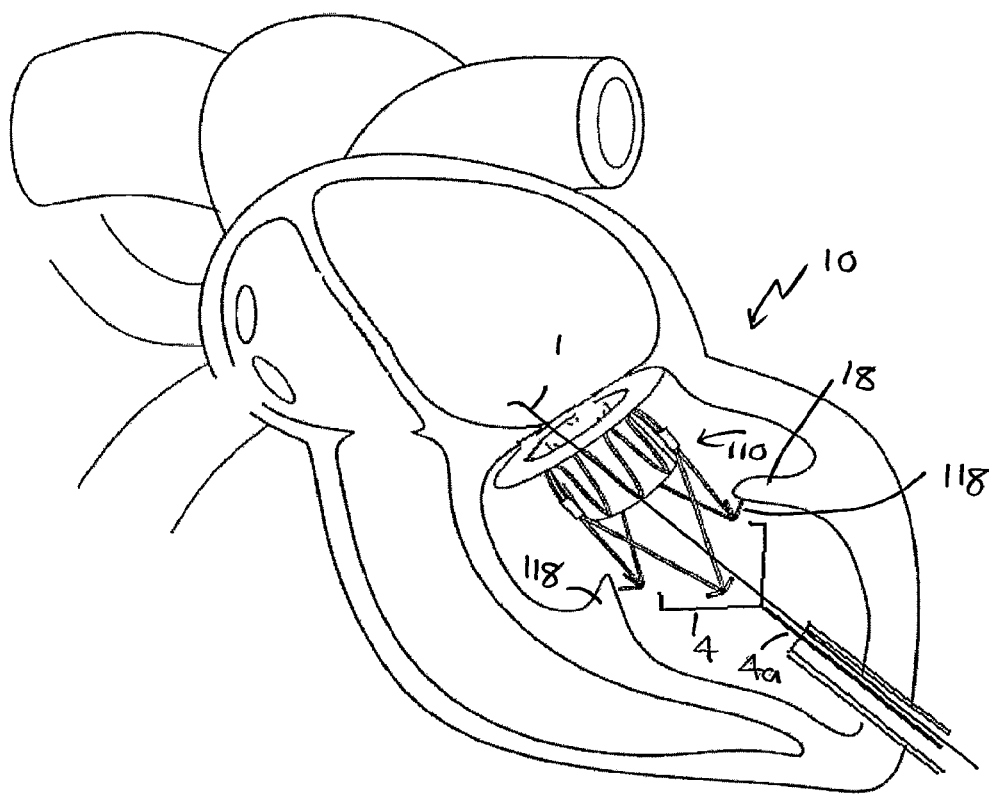
FIG. 15 is a schematic cross-sectional front elevation view of the heart of FIG. 12 with the guide wire withdrawn from the housing component.

The catheter 2 is then partly withdrawn whilst leaving the guide wire 1 and the housing component 110 in place, allowing the housing body 111 of the housing component 110 to expand as depicted in FIG. 14. At this stage, the ventricular prongs 118 are constrained by a restraining device 4 that is advanced with the housing component 110 alongside the guide wire 1. The restraining device 4 may be in the form of a wire clamp, wire lasso or similar formed on the end of an auxiliary wire 4a. The position of the housing component 110 is then fine tuned as required to position the housing body atrial end 111a adjacent the mitral valve orifice 16 providing communication with the housing passage 112. The catheter 2 is then further withdrawn and the restraining device 4 released, as depicted in FIG. 15, thereby allowing the housing component 110 to fully expand such that the ventricular prongs 118 engage the wall of the left ventricle 17 and/or papillary muscles 18 and/or other subvalvular tissue such as the chordae tendineae of the heart.

Figure 16:
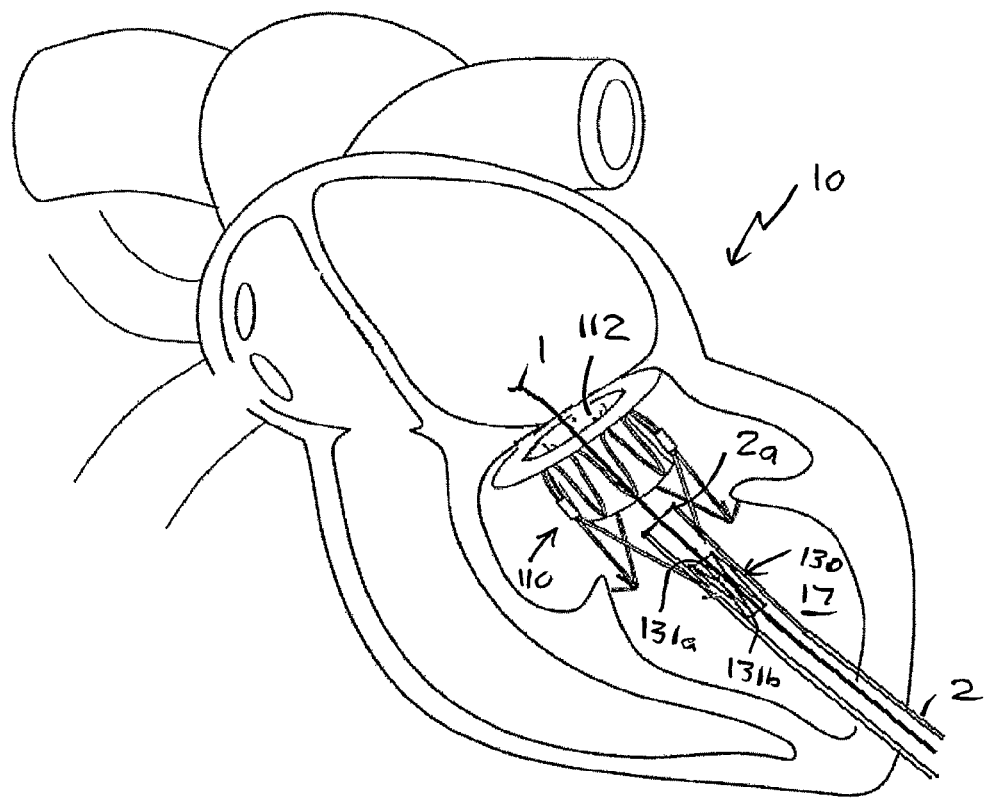
FIG. 16 is a schematic cross-sectional front elevation view of the heart of FIG. 12 with the valve component of the heart valve prosthesis of FIG. 1 advanced towards the end of the catheter.

Referring to FIG. 16, the valve component 130 of the heart valve prosthesis 100 is next collapsed and loaded into the catheter 2, with the valve body ventricular end 131b trailing the atrial end 131a.

Figure 17:
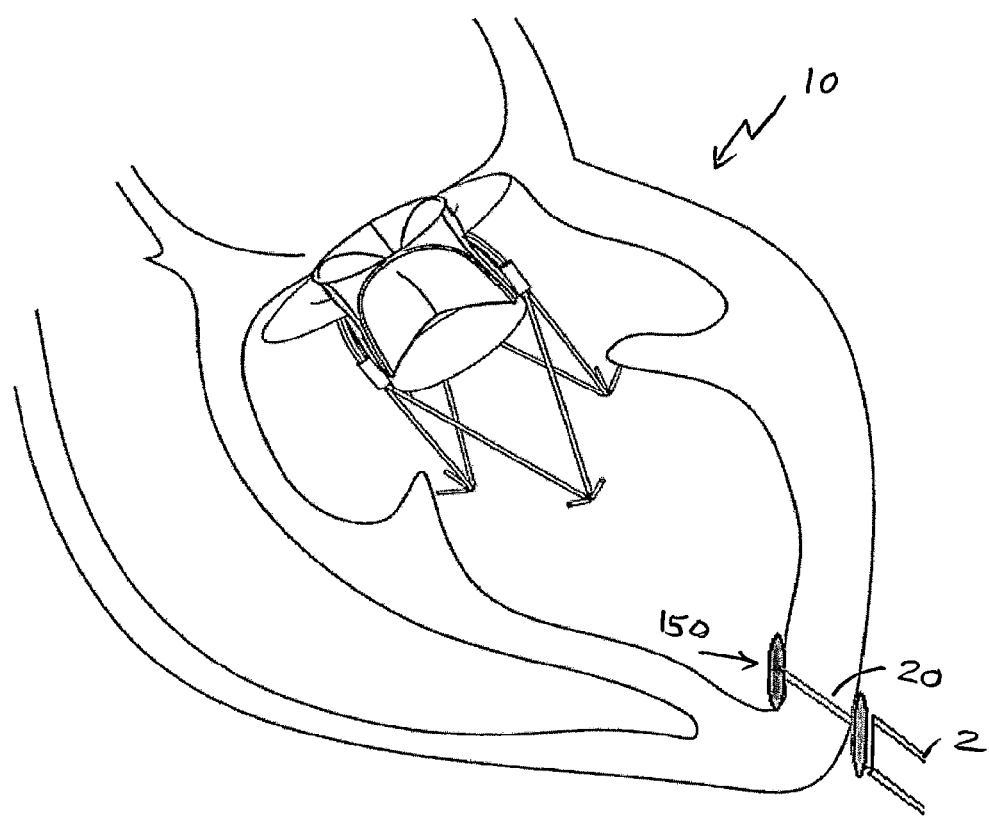
FIG. 17 is a schematic cross-sectional front elevation view of the heart of FIG. 12 with the heart valve prosthesis of FIG. 1 fully implanted.

The valve component 130 is advanced along the guide wire 1 towards the leading end 2a of the catheter 2 which itself is advanced to the ventricular end of the housing passage 112 within the housing component 110, ready for deployment of the valve component 130. Once the collapsed valve component 130 is located in the appropriate position within the housing passage 112, the catheter 2 is withdrawn, allowing the valve component 130 to elastically expand into engagement with the housing body frame 114 of the housing body 111, securing the valve component 130 to the housing body 111. The catheter 2 and guide wire 1 are then withdrawn from the left ventricle 17. Referring to FIG. 17, the puncture 20 in the apex 19 is then sealed by deploying a plug 150 in a known manner. The plug 150 will typically be deployed from the catheter 2 and may be in the form of a collapsible body formed of nitinol or any other suitable material. The catheter 2 and guide wire 1 are then fully withdrawn from the patient, leaving the assembled heart valve prosthesis 100 in position as depicted in FIG. 17, replacing the native mitral valve. The trans-apical approach described allows for more direct access to the mitral valve orifice than the venous approach described above in relation to FIGS. 6 to 11 which may provide access problems as a result of the tortuous nature of the access path through the venous system.

Figure 18:
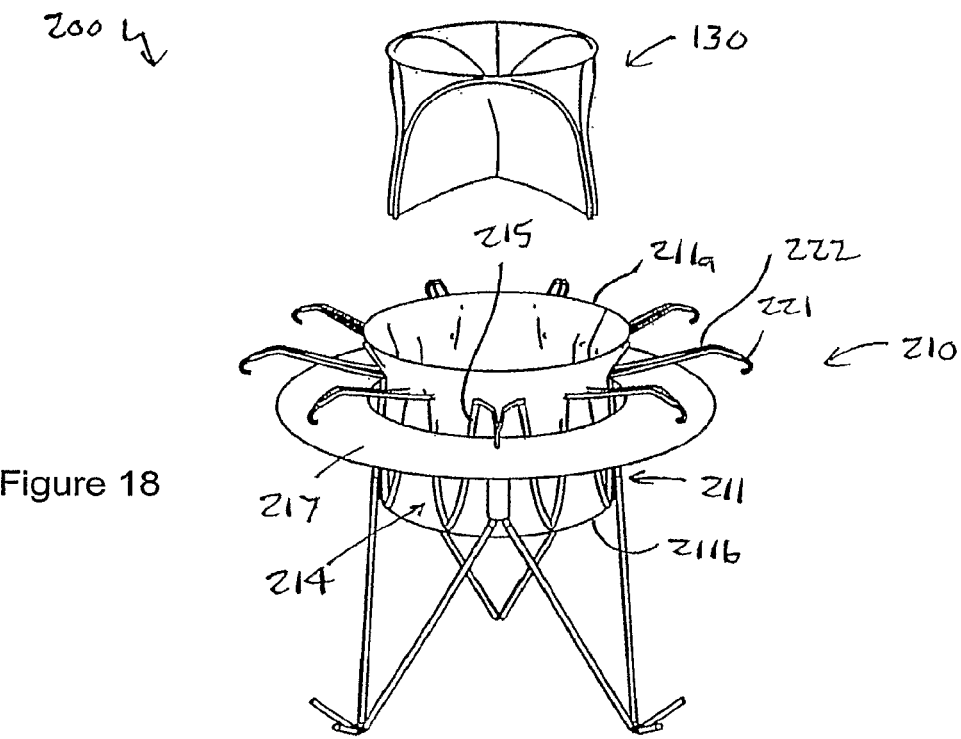
FIG. 18 is a perspective view of a heart valve prosthesis according to a second embodiment in a disassembled state.
Figure 19:
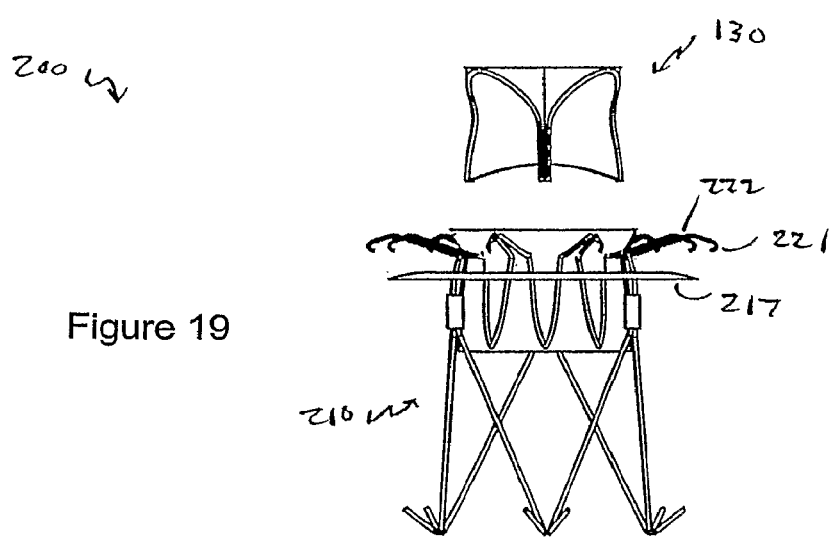
FIG. 19 is a front elevation view of the heart valve prosthesis of FIG. 18 in the disassembled state.

Referring to FIGS. 18 and 19 of the accompanying drawings, a second embodiment of a percutaneous heart valve prosthesis 200 is depicted. With the heart valve prosthesis 200, the valve component 130 is identical to that of the heart valve prosthesis 100 of the first embodiment described above.

The housing component 210 is similar to the housing component 110 of the first embodiment. Accordingly like or equivalent features adopt the same reference numerals as the housing component 110 of the first embodiment, increased by 100. A similar reference numeral system is applied for each of the hereinafter described embodiments. The housing component 210 has a housing body 211 that is intended to be located within the native mitral valve orifice 16 with the housing body atrial end 211a located within the left atrium 15 and the housing body ventricular end 211b located within the left ventricle 16. Accordingly, the flexible skirt 217 is located between the housing body atrial and ventricular ends 211a, 211b such that, in use, the flexible skirt 217 engages the native tissue surrounding the valve orifice 16 on the ventricular side. In the housing component 210, the anchoring mechanism further comprises a plurality of secondary or atrial prongs 221 secured to and spaced about the housing body atrial end 211a. Here the atrial prongs 221 are each secured to the housing body frame 214 by way of arms 222 that are each formed as a bent extension of individual housing body frame elements 215 of the housing body frame 214. The atrial prongs 221 extend over the delicate thin tissue immediately surrounding the valve orifice 16 so as to engage the muscular walls of the left atrium outside the valve orifice 16. The ends of the atrial prongs 221 are bent back to form generally radially inwardly directed hooks. The atrial prongs 222 assist in securing the housing body 211 in relation to the valve orifice, and particularly assist in preventing the housing body 211 from migrating into the left ventricle 17. The housing component 210 is otherwise substantially identical to the housing component 110 of the first embodiment.

Figure 20:
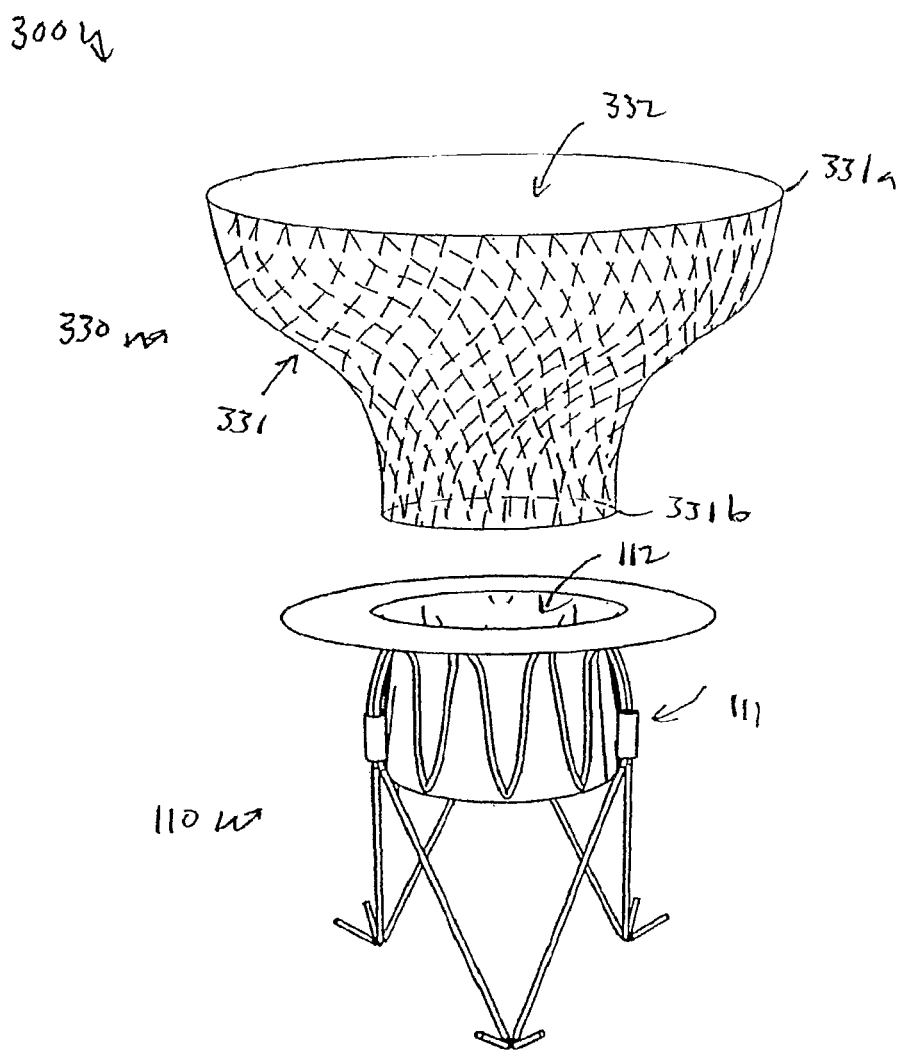
FIG. 20 is a perspective view of a heart valve prosthesis according to a third embodiment in a disassembled state.
Figure 21:
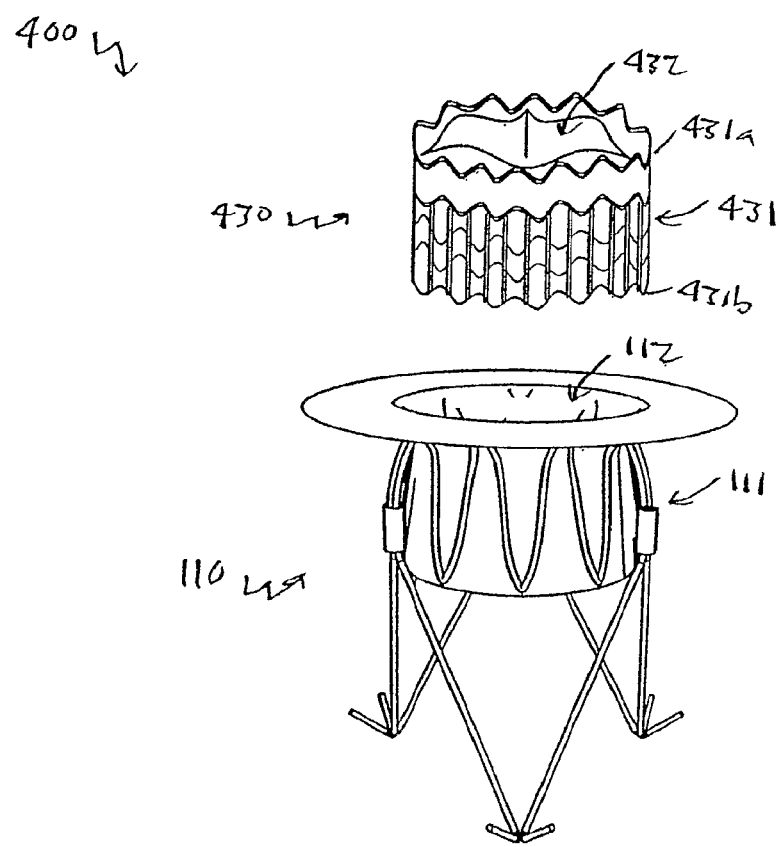
FIG. 21 is a perspective view of a heart valve prosthesis according to a fourth embodiment in the disassembled state.

Referring to FIG. 20, a third embodiment of a percutaneous heart valve prosthesis 300 is depicted. In this embodiment, the housing component 110 is identical to that of the heart valve prosthesis 100 of the first embodiment, whilst the valve element 330 is in the form of a percutaneously deliverable expandable stent valve. The valve body 331 of the valve component 330 may be either self-expanding or balloon expandable. The radial load applied to the housing body frame 114 when the valve body 331 is expanded within the housing passage 112 of the housing component 110 secures the valve body 331 to the housing body. The radial load is carried by the housing body 111 rather than the thin, delicate wall of the mitral valve orifice 16 as is the case with stent valves implanted directly into the mitral valve orifice 16. The valve body 331 is configured such that the valve body atrial end 331a protrudes beyond the housing body atrial end 111a and into the left atrium. The valve body 331 is of a generally tapered shape, with the valve body atrial end 331a being broader than the valve body ventricular end 331b such that the enlarged diameter of the valve body atrial end 331a expands into the left atrium 15, assisting in preventing movement of the heart valve prosthesis 380 downwards into the left ventricle. One or more flexible valve elements (not depicted) are secured to the valve body 331 and extend across the valve passage 332 for blocking blood flow to the valve passage 332 from the valve body ventricular end 331b toward the valve body atrial end 331a Referring to FIG. 21, a fourth embodiment of a heart valve prosthesis 400 again has the same housing component 110 as the heart valve prosthesis 100 of the first embodiment. In this embodiment, the valve component 430 is in the form of a percutaneously deliverable cylindrical stent valve. The valve body 431 is configured to be located substantially wholly within the housing passage 112 of the housing component 110 and may be secured to the housing body 111 solely by radial pressure following either balloon or self-expansion of the valve body 431. Alternatively, both the stent valve body 431 and housing body 111 could be provided with a double-taper in the same manner as depicted in FIGS. 3 and 4 to secure the valve body 431 within the housing passage 112. Alternatively, or additionally, the valve body 431 could be secured to the housing body 111 by clips or other suitable fasteners. One or more flexible valve elements (not depicted) are secured to the valve body 431 and extend across the valve passage 432 for blocking blood flow through the valve passage 432 from the valve body ventricular end 431b toward the valve body atrial end 431a.

Figure 22:
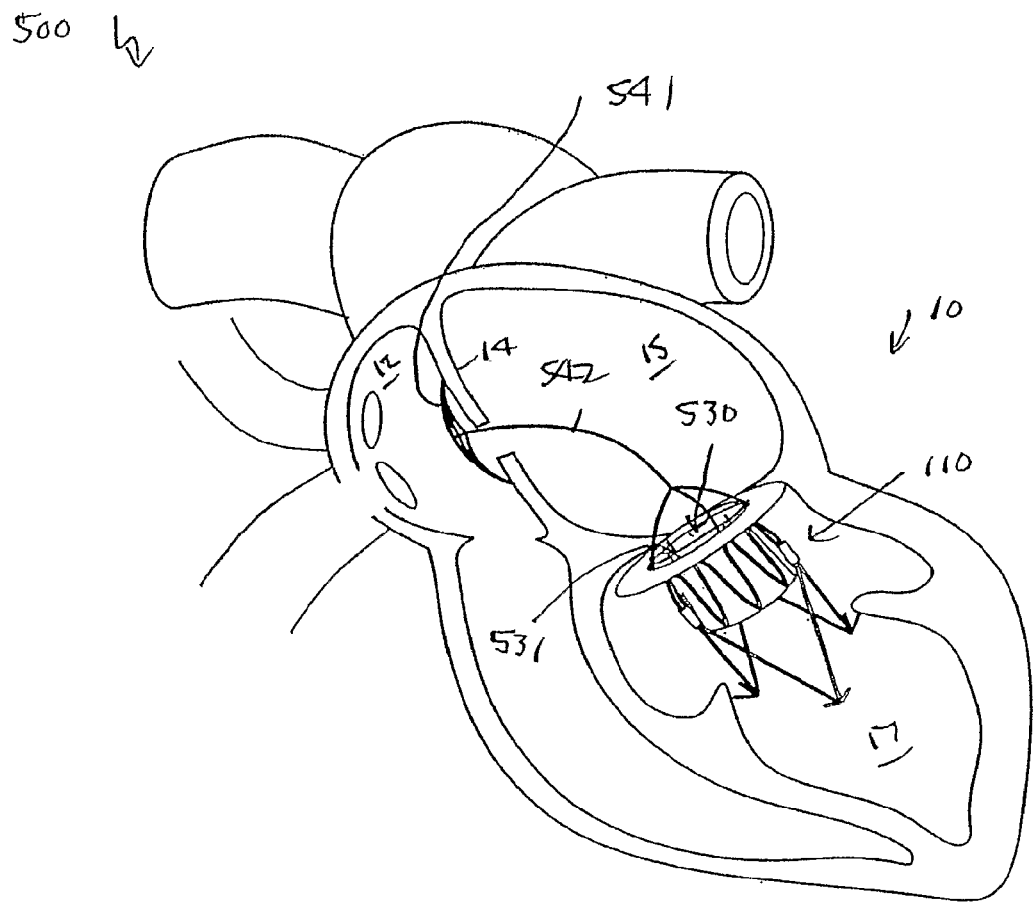
FIG. 22 is a perspective view of a heart valve prosthesis according to a fifth embodiment installed in a heart.

Referring to FIG. 22, a fifth embodiment of a percutaneous heart valve prosthesis 500 is depicted in an assembled state installed in a heart 10. The heart valve prosthesis 500 has a housing component 110 identical to the housing component of the heart valve prosthesis 100 of the first embodiment, and the housing component 110 is thus implanted in the same manner as described above. The valve component 530 is also identical to the valve component 130 of the first embodiment, with the addition of an anchor device 541 and flexible anchor line 542. The anchor line 542 connects the anchor device 541 to the valve body frame of the valve component 530. The anchor device 541 comprises an elastically collapsible anchor frame formed of elongate anchor frame elements, typically formed of the same material as the frame elements of the housing body and valve body. The anchor device 541 is elastically collapsible from a stable substantially flat plate-like configuration (as shown in FIG. 22) to an unstable elongate configuration for location within the catheter 2 during percutaneous delivery of the valve component 530. The anchor device 541 may conveniently be of the general form of the anchor device disclosed in International PCT Publication No. WO 2005/087140 to the present applicant, the entire contents of which are incorporated herein by cross-reference.

During percutaneous delivery of the valve component 530, the anchor device 541 is released from the end of the catheter 2 after release of the valve body 531 with the end of the catheter 2 retracted in the right atrium 12 adjacent the inter-atrial septum 14. Upon release of the anchor device 541 from the catheter 2, the anchor device 541 expands and acts as an anchor against the inter-atrial septum 14, anchoring the valve component 530 (and by virtue of the valve component's 530 fixation to the housing component 110, the entire heart valve prosthesis 500) against migration deeper into the left ventricle 17. It is also envisaged that the anchor device might alternately be permanently attached to the housing component 110, however, this would result in a significantly more complicated delivery procedure, given that the anchor device would tend to block the septal puncture 13, preventing delivery of the valve component through the same septal puncture. It is further envisaged that the anchor device 541 might be separate to both the housing component and valve component, being percutaneously delivered to the heart separately and following delivery of the valve component. The anchor device would then be secured to either the housing component or valve component within the heart. The anchor line 542 could either be delivered with the anchor device 541 and subsequently secured to the housing element/valve element or alternately the anchor line 542 could be delivered with the housing element/valve element and subsequently secured to the anchor device 541.

Figure 23:
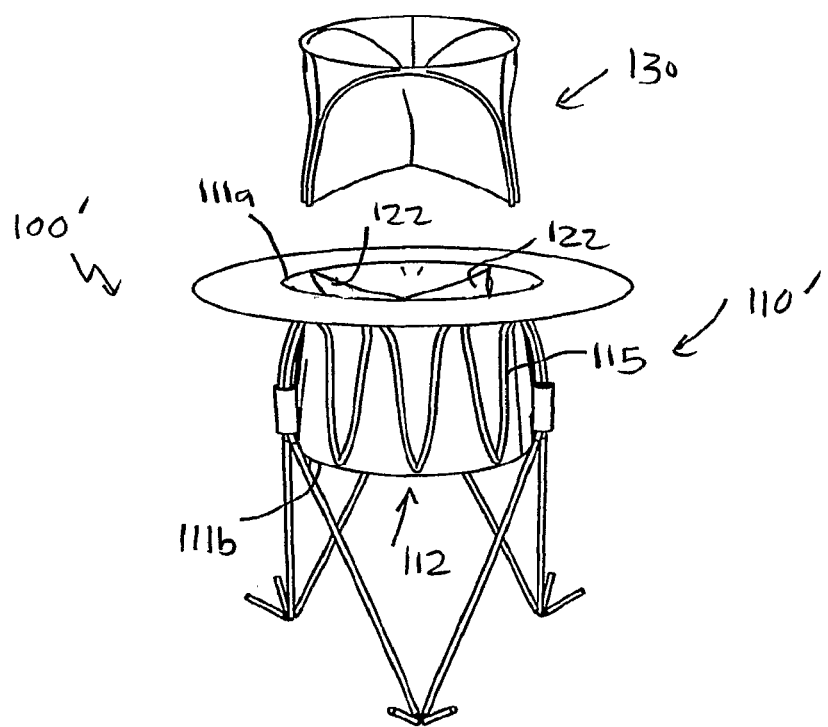
FIG. 23 is a perspective view of a heart valve prosthesis according to a sixth embodiment in a disassembled state.

Referring to FIG. 23, a sixth embodiment of a percutaneous heart valve prosthesis 100' is depicted in a disassembled state. The heart valve prosthesis 100' is identical to that of the first embodiment described above and depicted in FIG. 1 apart from the inclusion of a plurality of flexible temporary valve elements 122 in the housing component 110' secured to the housing body frame elements 115 so as to extend across the housing passage 112. The temporary valve elements 122 are configured to inhibit blood flow in the first direction through the housing passage 112 from the housing body ventricular end 111b towards the housing body atrial end 111a, whilst allowing blood flow in the opposing second direction. The temporary valve elements 122 serve to inhibit regurgitation of blood from the left ventricle 17 back into the left atrium 15 during the implantation procedure, following location of the housing component 110' until subsequent delivery of the valve component 130. Given that the temporary valve leaflets 122 are thus only operative for a relatively short time, they may be quite simple in configuration and be made from simple flexible synthetic materials. The prosthesis 100' may be implanted utilizing any of the procedures discussed above, with the valve component 130 simply pushing aside the temporary valve leaflets 122 when expanded into position within the housing passage 112. The temporary valve leaflets 122 remain sandwiched between the valve component 130 and the housing wall 116.

In a further embodiment (not depicted) the housing component of the percutaneous heart valve prosthesis has a housing body in the form of an expandable stent structure having a central portion configured to be located within the native mitral valve orifice, an atrial end portion configured to be located within the left atrium and an opposing ventricular portion configured to be located within the left ventricle. When located in position, the central portion of the housing body is only partly expanded to a diameter not exceeding that of the native mitral valve orifice, so as not to place any significant radial pressure loads on the wall of the valve orifice. The opposing atrial and ventricular portions of the housing body are further expanded beyond the diameter of the valve orifice so as to effectively "sandwich" the wall of the native mitral valve orifice between the atrial and ventricular portions of the housing body, thereby fixing the housing body in relation to the valve orifice. Any of various forms of the valve component could then be fixed within the housing passage defined by the housing body.

Various other forms of securing the various heart valve prostheses described above are also envisaged. For example, the valve component may be configured with ventricular or atrial prongs to assist in directly fixing the valve component to the structure of the heart. The valve body and housing body may also be tapered so as to act as a plug that cannot migrate through the heart valve orifice, with an anchoring mechanism being located on that side of the valve orifice through which the narrower end of the housing body and valve body protrude. For example, with the heart valve prosthesis 500 of the fifth embodiment described above in relation to FIG. 22, the atrial end of both the valve body and housing body could be narrower than the valve orifice and the ventricular end of the valve body and housing body, with the anchor device 541 and anchor line 542 acting to retain the heart valve prosthesis partly within the heart valve orifice in a plugged state. In such an arrangement, the flexible skirt 117 of the housing component would be located partway between the atrial and ventricular ends of the housing body. It is also envisaged that the valve component may also be provided with a flexible skirt similar, and additional to or in place of, the flexible skirt 117 of the housing component 110.

Whilst the various two component heart valve prosthesis described above each relate to a mitral valve prosthesis, the two component prosthesis concept is also applicable to each of the remaining heart valves, being the tricuspid valve and the semilunar valves (that is, the pulmonary valve and the aortic valve).

A seventh embodiment of a two component heart valve prosthesis, in the form of an aortic heart valve prosthesis 600, and an associated aortic heart valve replacement procedure will now be described with reference to FIGS. 24 through 29.

Figure 24:
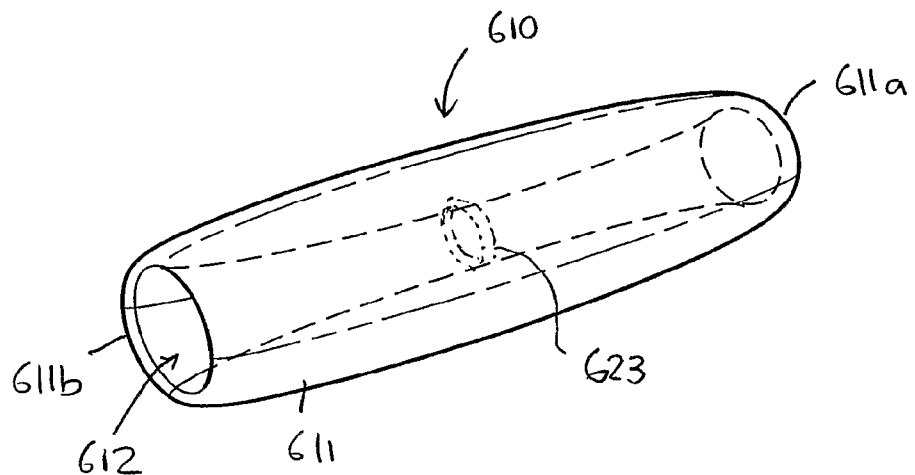
FIG. 24 is a perspective view of the housing component of a heart valve prosthesis according to a seventh embodiment.
Figure 25:
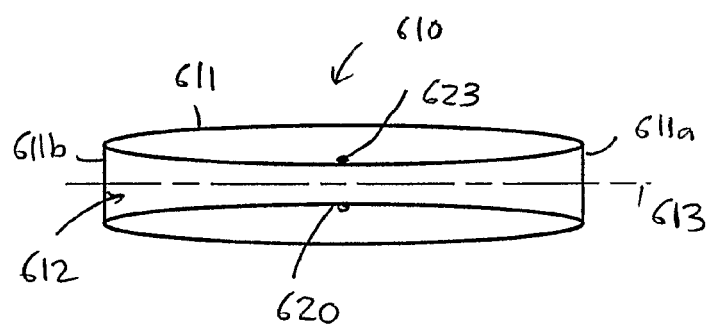
FIG. 25 is a cross-sectional front elevation view of the housing component of FIG. 24.

Referring firstly to FIGS. 24 and 25, the housing component 610 of the aortic valve prosthesis 600 comprises a generally tubular housing body 611 that has a housing body first end 611a, a housing body second end 611b and a housing passage 612 extending between the housing body first and second ends 611a, 611b along a longitudinal housing axis 613. The housing passage 612 is double tapered, with the housing passage 612 being wider at the housing body first and second ends 611a, 611b than in the central neck region 620 of the housing passage 612. This double tapering of the housing passage 612 assists in positioning and retaining the valve component 630 as will be discussed further below. The housing component 610 is sized and shaped to be located within the ascending aorta 22 of the patient's heart 10 in the position of the native aortic valve.

The housing body 611 is here in the form of an elastically compressible, flexible biocompatible material. Particularly preferred materials for construction of the housing body 611 include silicone and other bio-stable polymers. Alternatively, the housing body 611 could be in the form of a covered wire mesh stent. Persons skilled in the art will appreciate that many other suitable materials may alternatively be utilized. The housing component 610 is elastically collapsible from a stable expanded state, as depicted in FIGS. 24 and 25, into an unstable collapsed state extending along the housing longitudinal axis 613 to allow delivery of the housing component 610, typically percutaneously, by catheter. The housing component 610 may be forced into the unstable collapsed state for delivery by the application of radial compressive force. The housing component 610 may include a marker 623, in the form of a small metallic ring. The marker 623 may be integrally moulded with the housing body 612 or otherwise inserted into the housing passage 611 prior to implantation. The marker 623 extends about the housing passage 612 and is adapted to be visible on fluoroscopic or X-ray imaging equipment so as to facilitate doctors and surgeons identifying the position, orientation and location of the housing component 610, which may be otherwise invisible to these imaging techniques when the housing body 611 is formed of a polymeric material.

Figure 28:
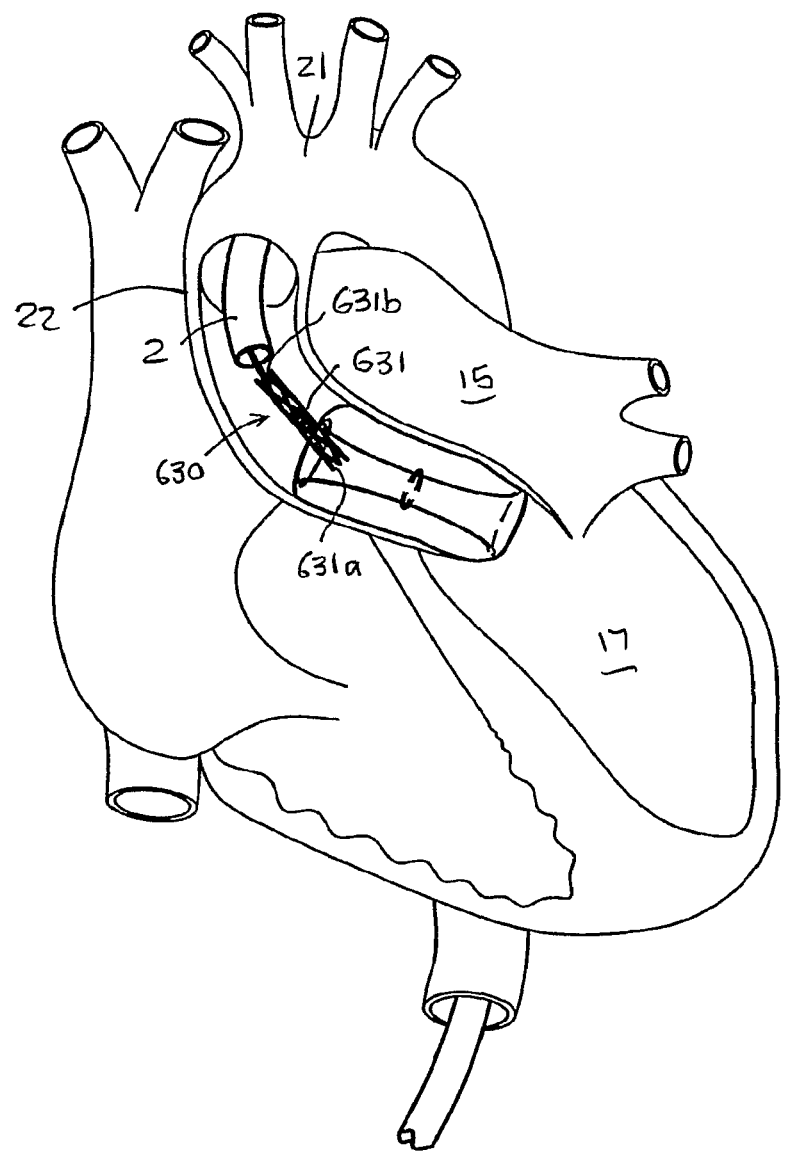
FIG. 28 is a schematic cross-sectional front elevation view of the heart of FIG. 26 with the valve component of the heart prosthesis of the sixth embodiment advanced beyond the end of the catheter.
Figure 29:
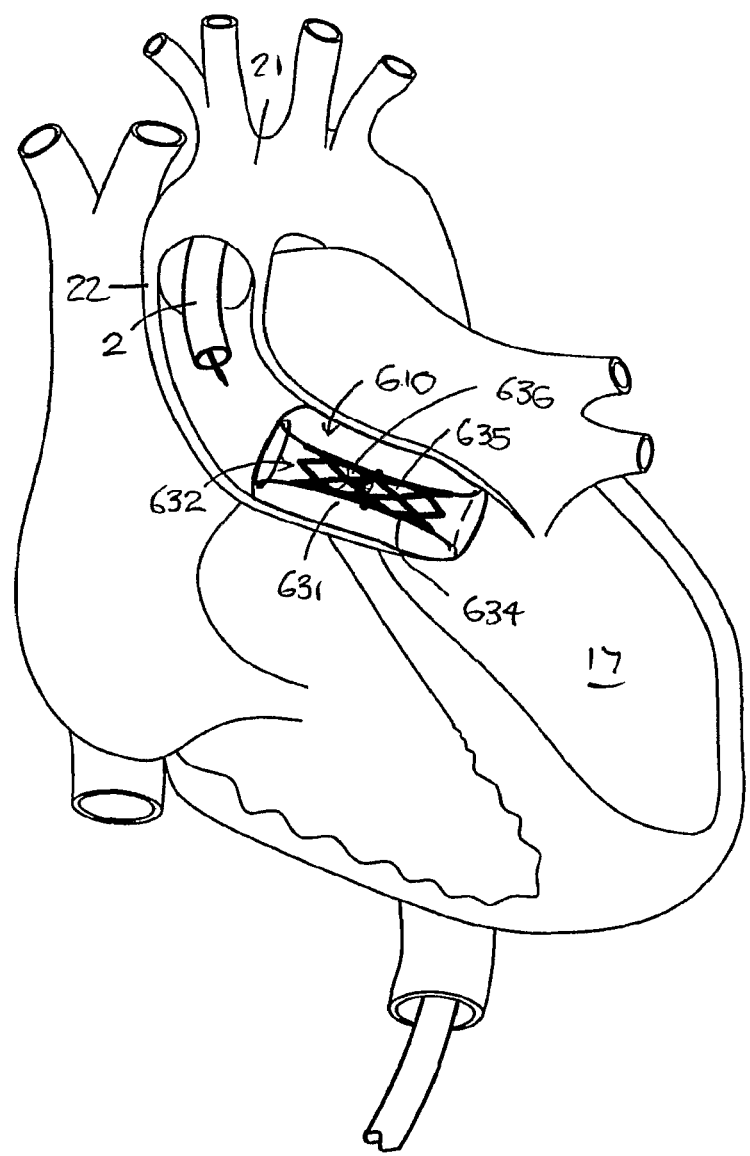
FIG. 29 is a schematic cross-sectional front elevation view of the heart of FIG. 26 with the heart valve prosthesis of the sixth embodiment fully implanted.

In the particular arrangement depicted in FIGS. 28 and 29, the valve component 630 comprises a tubular valve body 631 that has a valve body first end 631*a*, a valve body second end 631*b*, and a valve passage 632 extending between the valve body first and second ends 631*a*, 631*b* along a longitudinal valve axis. In the arrangement depicted, the valve body 631 is formed of a valve body frame 534 that has a stent structure formed of elongate elastic valve body frame elements 635. The valve body frame elements 635 are each typically formed of a wire of super elastic shape memory material such as nitinol, stainless steel, other titanium alloys and/or cobalt, chromium, molybdenum. Other suitable relatively rigid yet elastic metal alloys or non-metallic materials may alternatively be utilized as desired. The valve body frame elements 635 are generally formed with a diamond pattern as is typical with stent structures.

A plurality of flexible valve elements 636 are secured to the valve body frame elements 635, typically by suturing. Rather than being secured directly to the valve body frame elements 635, the valve elements 636 may be secured to a sub-frame of the valve body frame 634 formed of three elongate elastic elements that are each formed into an arch and formed of a wire of superelastic shape memory material, typically being the same as that of the valve body frame elements 635. The sub-frame may be generally of the same form as the housing body frame 134 of the valve component 130 of the mitral valve prosthesis 100 of the first embodiment. The sub-frame in this case would be secured to the valve body frame 634, typically by suturing.

The valve elements 636 may again be formed of a suitable flexible biological material, such as pericardial material including bovine pericardium or kangaroo pericardium. Alternatively the valve elements 636 may be formed of a suitable flexible non-biological material. The valve elements 636 are configured such that they extend across the valve passage 632 in a manner that they block blood flow in a first direction to the valve passage 632 from the valve body second end 631*b* towards the valve body first end 631*a*, whilst allowing blood flow in an opposing second direction. The entire valve component 630 is collapsible from a stable expanded state into a collapsed state extending along the valve longitudinal axis 633 to allow delivery of the valve component 630, typically percutaneously by catheter. The stent structure of the valve body frame 634 may be elastically collapsible, such that it is self-expanding when released, or may otherwise be expandable by balloon.

The valve component 630 may alternatively be of the same construction as the valve component 130 described above in relation to the first embodiment depicted in FIGS. 1 and 2, or may take any of various other forms including that of the valve component 430 of the heart valve prosthesis 400 of the fourth embodiment described above in relation to FIG. 15.

Replacement of a failed or failing aortic valve by implantation of the aortic valve prosthesis 600 of the sixth embodiment above using a percutaneous arterial approach will now be described with reference to FIGS. 26 through 29. The arterial system of the patient to be treated is firstly accessed by a puncture providing access to the femoral artery.

Figure 26:
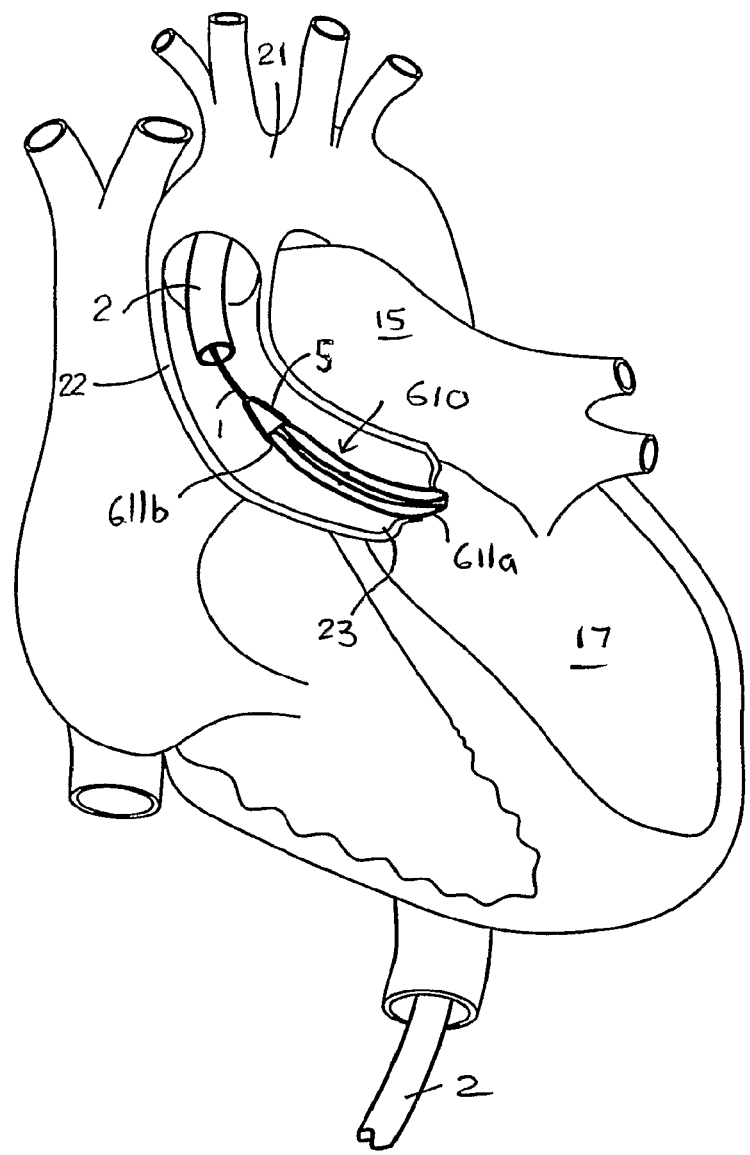
FIG. 26 is a schematic cross-sectional front elevation view of a heart depicting the housing component of FIG. 24 advanced beyond the end of a catheter located in the ascending aorta.

Referring to FIG. 26, a guide wire 1, typically having a diameter of approximately 0.85 mm to 1.7 mm, is inserted through the puncture and advanced along the femoral artery to the descending aorta, through the aortic arch 21 and into the ascending aorta 22. A catheter 2, typically having a diameter of about 20 to 24 F (6.77 mm to 8.0 mm) is then advanced over the guide wire 1 and into the ascending aorta 22. The housing component 610 of the aortic valve prosthesis 600 is radially compressed into its collapsed state and fed into the catheter 2 with the housing body second end 611*b* trailing the housing body first end 611*a*. The housing component 610 is then delivered percutaneously by being advanced along the guide wire 1 through the catheter 2. A restraining device 5 at the leading end of the guide wire 1 restrains the housing component 610 in its radially compressed and collapsed state as the guide wire 1 is further advanced beyond the leading end 2*a* of the catheter towards the lower end of the ascending aorta 22 which forms the native aortic valve orifice 23. The restraining device 5 is released once the housing component 610 is in position with the housing body first end 611*a* located adjacent the lower end of the ascending aorta 22 and the housing body second end 611*b* extending towards the aortic arch 21. The marker 623 assists in ensuring correct placement.

Figure 27:
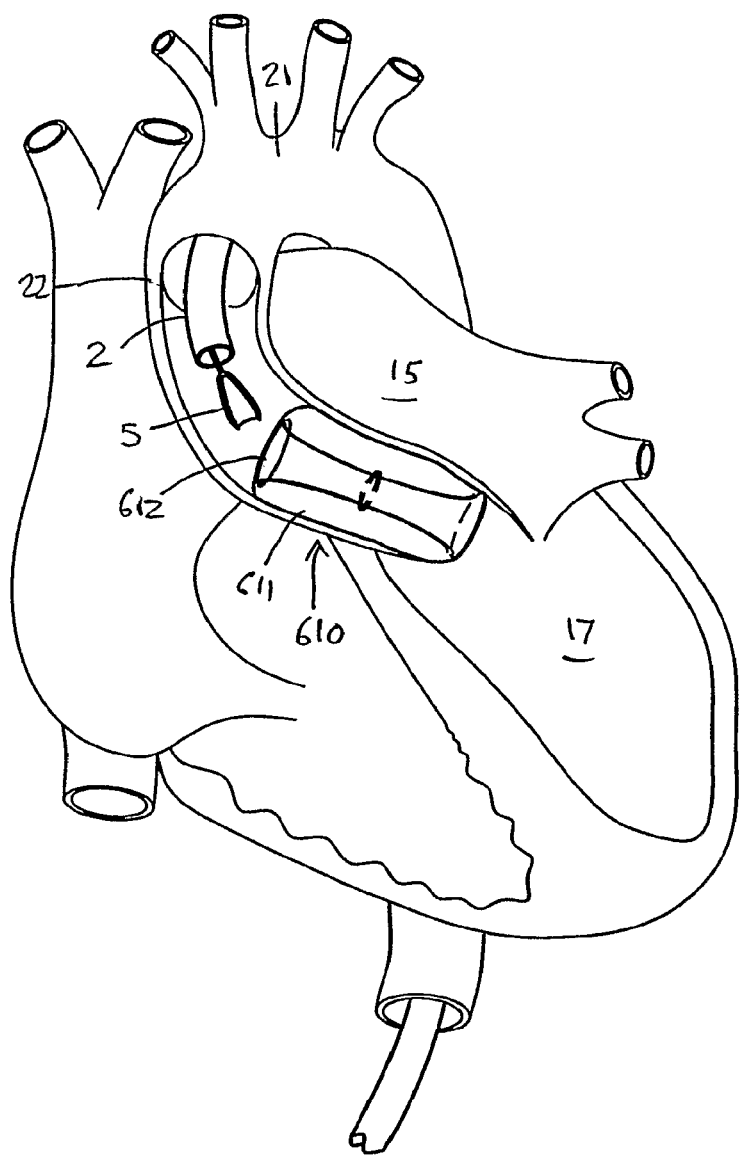
FIG. 27 is a schematic cross-sectional front elevation view of the heart of FIG. 26 with the housing in the expanded state in the ascending aorta.

Once the housing component 610 is released, it elastically expands into its expanded state, engaging the walls of the ascending aorta 22 so as to secure the housing component 610 within the ascending aorta 22 as depicted in FIG. 27. Radial expansion of the housing component 610 opens the housing passage 612. The radial expansion of the housing component 610 also presses the native valve leaflets against the wall of the ascending aorta 22. The elastic nature of the housing body 611 provides for an effective seal between the housing body 611 and the wall of the ascending aorta 22, thereby eliminating paravalvular leaks.

Referring to FIG. 28, the valve component 630 is next collapsed into its collapsed state and fed into the catheter 2 with the valve body second end 631*b* trailing the valve body first end 631*a*. The valve component 630 is advanced along the guide wire 1 towards the leading end 2*a* of the catheter 2. The valve component 630 is again restrained by the restraining device 5 as the valve component 630 is advanced beyond the leading end 2*a* of the catheter and into the housing passage 612 of the housing component 610. The valve component 630 is advanced into its appropriate position within the housing passage 612. This position may be conveniently determined utilizing the marker 623 of the housing component 610. A further marker may be provided on the valve component 630 if desired, although the valve body 631 will generally already be visible on fluoroscopic or X-ray imaging equipment, given that it is formed of metallic wire. The valve component 630 is expanded into its expanded state with the valve body first end 631*a* being located towards the housing body first end 611*a* and the valve body second end 631*b* located towards the housing body second end 611*b*.

If the valve body 631 is of a self-expanding form, release from the restraining device 3 will result in the valve component self-expanding into engagement with the wall of the housing body 611. Alternatively, the valve body 631 may be expanded by balloon catheterization if the valve body is of a non-self-expanding configuration. It is also envisaged that, in configurations where the shape memory characteristics of the nitinol wire forming the valve body frame 634 have been utilized to collapse the valve body 631 for delivery by catheter, the restraining device 5 may apply heat to the valve body frame 634 so as to heat the valve body frame elements 635 and thereby radially expand the valve body 631 into its stable expanded state.

When the valve body 631 is expanded, engaging the walls of the housing body 611, the double-tapered configuration of the housing passage 612 acts to secure the valve component 630 within the housing passage 612. Biocompatible adhesives could additionally or alternatively be utilized to secure the valve body 631 to the housing body 611. The housing body 611 could also be further secured to the wall of the ascending aorta 23 with biocompatible adhesives. Such adhesives could also be utilized in the various other embodiments described. The catheter 2 and guide wire 1 are then withdrawn from the patient, leaving the assembled heart valve prosthesis 610 in position as depicted n FIG. 29. Blood flow from the left ventricle 17 into the ascending aorta 22 is provided for through the valve elements 636 whilst the same valve elements 636 prevent back flow from the ascending aorta 22 into the left ventricle 17.

It is also envisaged that the aortic valve prosthesis 600 of the sixth embodiment may be implanted using a surgical or percutaneous trans-apical approach equivalent to the to mitral valve replacement trans-apical approach described above in relation to FIGS. 12 through 17. In such an approach, access would again be provided to the left ventricle (and ascending aorta) via a puncture in the apex of the left ventricle.

Persons skilled in the art will also appreciate various other possible modifications to the heart valve prosthesis and associated methods of implantation.

What is claimed is:

1. A heart valve prosthesis for replacing a native atrioventricular valve of the heart, the heart valve prosthesis comprising:
   a housing component that is configured to be radially expandable and compressible between a radially compressed state and a radially expanded state to engage structure of the native atrioventricular valve to fix the housing component relative to the native atrioventricular valve;
   wherein the housing component comprises a housing body having an atrial end, a ventricular end, and a housing passage extending from the atrial end to the ventricular end, the housing component further comprising a plurality of barbs secured to and spaced about the housing body, and an annular sealing element connected to the atrial end of the housing body, wherein the annular sealing element is made of polyester and is reinforced with wire, wherein the housing component is configured such that when it is in the radially expanded state at the native atrioventricular valve, the annular sealing element extends radially outwardly from the atrial end of the housing body over tissue surrounding the native atrioventricular valve within an atrium of the heart; and
   a valve component that is configured to be radially expandable and compressible between a radially compressed state and a radially expanded state within the housing component, the valve component comprising a valve body having a valve passage extending therethrough and three leaflets made from pericardium secured to the valve body;
   wherein the housing body comprises a metal frame and a flexible wall sutured to the metal frame, wherein the flexible wall is made of polyester;
   wherein the ventricular end of the housing body has a first diameter, and an outer circumferential edge of the annular sealing element has a second diameter that is greater than the first diameter;
   wherein the annular sealing element extends continuously around the atrial end of the housing body.

2. The heart valve prosthesis of claim 1, wherein the annular sealing element is sutured to the flexible wall.

3. The heart valve prosthesis of claim 1, wherein the housing body is substantially cylindrical.

4. The heart valve prosthesis of claim 1, wherein the housing body is tapered.

5. The heart valve prosthesis of claim 1, wherein the valve body comprises a valve body frame, wherein the metal frame of the housing body and the valve body frame are made of a shape memory alloy.

6. The heart valve prosthesis of claim 1, wherein the heart valve prosthesis is a tricuspid valve prosthesis for replacing a tricuspid valve.

7. The heart valve prosthetic of claim 1, wherein the housing component and the valve component are self-expandable from their respective radially compressed states and to their respective radially expanded states when released from a catheter.

8. A heart valve prosthesis for replacing a native atrioventricular valve of the heart, the heart valve prosthesis comprising:
   a housing component that is configured to be radially expandable and compressible between a radially compressed state and a radially expanded state to engage structure of the native atrioventricular valve to fix the housing component relative to the native atrioventricular valve;
   wherein the housing component comprises a housing body frame having an atrial end, a ventricular end, and a housing passage extending from the atrial end to the ventricular end, the housing component further comprising a polyester wall sutured to the housing body frame and an annular sealing element connected to the atrial end of the housing body frame, wherein the annular sealing element is made of polyester and reinforced with wire, wherein the housing component is configured such that when it is in the radially expanded state at the native atrioventricular valve, the annular sealing element extends radially outwardly from the atrial end of the housing body frame over tissue surrounding the native atrioventricular valve within an atrium of the heart; and
   a valve component that is configured to be radially expandable and compressible between a radially compressed state and a radially expanded state within the housing component, the valve component comprising a valve body frame having a valve passage extending therethrough and three leaflets made from pericardium secured to the valve body frame;
   wherein the annular sealing element is sutured to the polyester wall;
   wherein the ventricular end of the housing body frame has a first diameter, and an outer circumferential edge of the annular sealing element has a second diameter that is greater than the first diameter.

9. The heart valve prosthesis of claim 8, wherein the housing body frame comprises barbs having tips pointing toward the atrial end of the housing frame.

10. The heart valve prosthesis of claim 8, wherein the annular sealing element has an inner circumference at the atrial end of the housing body frame, an outer circumference spaced radially outwardly from the atrial end of the housing body frame, and upper and lower surfaces extending from the inner circumference to the outer circumference, and when the housing component is radially expanded at the native atrioventricular valve, the upper surface faces in an upstream direction toward the atrium and the lower surface faces in a downstream direction toward a ventricle of the heart.

11. The heart valve prosthesis of claim 8, wherein the housing component and the valve component are self-expandable from their respective radially compressed states and to their respective radially expanded states when released from a catheter.

12. A heart valve prosthesis for replacing a native atrioventricular valve of the heart, the heart valve prosthesis comprising:
- a housing component that is configured to be radially expandable and compressible between a radially compressed state and a radially expanded state to engage structure of the native atrioventricular valve to fix the housing component relative to the native atrioventricular valve;
- wherein the housing component comprises a housing body having an atrial end, a ventricular end, and a housing passage extending from the atrial end to the ventricular end, the housing component further comprising an annular sealing element connected to the atrial end of the housing body, wherein the annular sealing element is made of polyester and is reinforced with wire, wherein the housing component is configured such that when it is in the radially expanded state at the native atrioventricular valve, the annular sealing element extends radially outwardly from the atrial end of the housing body over tissue surrounding the native atrioventricular valve within an atrium of the heart;
- a valve component that is configured to be radially expandable and compressible between a radially compressed state and a radially expanded state within the housing component, the valve component comprising a valve body having a valve passage extending therethrough and three leaflets made from pericardium secured to the valve body; and
- fastening means for securing the valve body within the housing body;
- wherein the housing body comprises a metal frame and a flexible wall sutured to the metal frame, wherein the flexible wall is made of polyester;
- wherein the annular sealing element extends continuously around the atrial end of the housing body.

13. The heart valve prosthesis of claim 12, wherein the fastening means comprises connectors.

14. A heart valve prosthesis for replacing a native atrioventricular valve of the heart, the heart valve prosthesis comprising:
- a housing component that is configured to be radially expandable and compressible between a radially compressed state and a radially expanded state to engage structure of the native atrioventricular valve to fix the housing component relative to the native atrioventricular valve;
- wherein the housing component comprises a housing body having an atrial end, a ventricular end, and a housing passage extending from the atrial end to the ventricular end, and an annular sealing element connected to the atrial end of the housing body, wherein the annular sealing element is made of a non-biological material and is reinforced with wire, wherein the housing component is configured such that when it is in the radially expanded state at the native atrioventricular valve, the annular sealing element extends radially outwardly from the atrial end of the housing body over tissue surrounding the native atrioventricular valve within an atrium of the heart; and
- a valve component that is configured to be radially expandable and compressible between a radially compressed state and a radially expanded state within the housing component, the valve component comprising a valve body having a valve passage extending therethrough and three leaflets made from pericardium secured to the valve body;
- wherein the housing body comprises a metal frame and a flexible wall sutured to the metal frame, wherein the flexible wall is made of a non-biological material;
- wherein the ventricular end of the housing body has a first diameter, and an outer circumferential edge of the annular sealing element has a second diameter that is greater than the first diameter.

15. The heart valve prosthesis of claim 14, further comprising fastening means for securing the valve body within the housing body.

16. The heart valve prosthesis of claim 15, wherein the fastening means comprises connectors.

17. The heart valve prosthetic of claim 14, wherein the valve body comprises a metal frame, wherein the metal frame of the valve body and the metal frame of the housing body are made of Nitinol, and wherein the housing component and the valve component are self-expandable from their respective radially compressed states and to their respective radially expanded states when released from a catheter.

18. The heart valve prosthesis of claim 14, wherein the annular sealing element is sutured to the flexible wall.

19. The heart valve prosthesis of claim 14, wherein the housing body is substantially cylindrical.

20. The heart valve prosthesis of claim 14, wherein the housing body is tapered.

\* \* \* \* \*